(12) United States Patent
Savenok

(10) Patent No.: US 10,919,674 B2
(45) Date of Patent: Feb. 16, 2021

(54) LIQUID CONTAINER LID ASSEMBLY

(71) Applicant: Pavel Savenok, Wheaton, IL (US)

(72) Inventor: Pavel Savenok, Wheaton, IL (US)

( * ) Notice: Subject to any disclaimer, the term of this patent is extended or adjusted under 35 U.S.C. 154(b) by 327 days.

(21) Appl. No.: 16/220,099

(22) Filed: Dec. 14, 2018

(65) Prior Publication Data

US 2019/0185225 A1 Jun. 20, 2019

Related U.S. Application Data

(60) Provisional application No. 62/599,585, filed on Dec. 15, 2017.

(51) Int. Cl.
| | |
|---|---|
| *B65D 47/06* | (2006.01) |
| *B65D 47/26* | (2006.01) |
| *B65D 51/28* | (2006.01) |
| *B65D 85/80* | (2006.01) |
| *A47J 31/00* | (2006.01) |
| *A47G 19/22* | (2006.01) |
| *B65D 85/804* | (2006.01) |
| *B65D 47/28* | (2006.01) |
| *B65D 51/18* | (2006.01) |

(52) U.S. Cl.
CPC ......... *B65D 47/06* (2013.01); *A47G 19/2272* (2013.01); *A47J 31/00* (2013.01); *B65D 47/263* (2013.01); *B65D 47/286* (2013.01); *B65D 51/2807* (2013.01); *B65D 85/8043* (2013.01); *B65D 51/18* (2013.01); *B65D 2543/00046* (2013.01); *B65D 2543/00092* (2013.01)

(58) Field of Classification Search
CPC .... B65D 47/061; B65D 47/06; B65D 47/286; B65D 47/28; B65D 47/263; B65D 47/261; B65D 47/26; B65D 85/8043; B65D 85/804; B65D 51/2807; B65D 51/28; B65D 51/18; A47J 31/00; A47G 19/2272
USPC ....... 220/713, 711, 253, 254.8, 254.3, 254.1, 220/259.4, 259.3, 256.1
See application file for complete search history.

(56) References Cited

U.S. PATENT DOCUMENTS 5,269,432 A * 12/1993 Beckertgis ........... B65D 47/265
215/250

* cited by examiner

*Primary Examiner* — Robert J Hicks
(74) *Attorney, Agent, or Firm* — Christopher J. Scott

(57) ABSTRACT

A lid assembly outfits a liquid container and may function to position a liquid-permeable container relative to the liquid container. The lid assembly may include a lid body having a rim-receiving groove, an object-supportive depression, and a primary liquid-letting aperture. The primary liquid-letting aperture primarily enables liquid egression from the liquid container. The object-supportive depression supports objects and defines a tertiary liquid-letting aperture for outletting liquid into the liquid container. A lid body insert may be received and supported by the lid body in superior adjacency to the object-supportive depression and has a secondary liquid-letting aperture and an insert axis. The lid body insert is rotatable about the insert axis intermediate open and closed lid positions such that the secondary liquid-letting aperture is rotatably positionable either in superior or lateral adjacency to the primary liquid-letting aperture for selectively opening and closing the lid assembly.

20 Claims, 58 Drawing Sheets

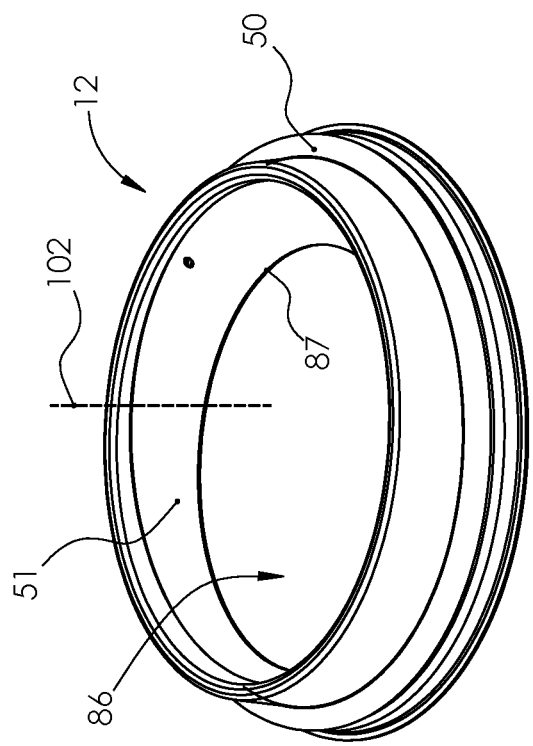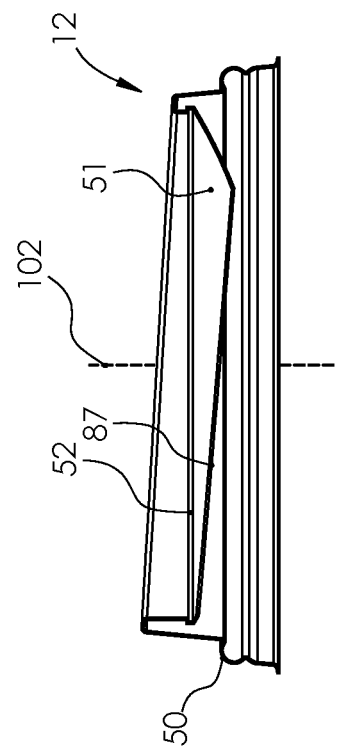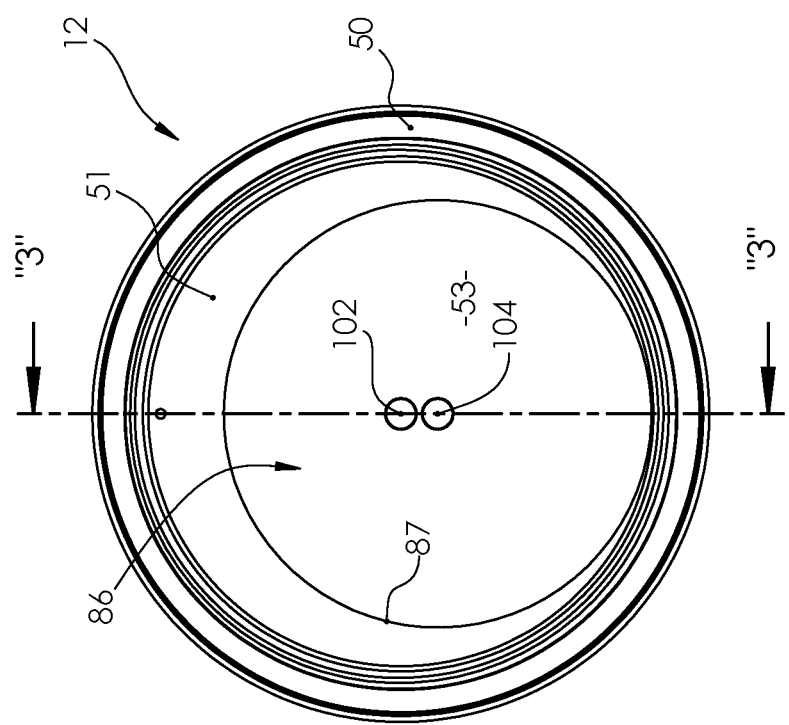

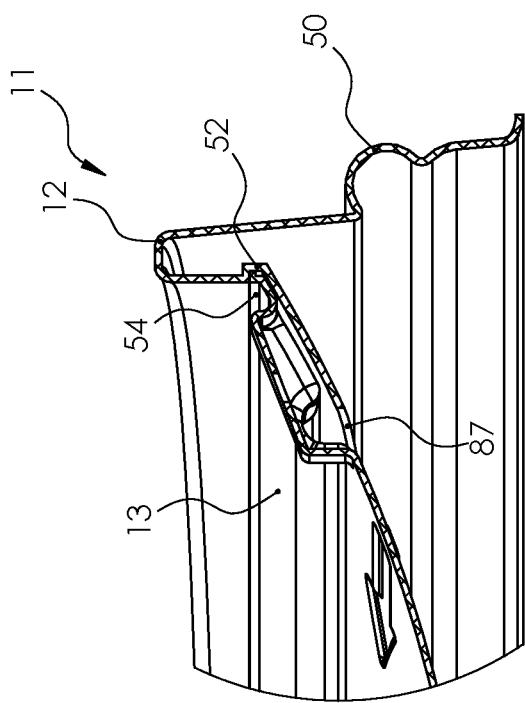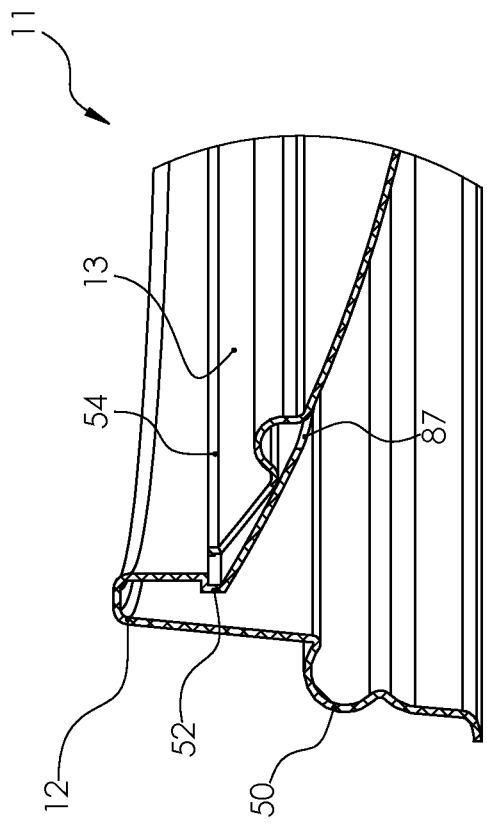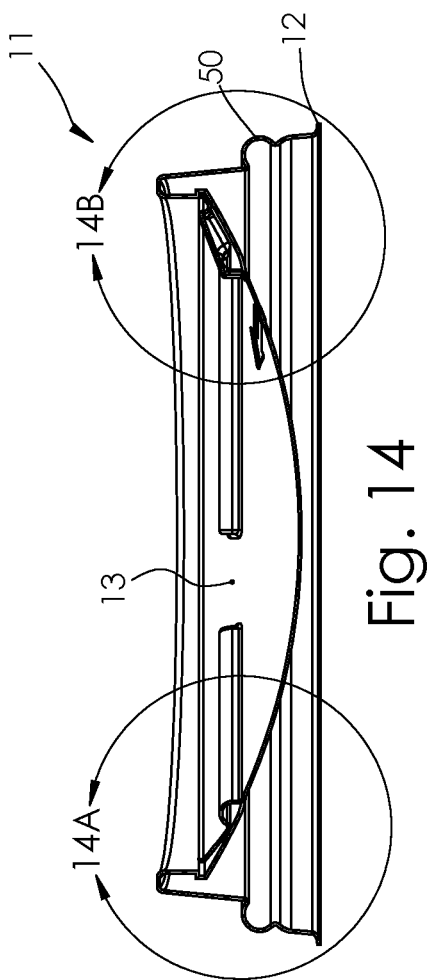

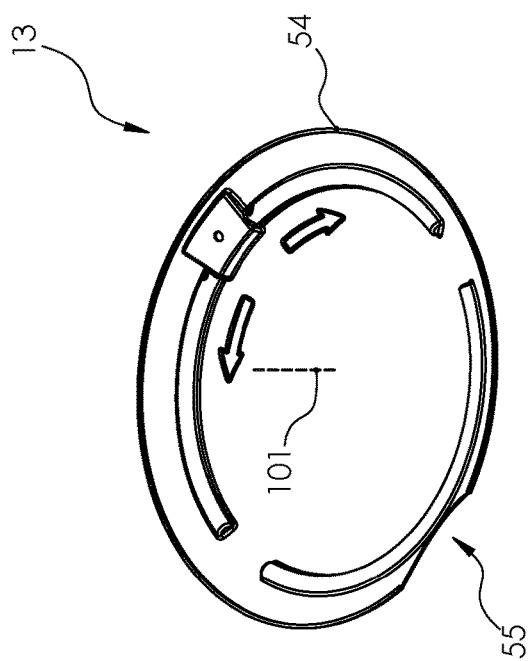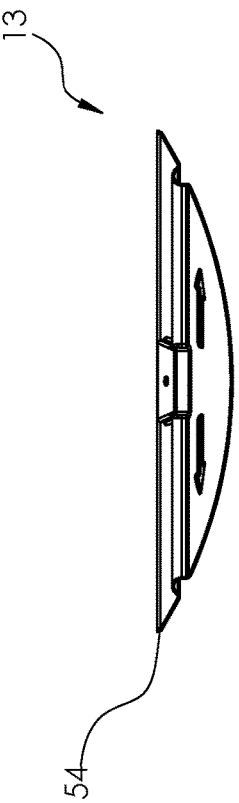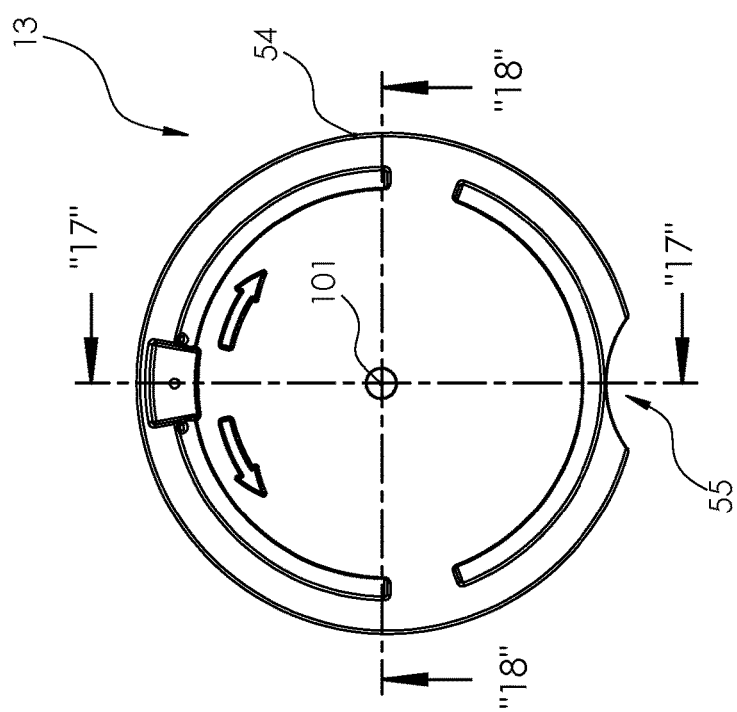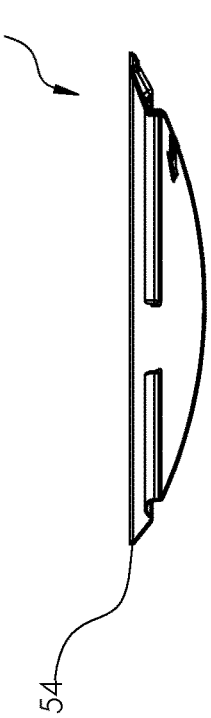
Fig. 15
Fig. 18
Fig. 16
Fig. 17

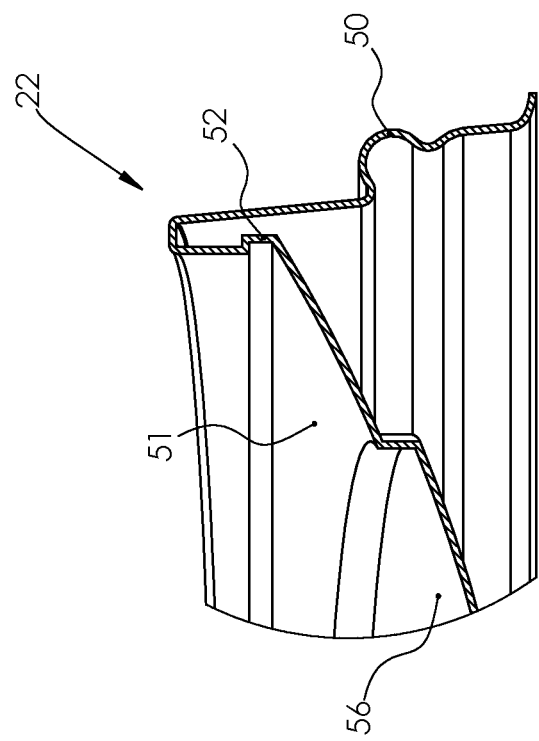
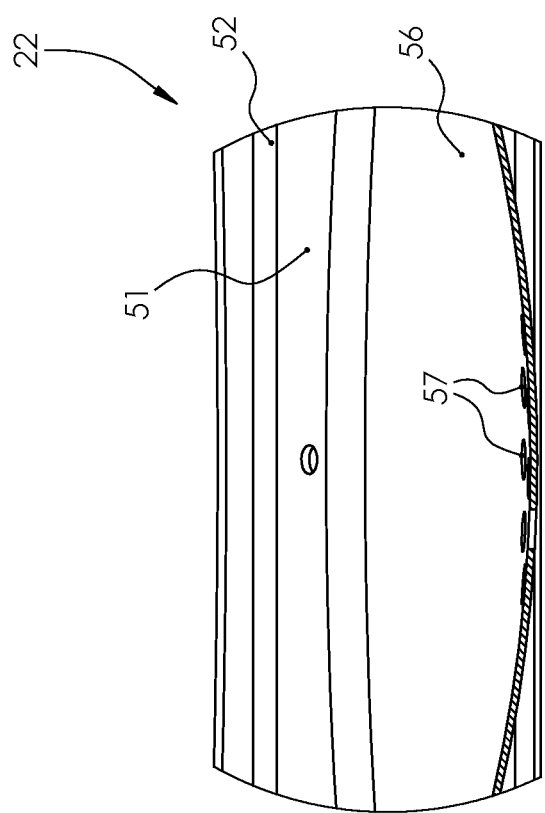
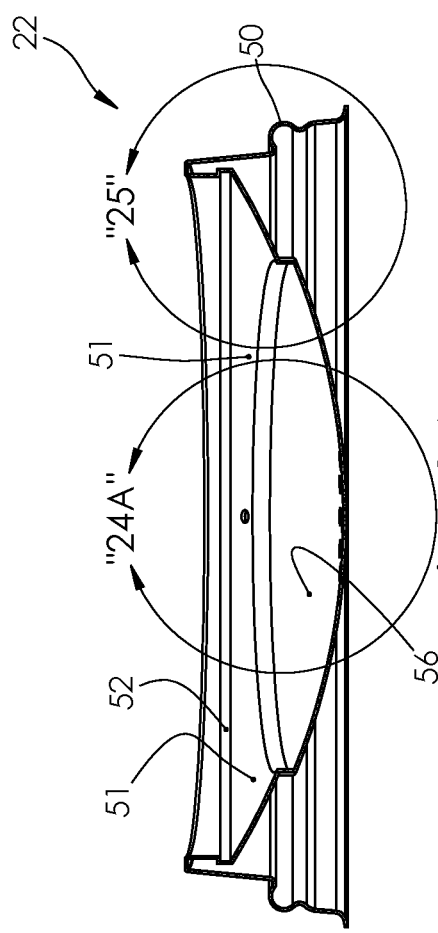
Fig. 25
Fig. 24A
Fig. 24

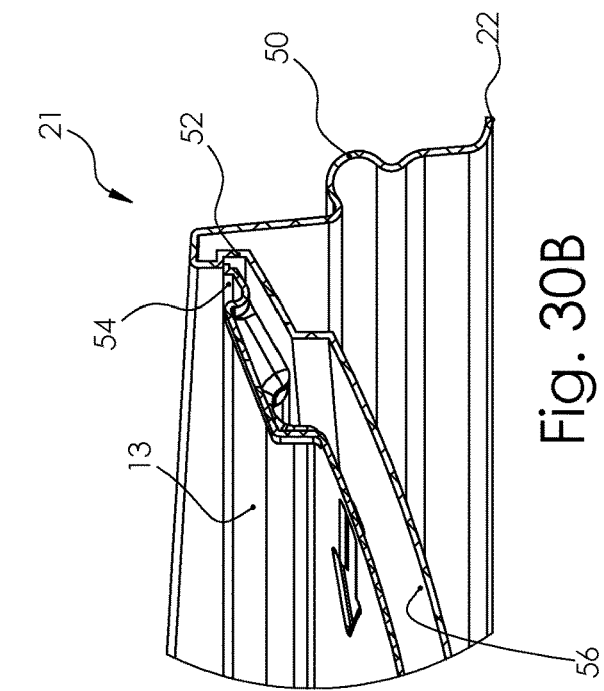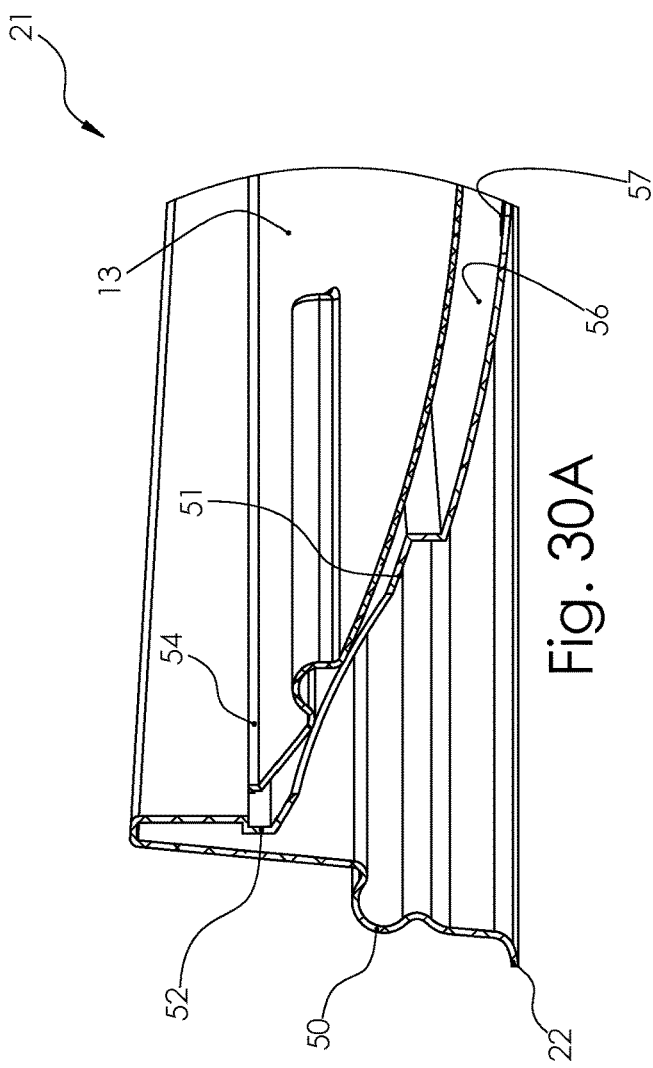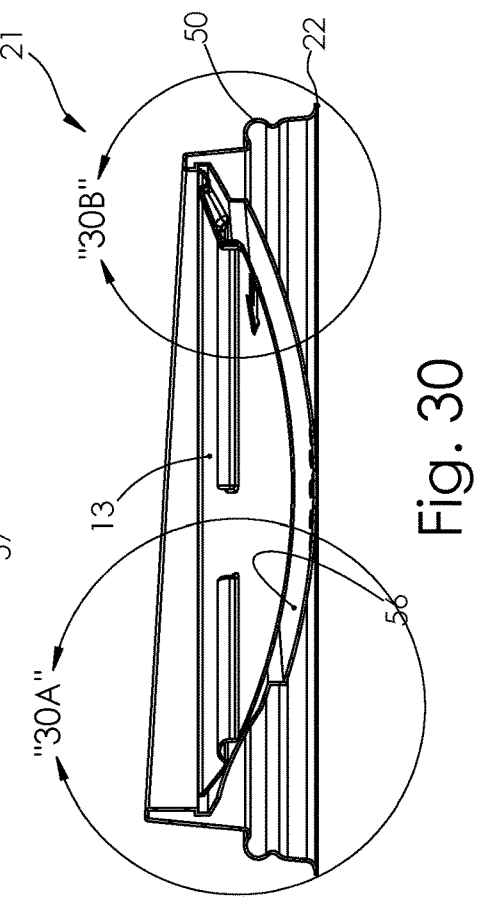

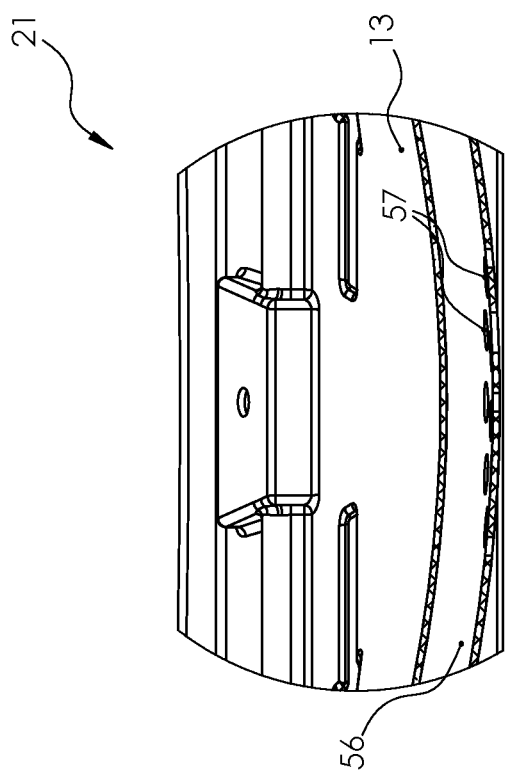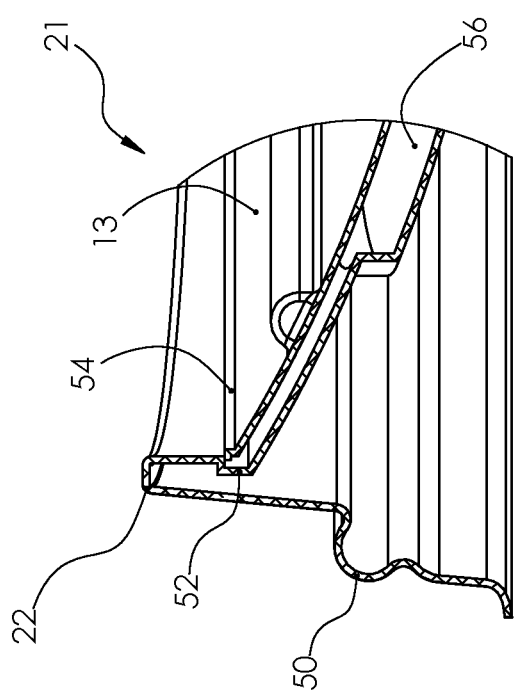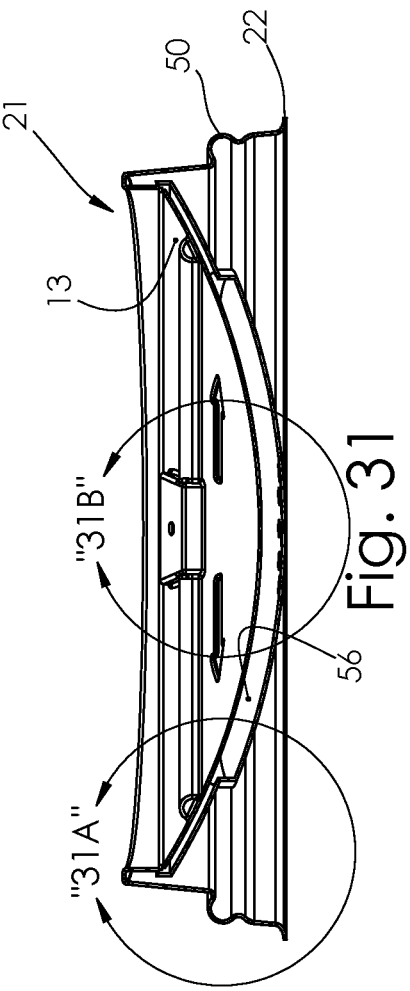
Fig. 31A
Fig. 31B
Fig. 31

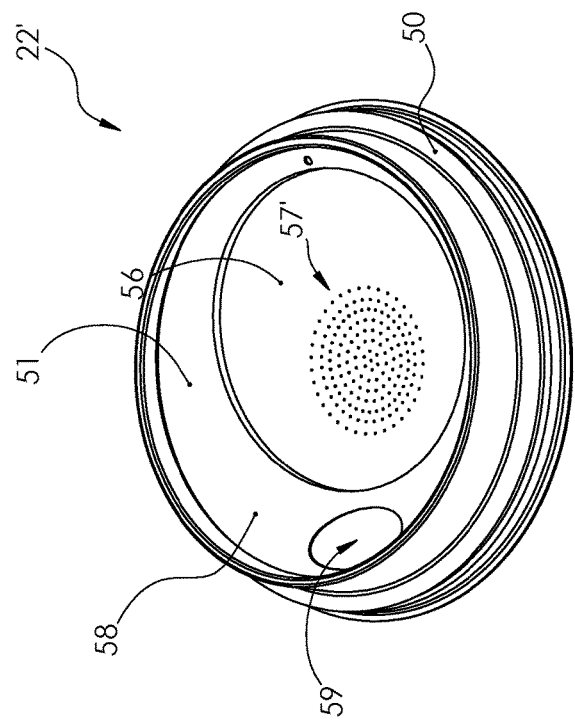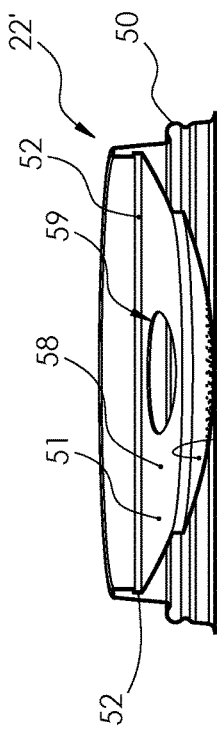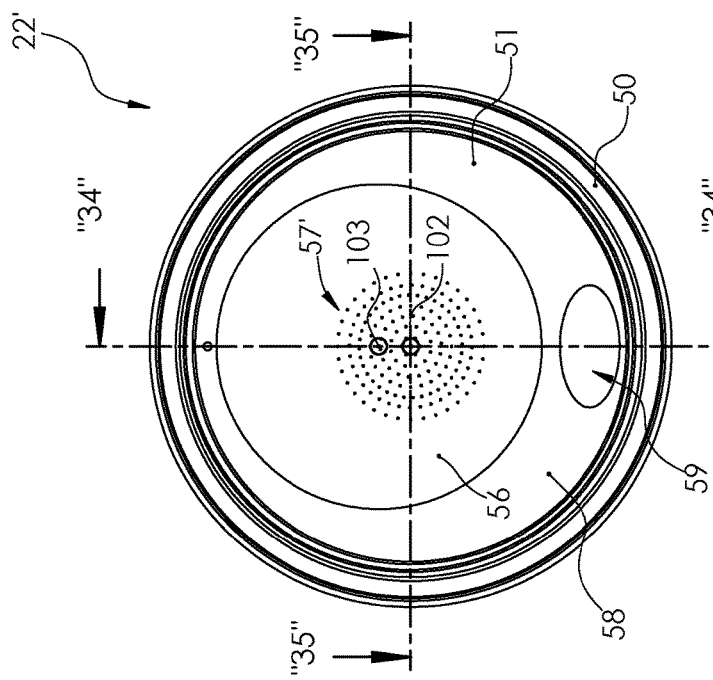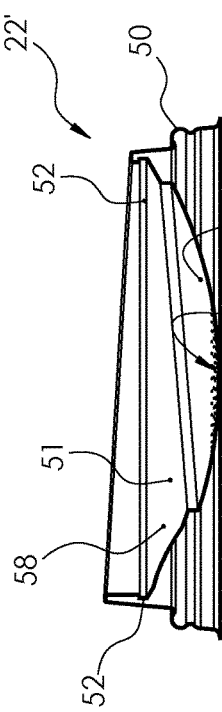

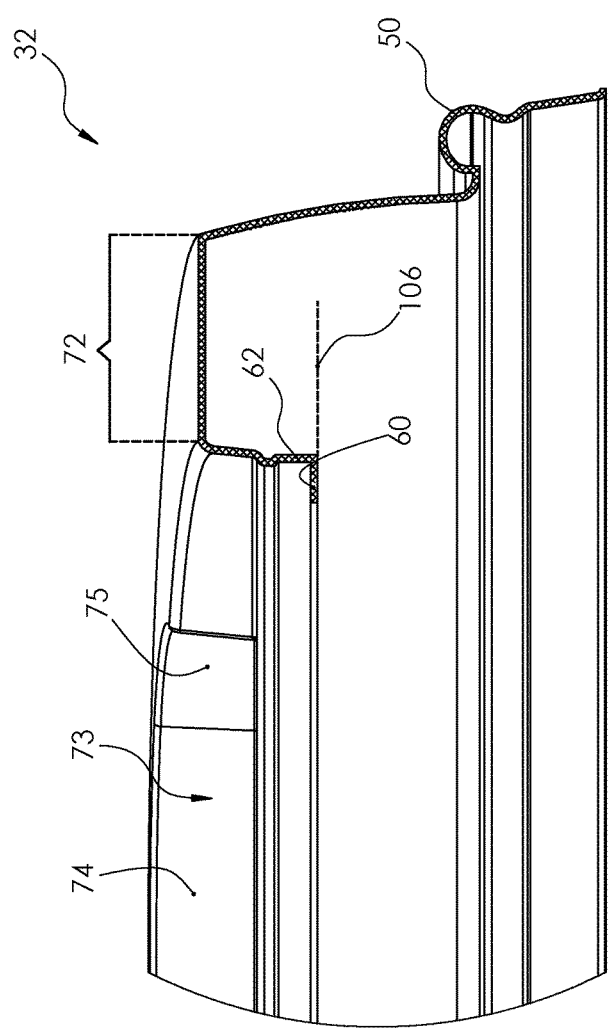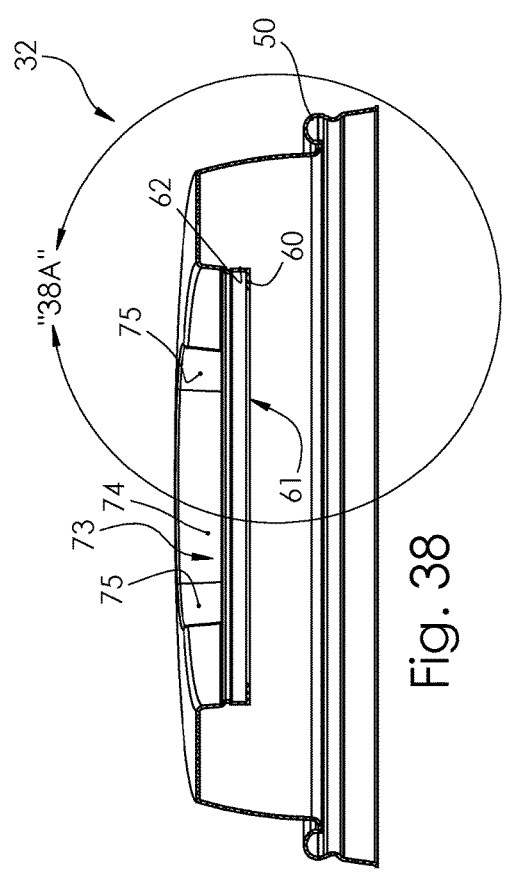
Fig. 38A
Fig. 38

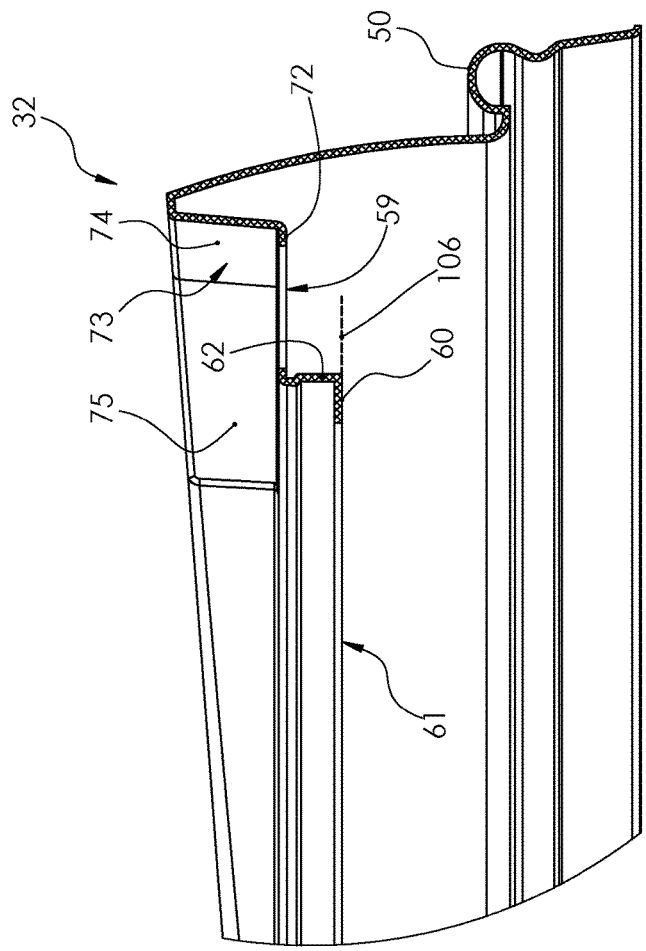
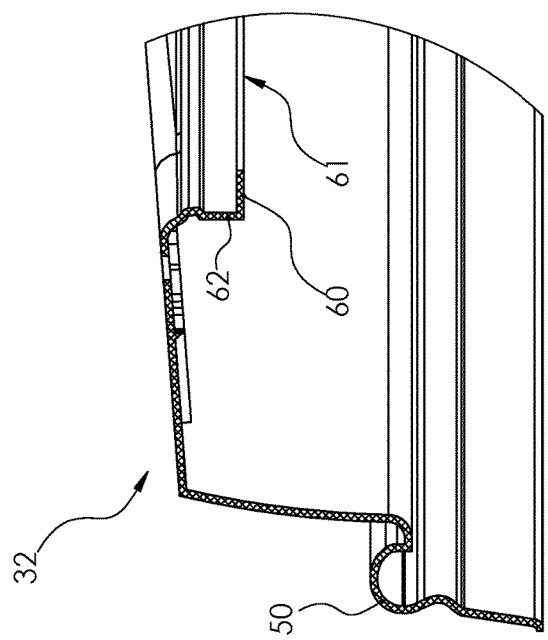
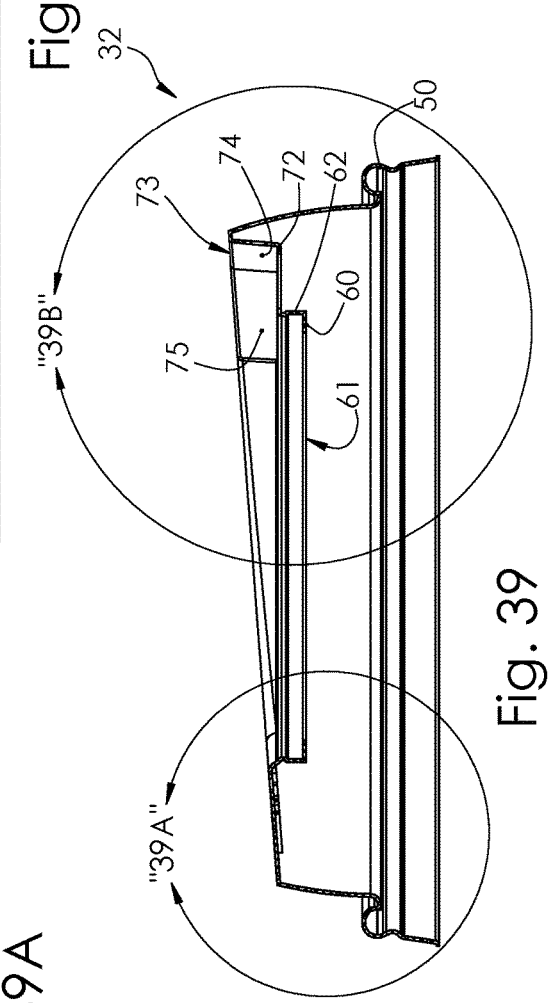
Fig. 39A
Fig. 39B
Fig. 39

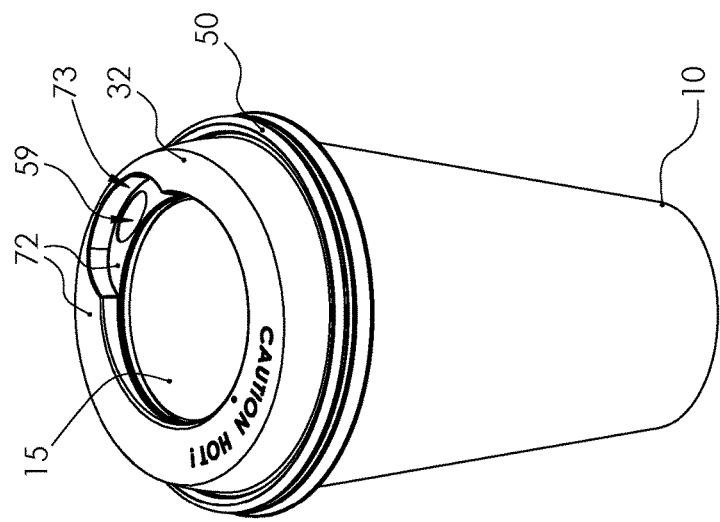
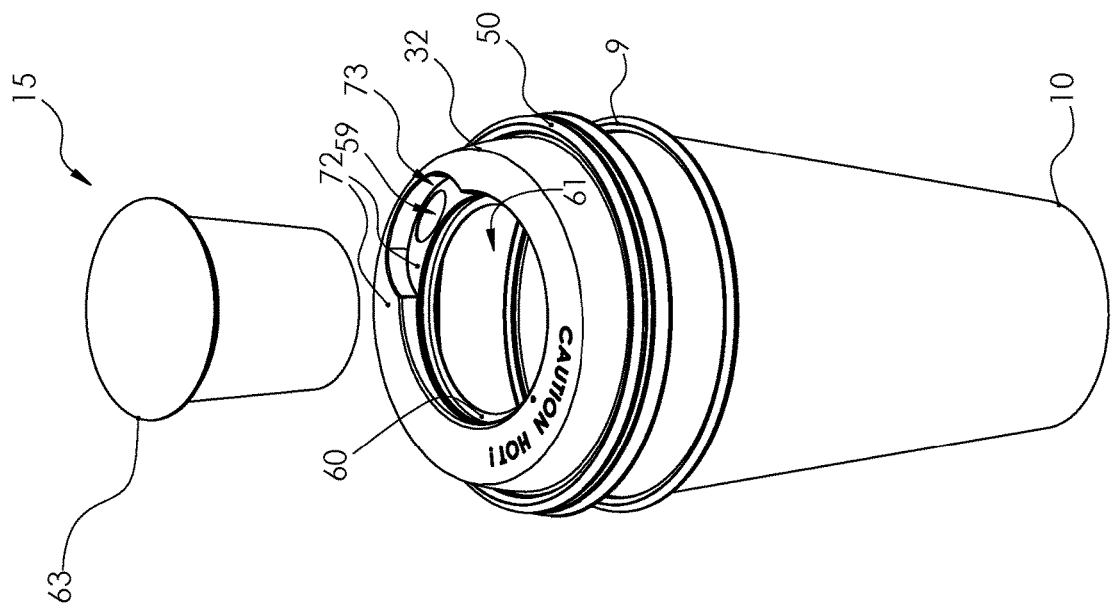

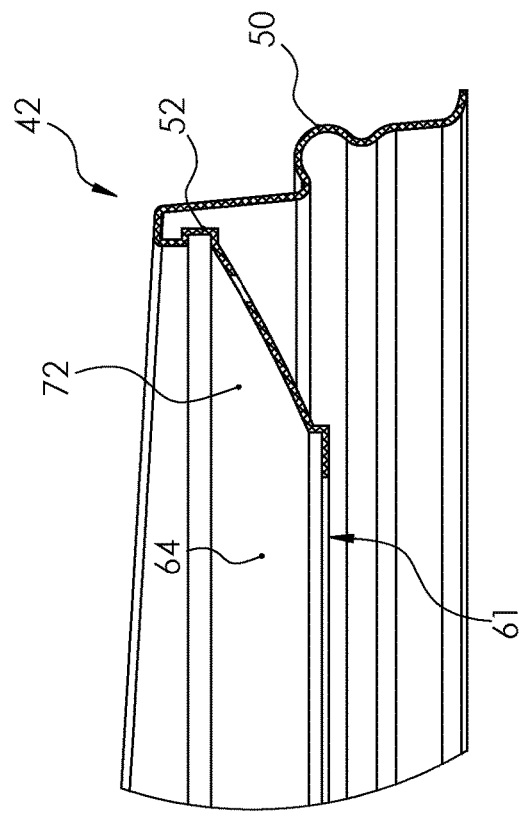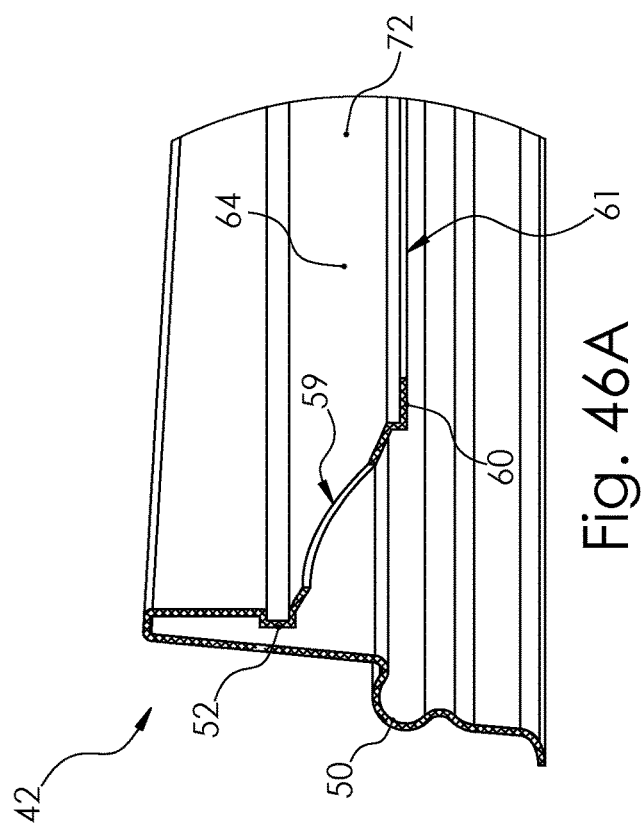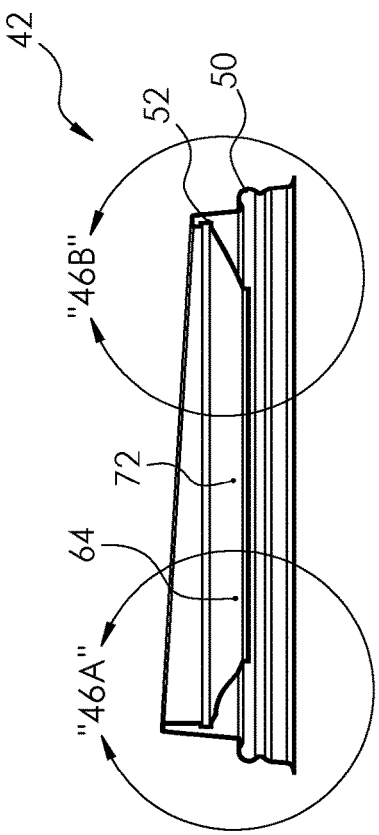
Fig. 46A
Fig. 46B
Fig. 46

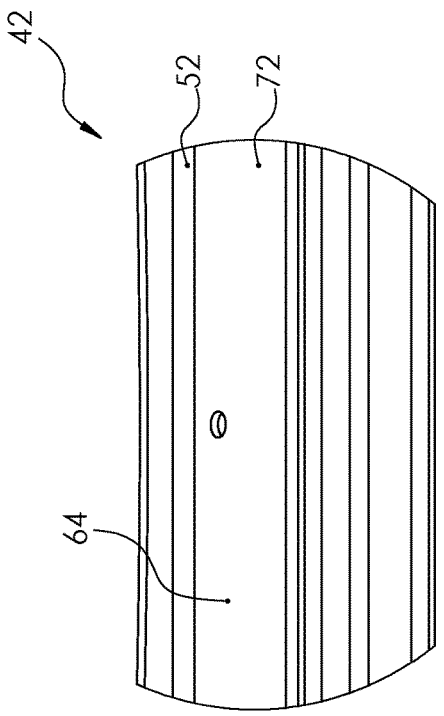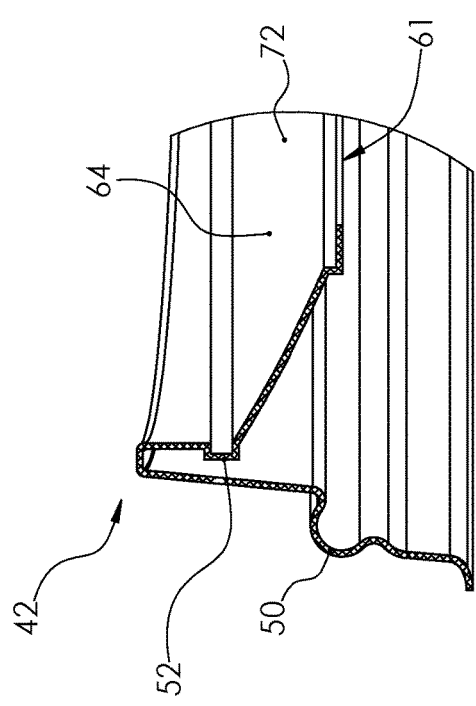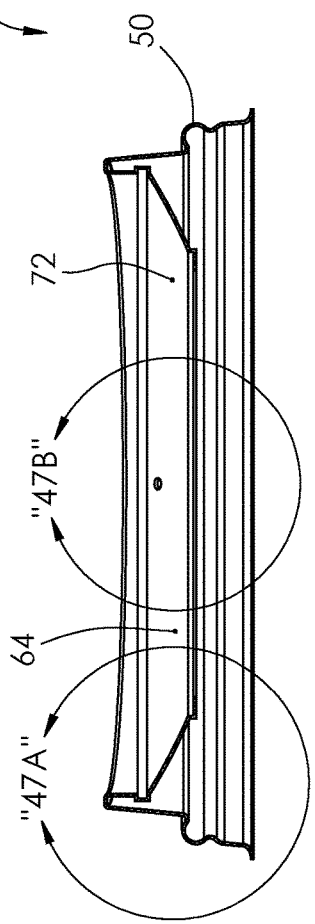
Fig. 47A
Fig. 47B
Fig. 47

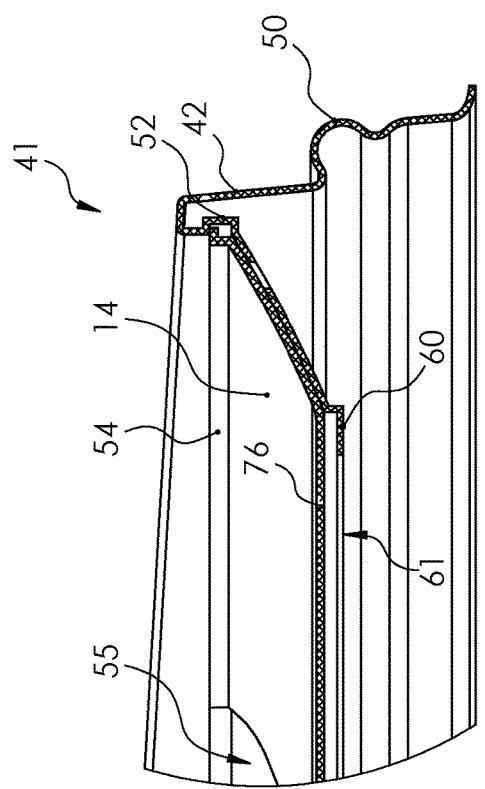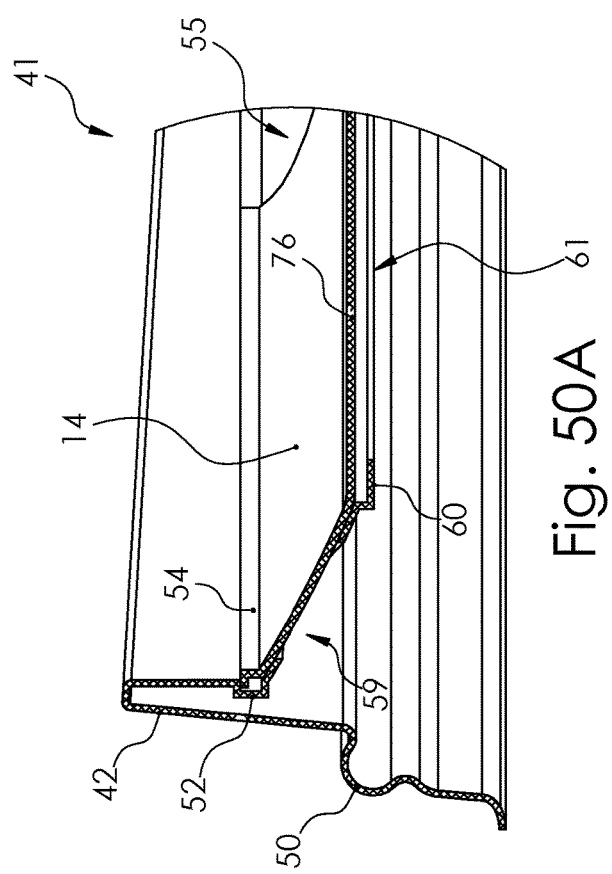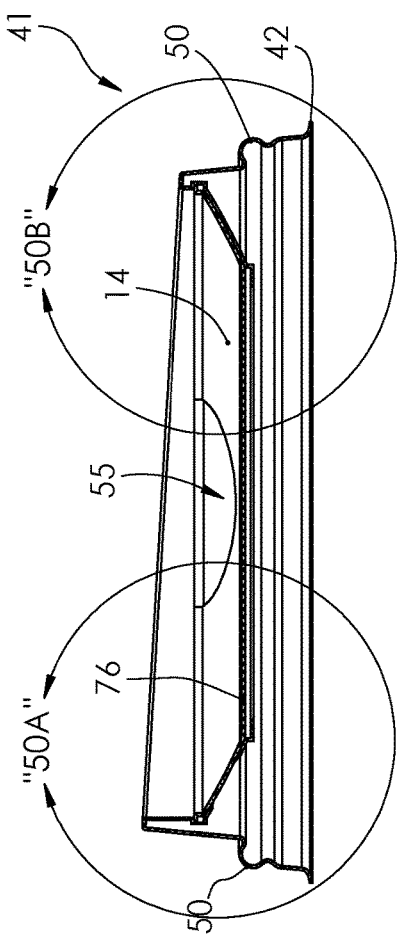

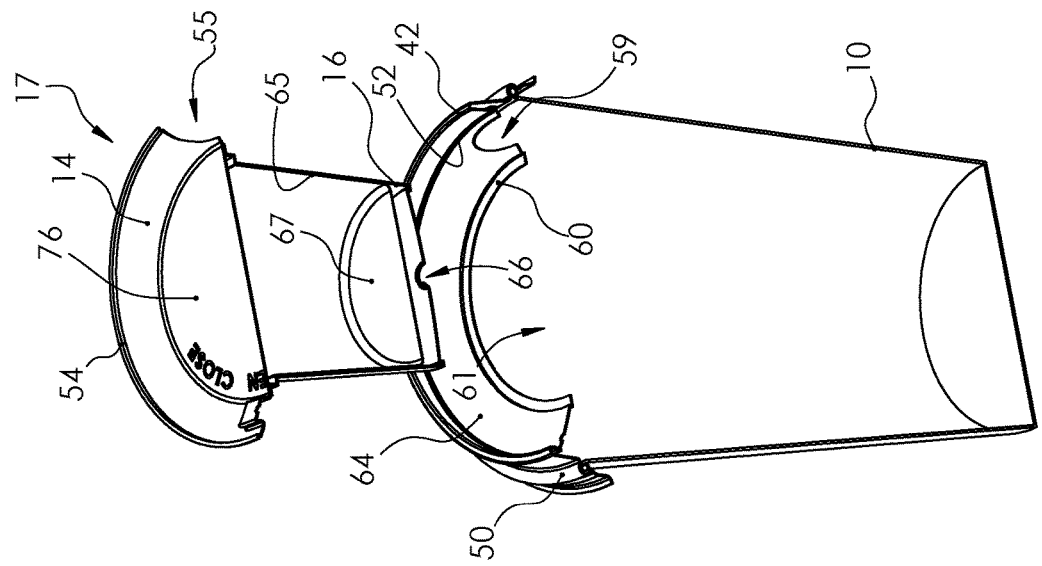
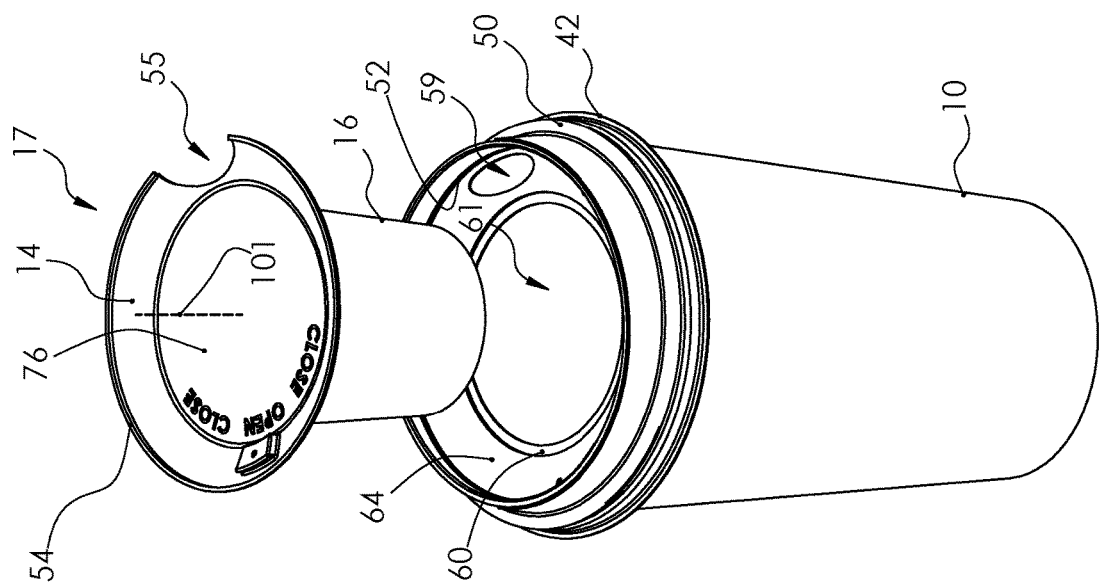
Fig. 62
Fig. 61

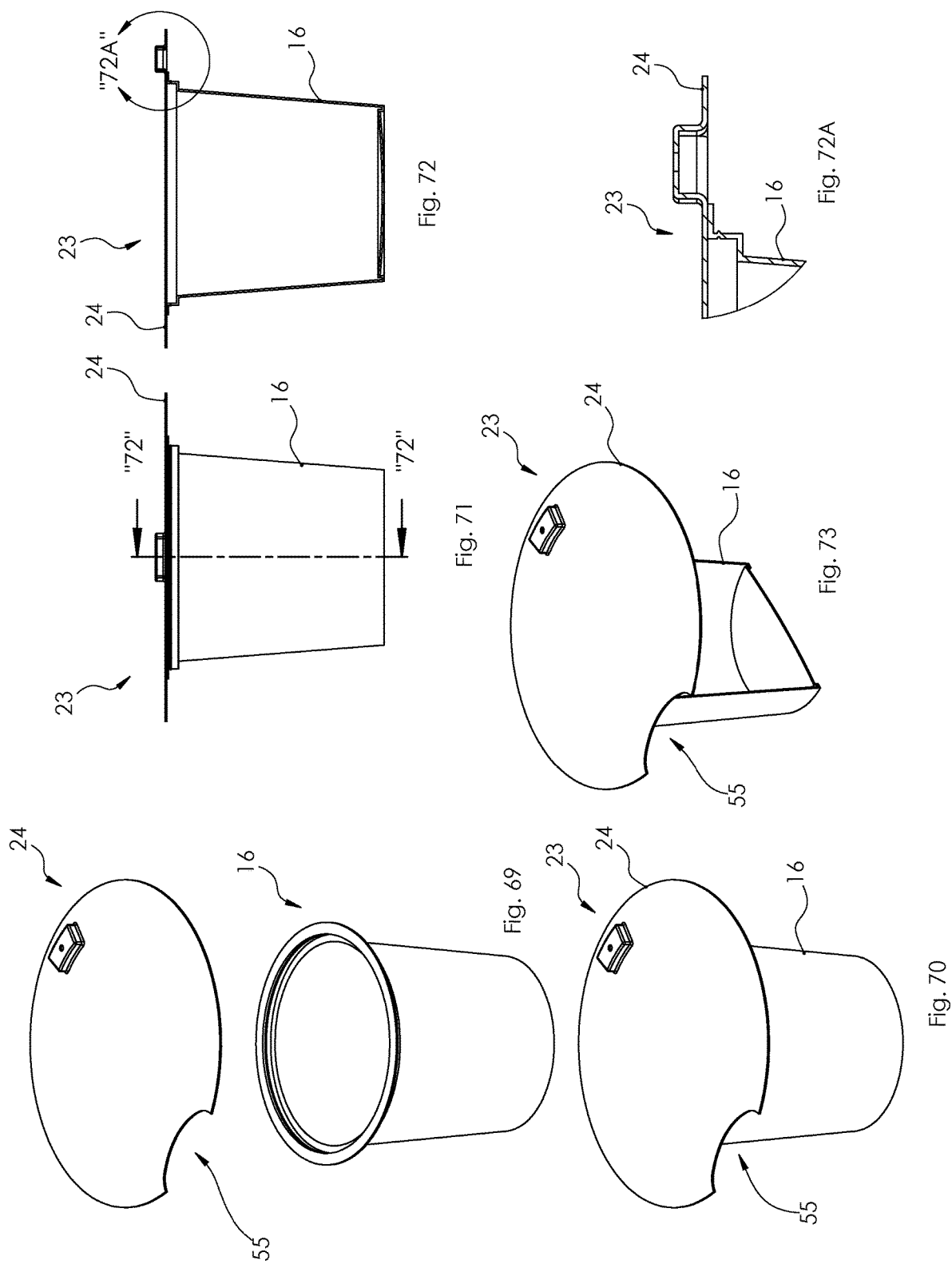

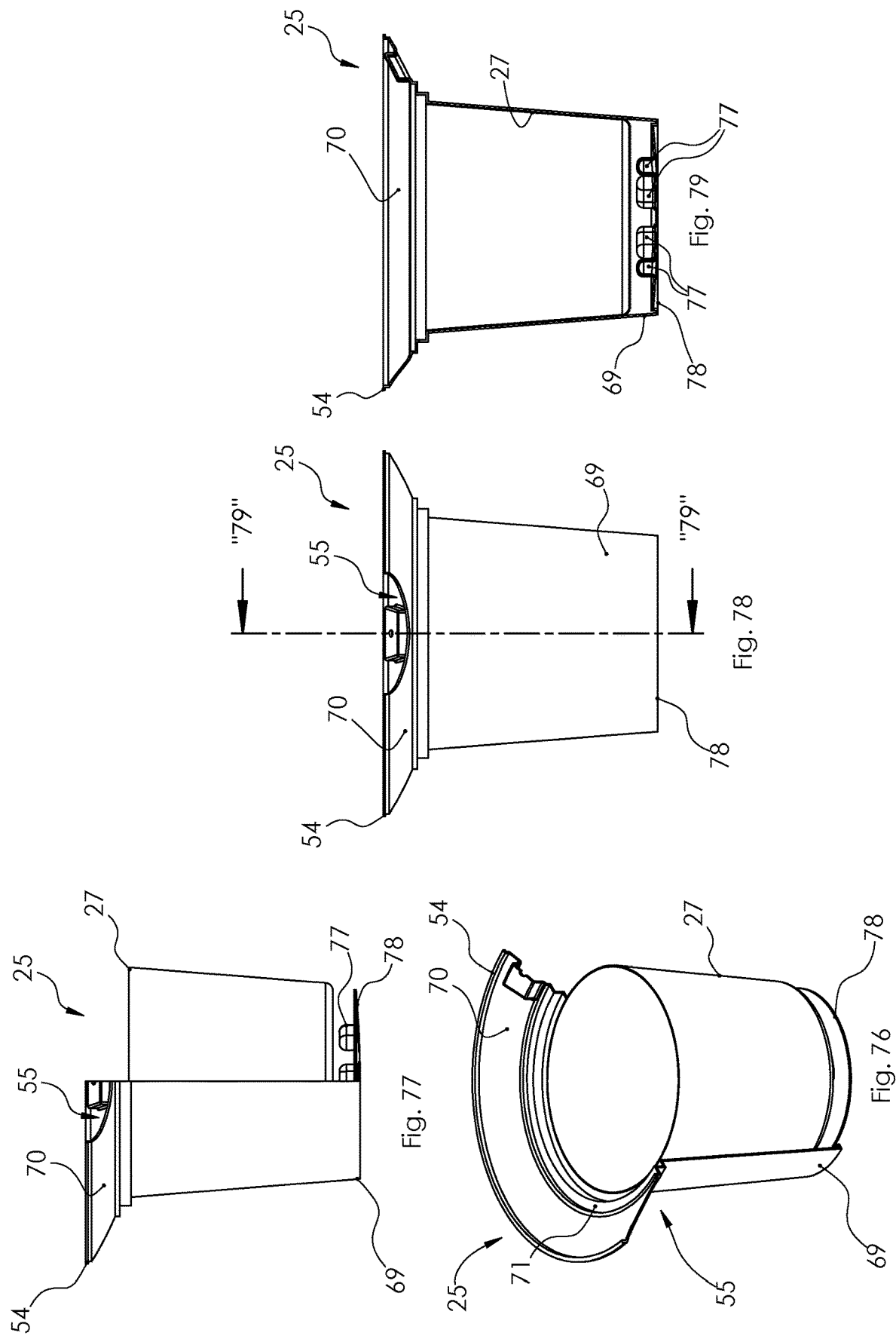

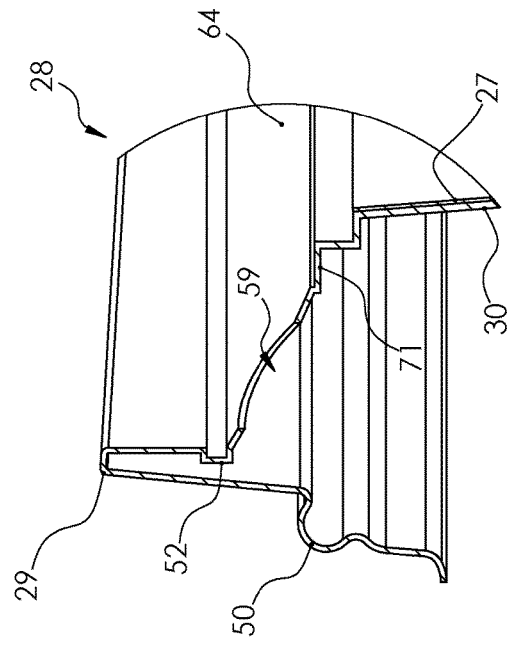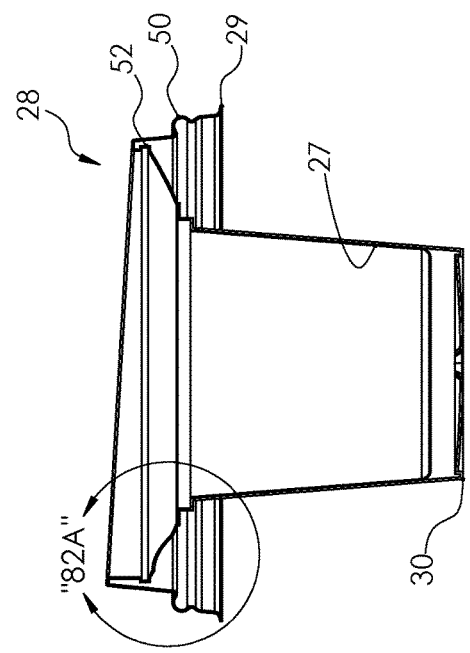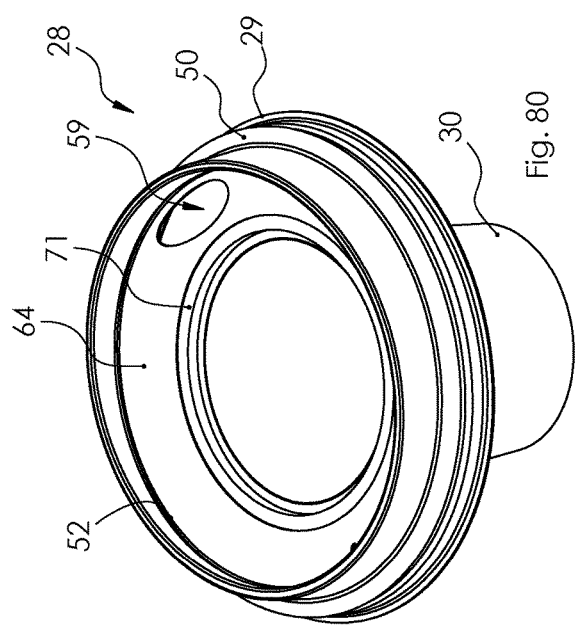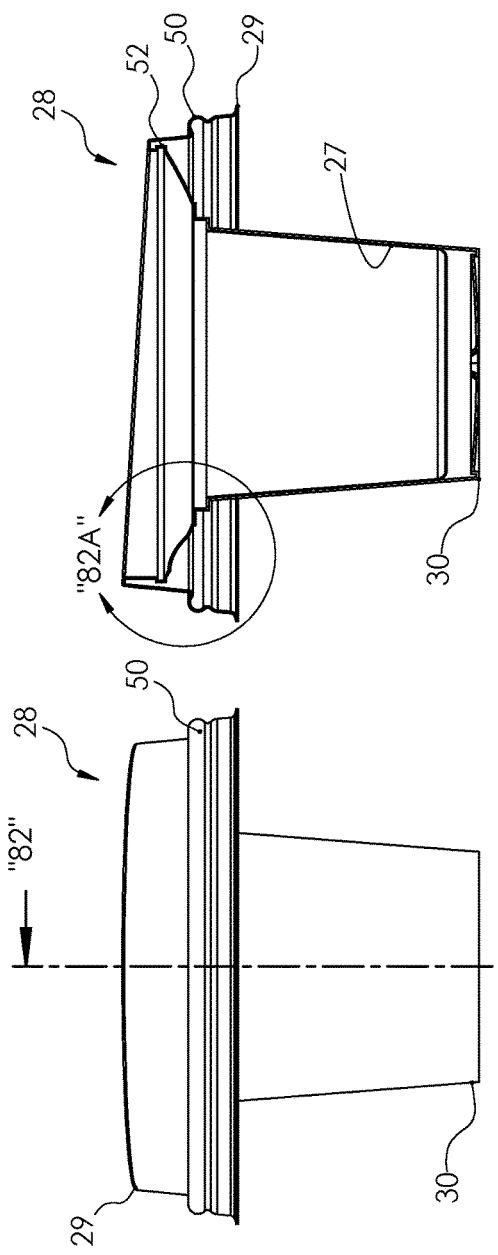

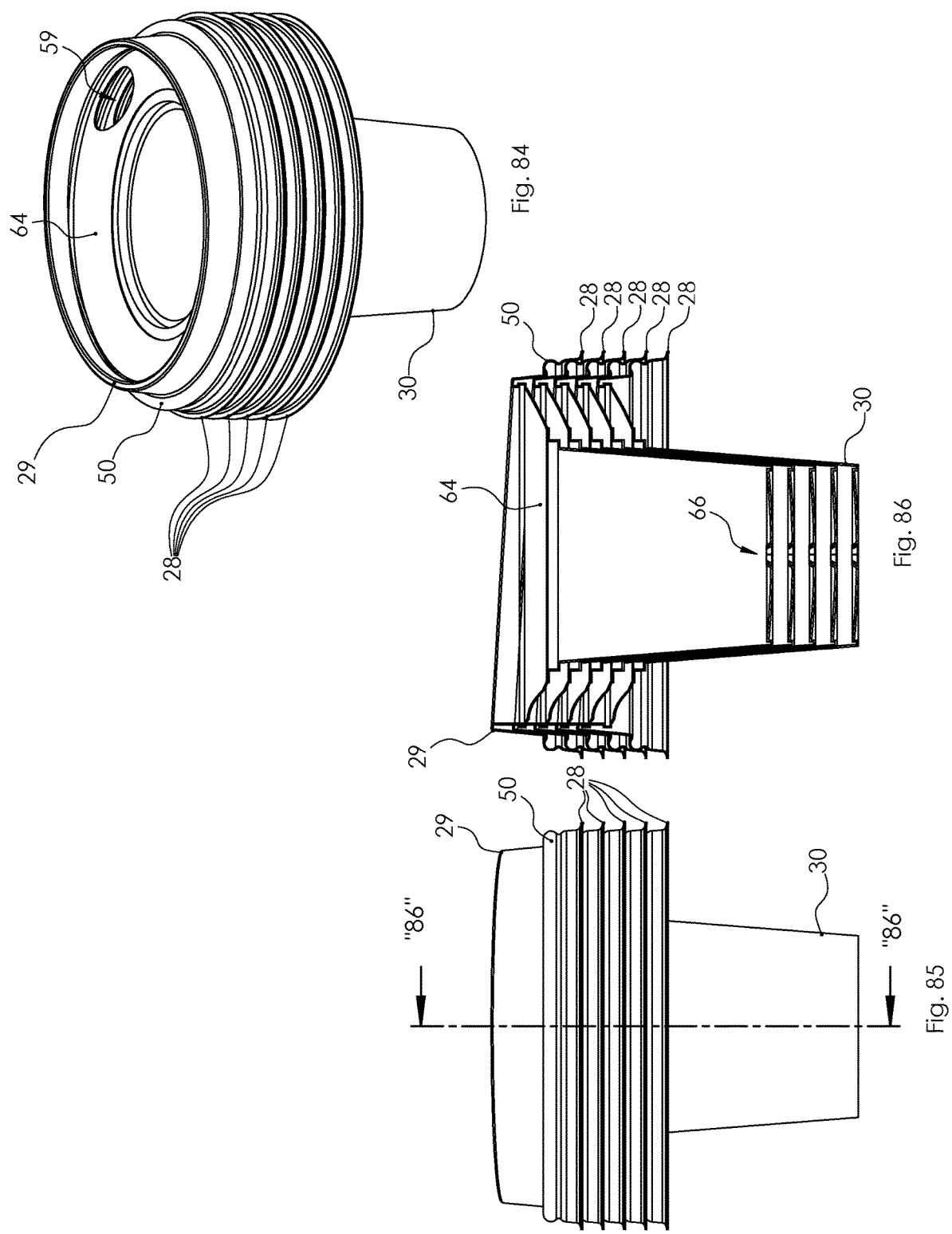

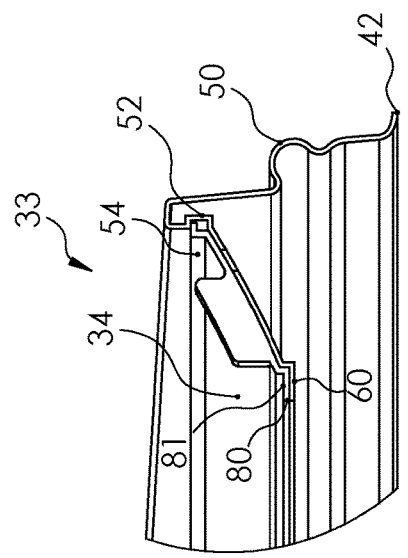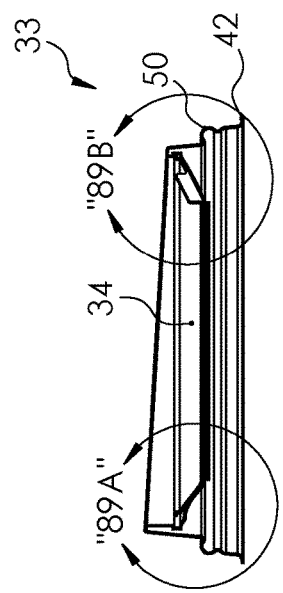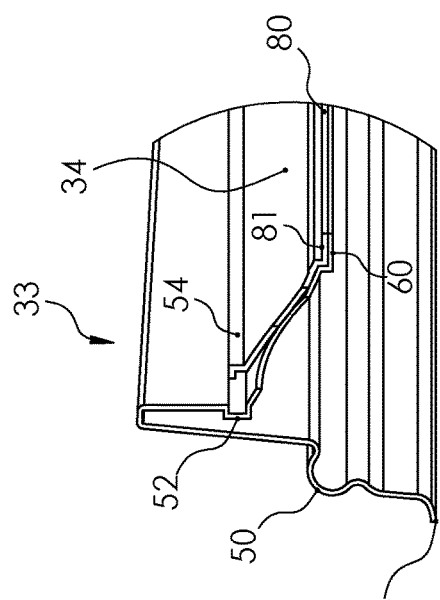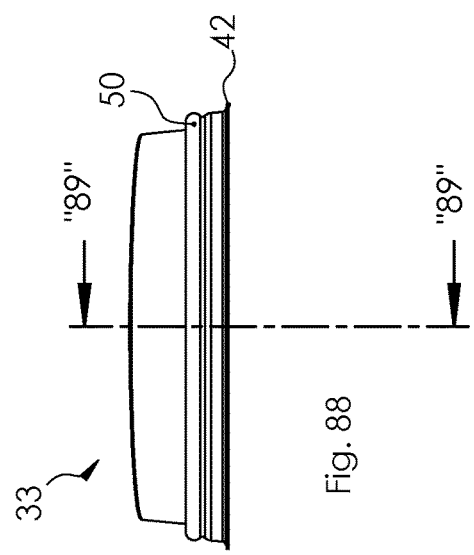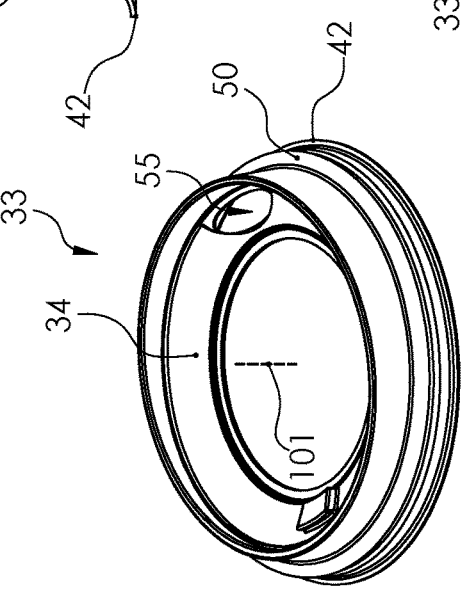
Fig. 89B
Fig. 89
Fig. 89A
Fig. 88
Fig. 87

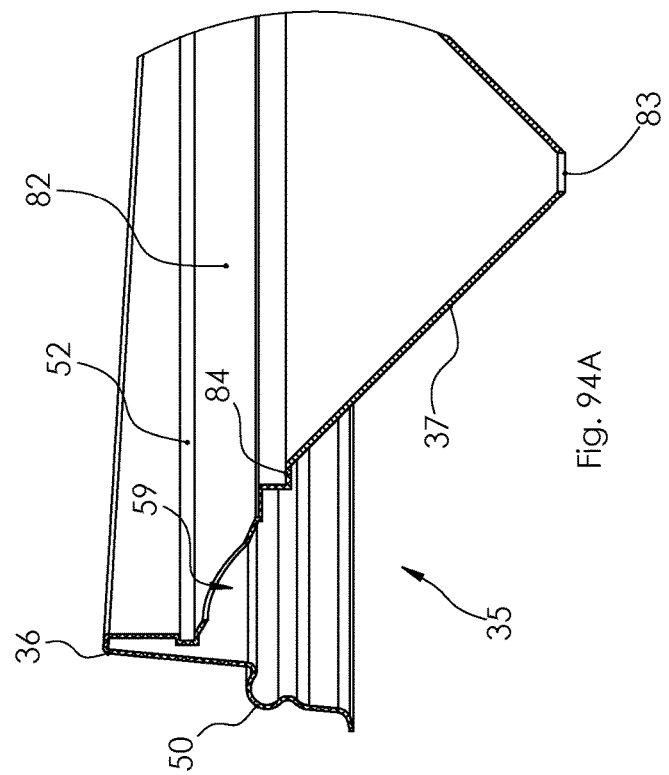
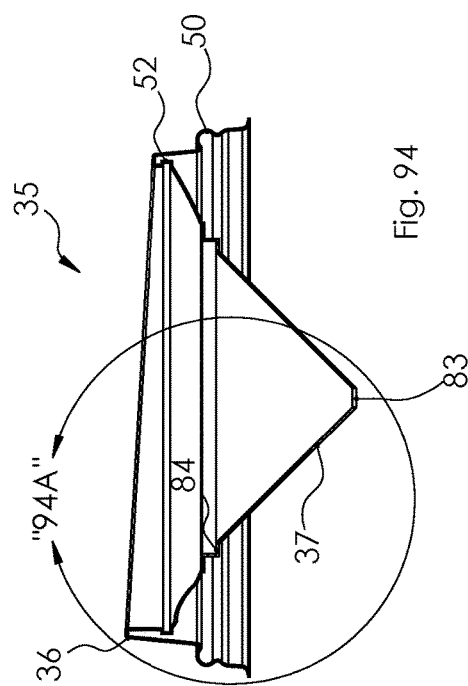
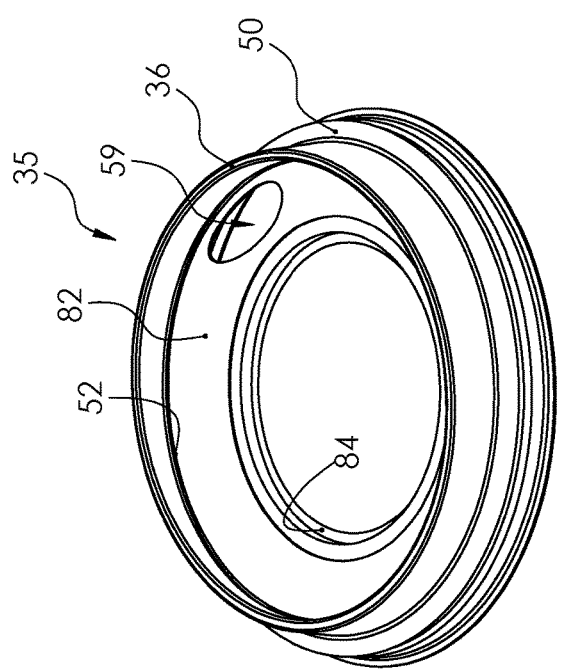
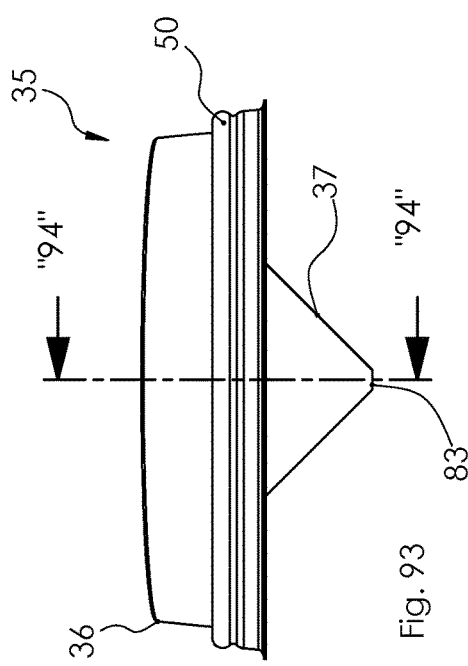

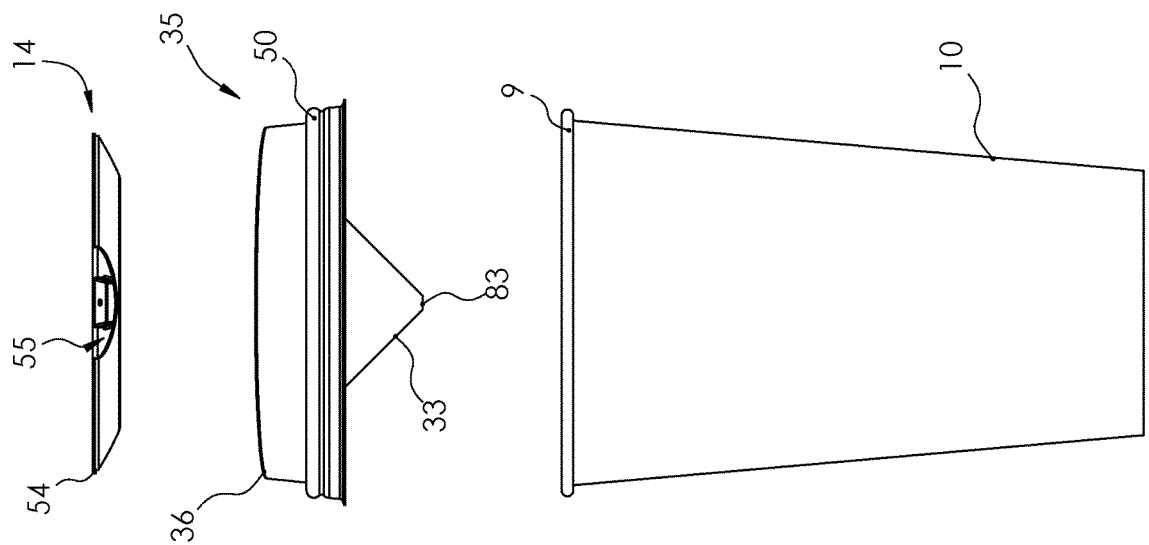
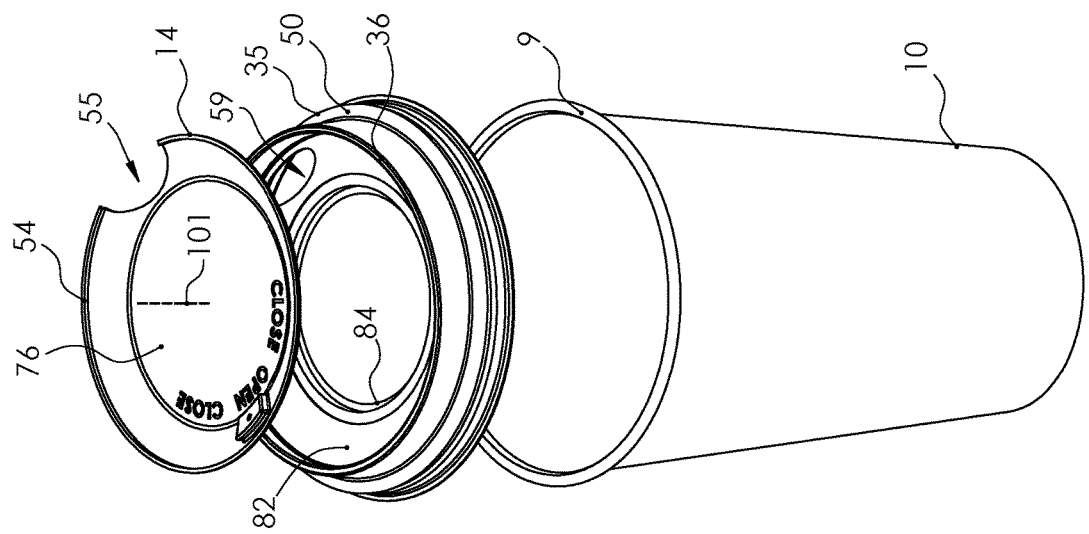

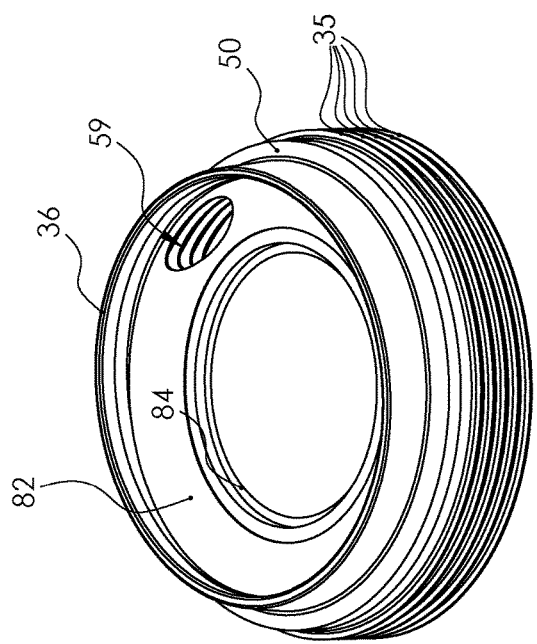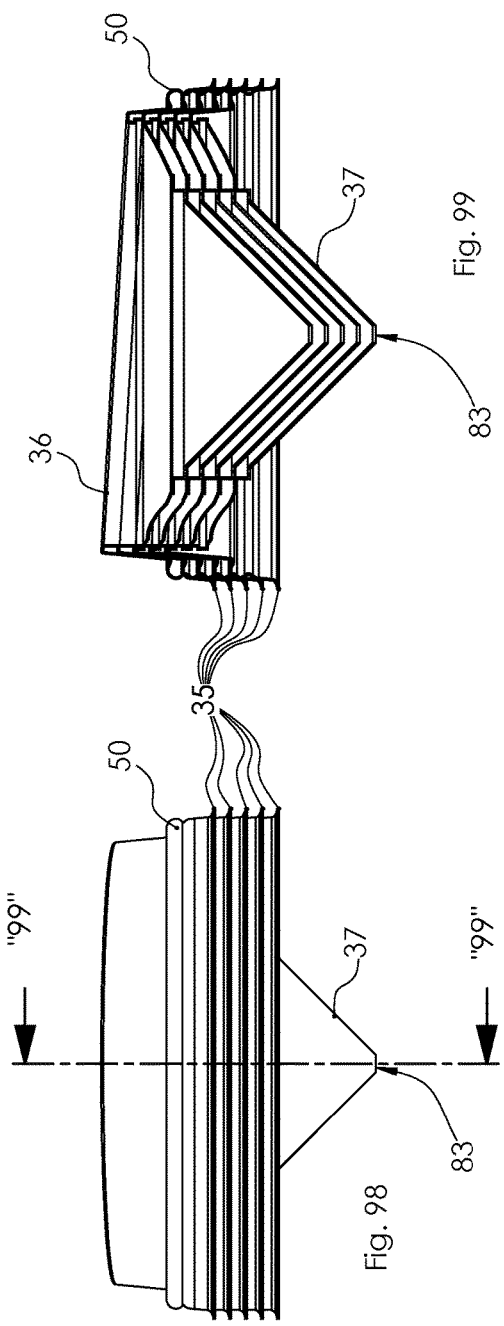

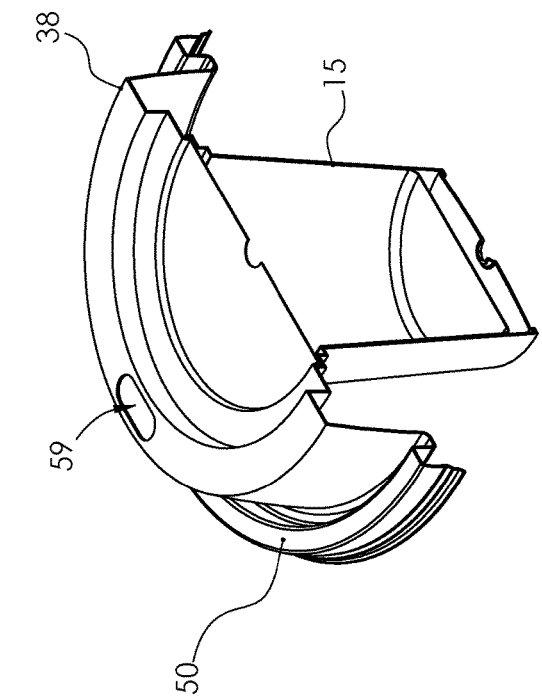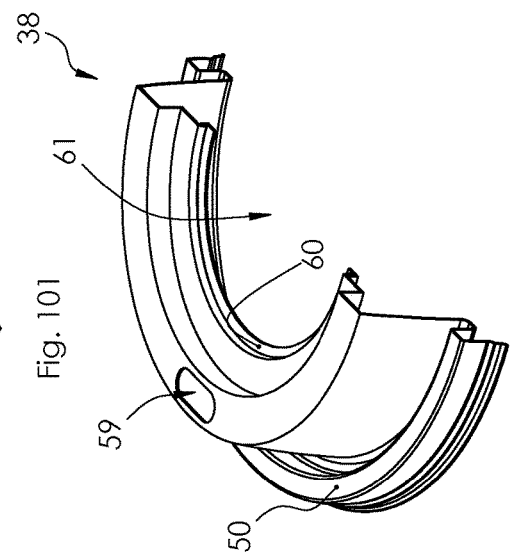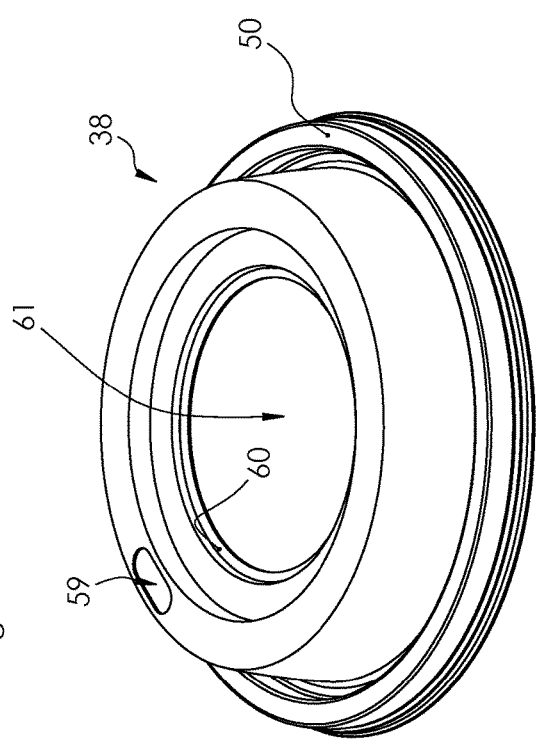

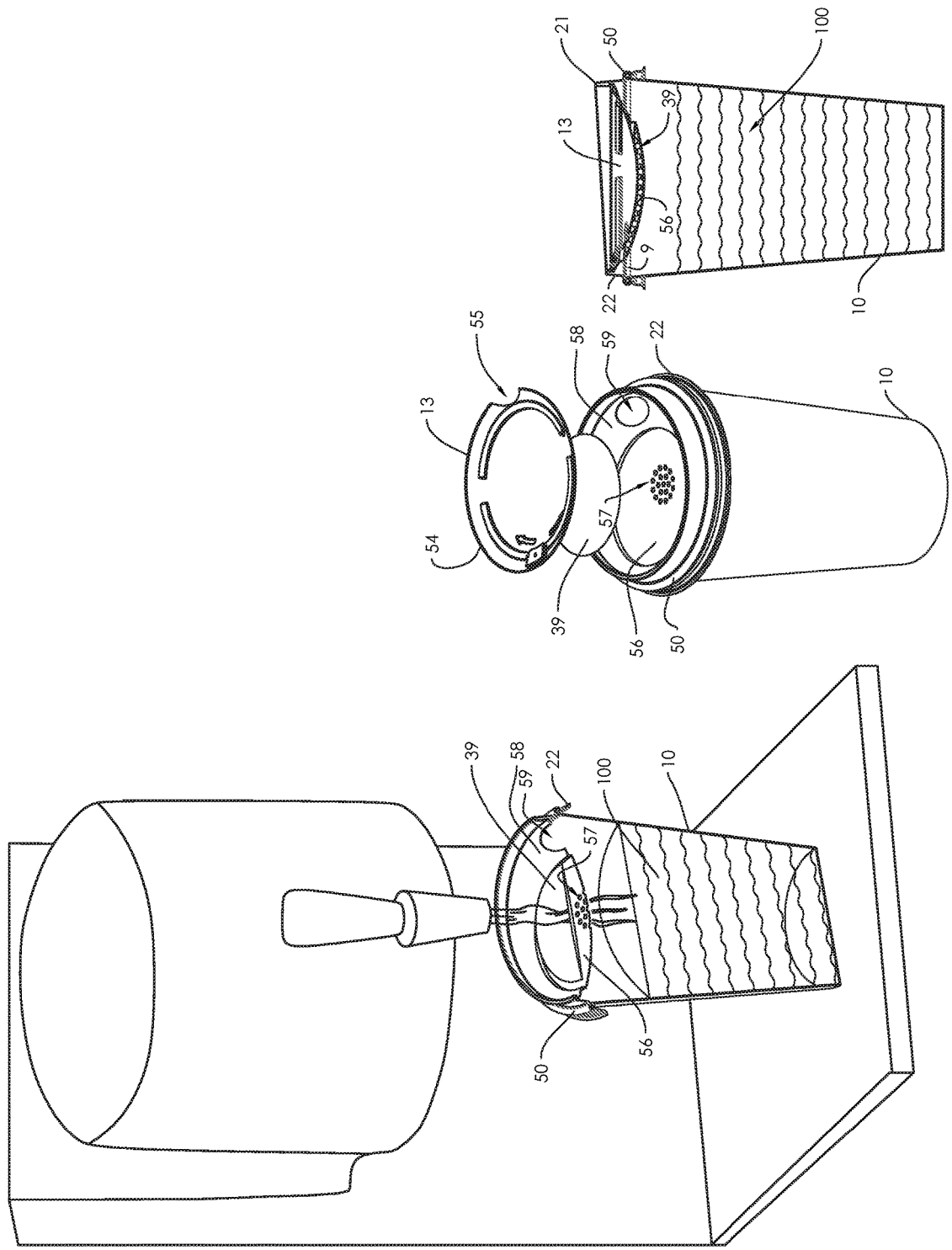

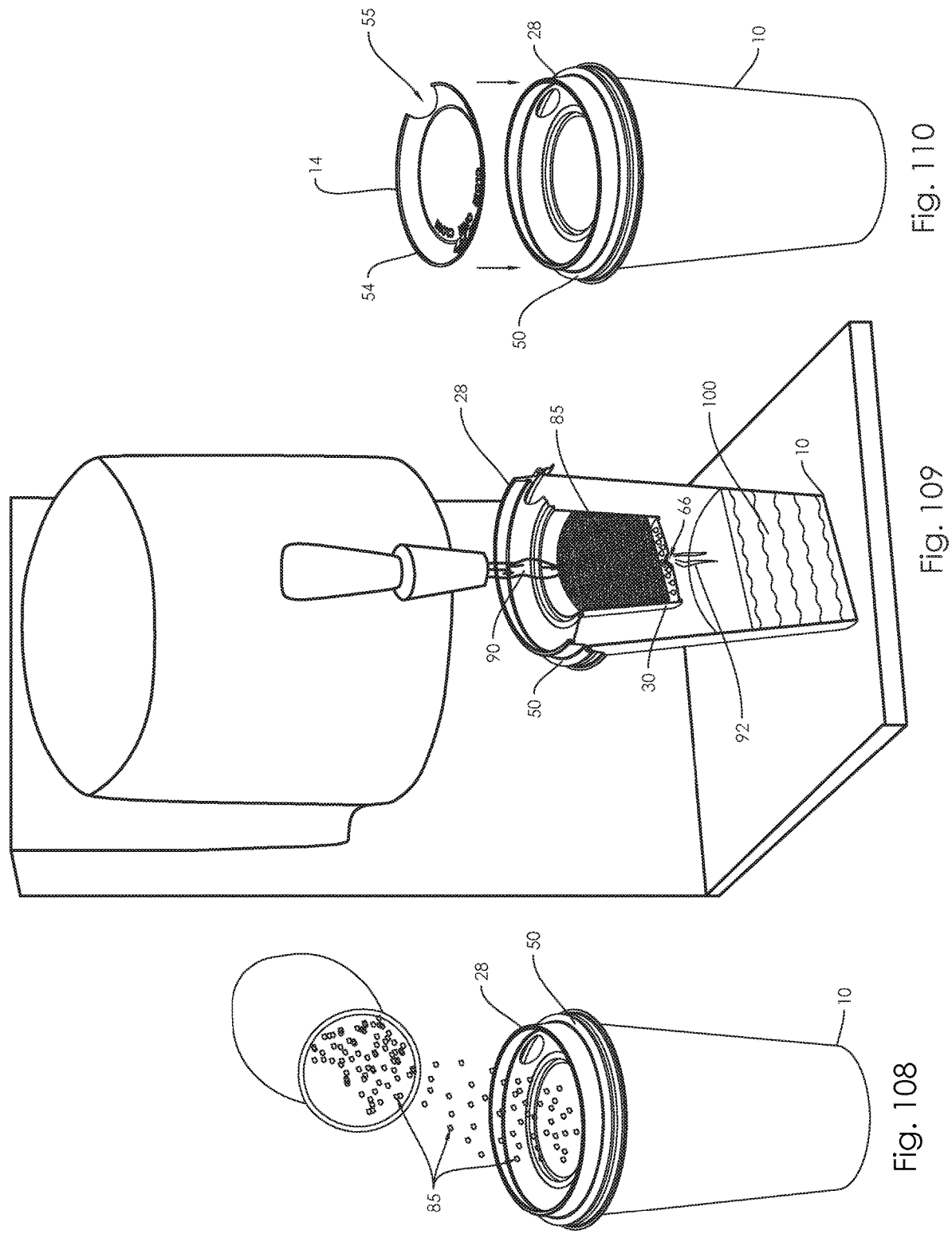

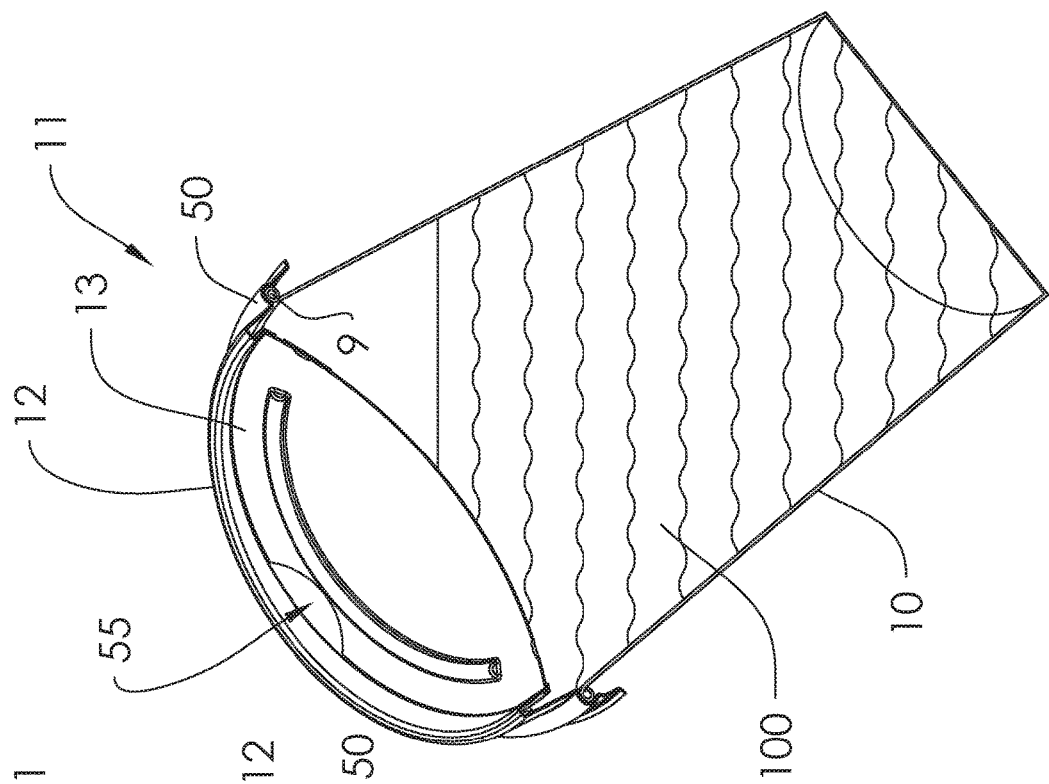
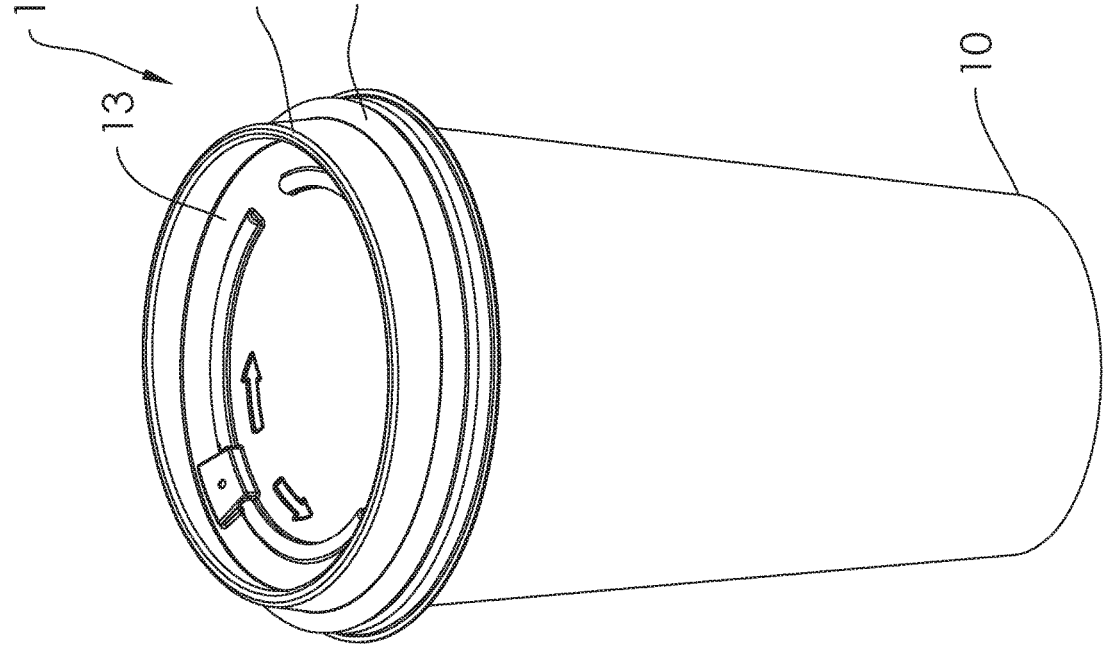
Fig. 118
Fig. 117

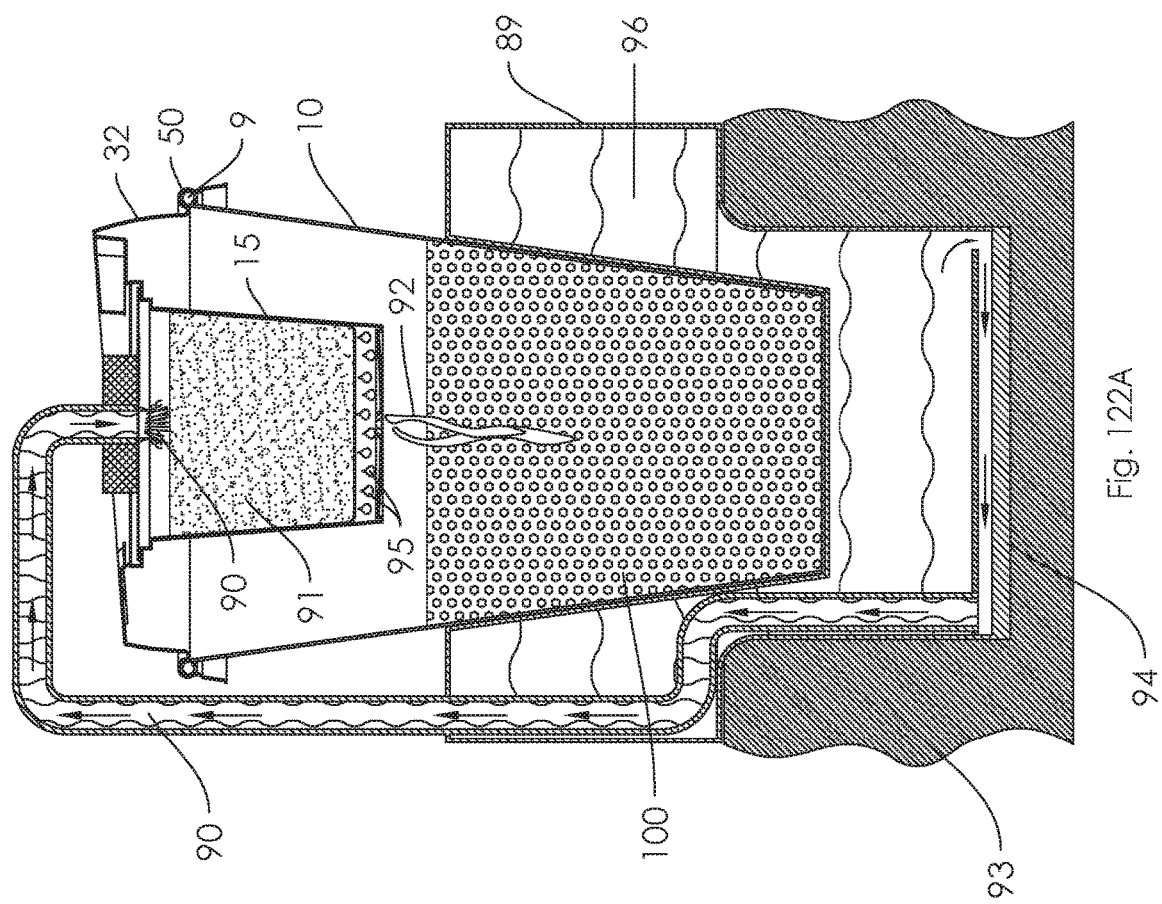
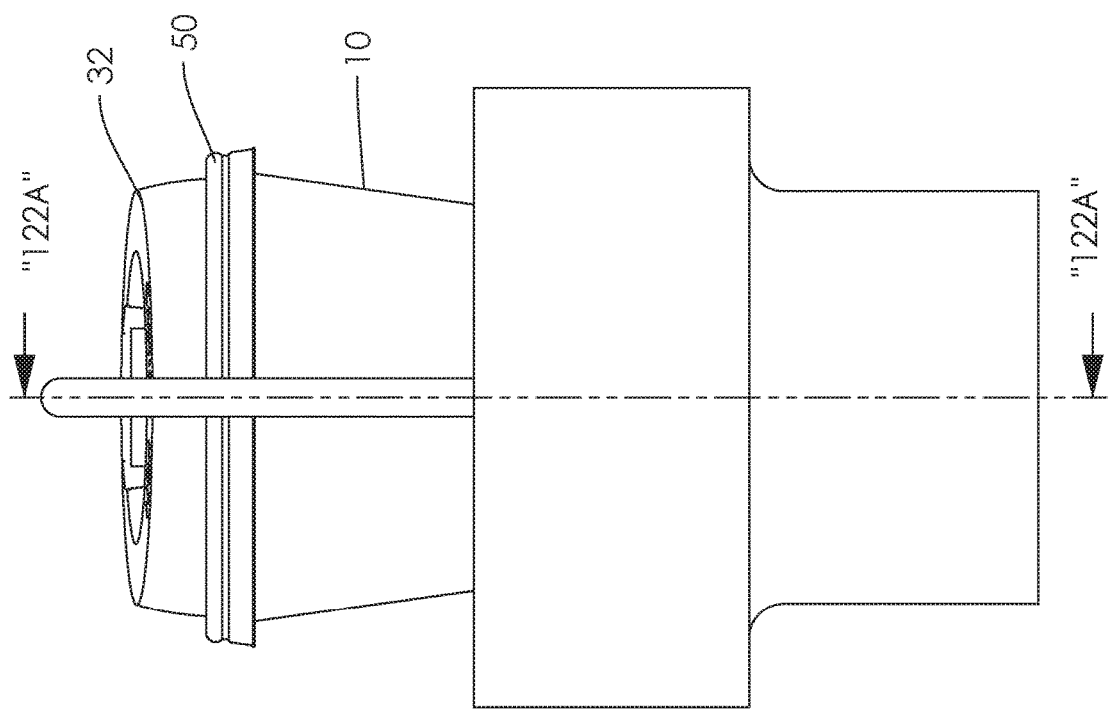
Fig. 122A
Fig. 122

LIQUID CONTAINER LID ASSEMBLY

PRIOR HISTORY

This application claims the benefit of U.S. Provisional Patent Application No. 62/599,585 filed in the United States Patent and Trademark Office on 15 Dec. 2017.

BACKGROUND OF THE INVENTION

Field of the Invention

The present invention generally relates to a lid assembly for outfitting a liquid container. More particularly, the present invention relates to certain lid assembly variants for outfitting a liquid container exemplified by a coffee cup for enabling the user to selectively open and close the lid assembly to either allow or prevent liquid egression from the liquid container.

Brief Description of the Prior Art

The broad field of lids for hot beverage containers and hot beverage container assemblies inclusive of lid assemblies is well-developed. Some of the more pertinent prior is believed to be briefly described hereinafter. U.S. Pat. No. 5,873,493 ('493 patent), issued to Robinson, for example, discloses an Integrally Molded Measurer Dispenser. The '493 patent describes a closure providing a side wall having first and second distal ends, an inner surface and an outer perimeter. A cone-shaped divider projects inwardly and upwardly from a lower perimeter of the side wall and includes a drain-back orifice therethrough. The cone-shaped divider further includes an apex having an opening therethrough. The closure further provides a lid pivotally attached at an outer diameter thereof to the outer perimeter of the side wall first distal end by an integral hinge. The lid includes a shaped substantially conforming to the side wall perimeter.

U.S. Pat. No. 6,176,390 ('390 patent), which issued to Kemp, discloses a Container Lid with Cooling Reservoir. The '390 patent describes a container lid with a cooling reservoir for releasably covering a disposable cup containing a hot beverage. The cooling reservoir includes a side wall with a small opening to allow a small volume of the hot beverage to pass into the cooling reservoir in which the beverage sufficiently cools down to enable the consumer to sip the beverage.

U.S. Pat. No. 6,488,173 ('173 patent), issued to Milan, discloses a Beverage container lid having baffle arrangement for liquid cooling. The '173 patent describes a removable beverage container lid wherein the lid has a substantially enclosed space defined between an exterior cover and an interior cover. At least one inlet opening is formed in the interior cover directing a hot beverage to flow into the substantially enclosed space. Attached to the interior cover at the forward edge of the inlet opening is a partition or wall assembly having a height extending to be located substantially against the exterior cover and a length at least equal to the length of the inlet opening. Between the partition or wall assembly and the peripheral edge of the exterior cover is located a gap area. Connected with the gap area is a dispensing opening formed in the exterior cover. Hot beverage is required to flow around the partition or wall assembly and into the gap area prior to flowing through the dispensing opening exteriorly of a beverage container.

U.S. Pat. No. 7,448,510 ('510 patent), issued to Pavlopoulos, discloses a Cup Assembly having a Cooling Compartment. The '510 patent describes a cup assembly comprising a cup and a lid to define therebetween a first passage and a second passage to allow a liquid cooling compartment between the lid and the cup to be filled with liquid contained in the cup when the first passage is clear and the second passage is blocked and the liquid in the liquid cooling compartment is able to flow out of an outlet in communication with the liquid cooling compartment when the second passage is clear and the first passage is blocked.

United States Patent Application No. 2007/0062943, which was authored by Bosworth, Sr., describes a container lid for a cup-type beverage which includes within the lid a disc-shaped media in which the lid is adapted to be releasably affixed to the beverage container and where the lid is protected from the beverage within the container and wherein the disc may be removed from the lid and utilized for entertainment purposes.

United States Patent Application No. 2010/0264150, which was authored by Leon et al., describes a disposable beverage cup a disposable beverage cup that comprises a ledge between the cup's rim and the grasping portion of the cup that is commonly held in the user's hand. The ledge, which comprises a curb, a horizontal plane, and one or more indentations, acts as a barrier between the user's hand and other objects, preventing a lid that has been press fit onto the cup's rim from being dislodged. In order to remove the lid, the user must insert a finger and/or thumb into the indentation(s) and press upward on the lid. The cup has a contour between the ledge and the grasping portion with ergonomic features to increase the user's comfort in handling the cup.

United States Patent Application No. 2010/0320220, which was authored by Hussey et al., describes a plastic lid for a drinks container, for example, a coffee cup. The plastic lid is provided with an ancillary access facility in the form of an opening or a part of the lid easily removable to form an opening. The ancillary access facility allows a person to drink from the container without removal of the lid. After the ancillary access facility has been cleaned or de-contaminated it is protected by the application of a protective cover. The protective cover may have a variety of shapes, for example, it may cover the entire lid or it may cover only a selected part of the lid, for example, only the area of the lid involving the ancillary access facility. The protective cover protects the ancillary access facility from the inadvertent transfer of germs to the drinking area by the person dispensing the drinks as they push the lid down with their hands to seal the lid to the container top. The protective covers are arranged to be easily stripped from the lid by the application of mere finger pressure.

From a consideration of the foregoing, it will be noted that the prior art perceives a need for a low cost, disposable combination lid-insert ensemble or lid assembly for enabling the user to quickly and easily allow or prevent liquid egression from an outfitted container lid while simultaneously positioning a liquid permeable container relative to the liquid container. The prior art further perceives a need for lid-insert ensemble or lid assembly that allows users to fill liquid containers via a lower lid body while attached to a liquid container and successively outfit the lower lid body with an upper lid body insert that may be manually operated to selectively open and close the lid assembly as summarized in more detail hereinafter.

SUMMARY OF THE INVENTION

To achieve the aforementioned and other readily apparent objectives, the present invention essentially discloses certain lid assemblies for outfitting a liquid container exemplified by a disposable coffee or tea container. Certain variants of the lid assemblies according to the present invention may be said to essentially comprise, in combination, a lid body and a lid body insert. The lid bodies according to the present invention all preferably comprise a rim-receiving groove and some form of an object-supportive depression formed radially inward of the rim-receiving groove.

In a first lid assembly embodiment, an annular insert-supportive depression of the lower lid body is provided, which annular insert-supportive depression further provides or defines a primary liquid-letting aperture for enabling both liquid ingression and liquid egression therethrough while the rim-receiving groove enables the user to attach the lid body to a container rim of the liquid container. Liquid may easily be directed into the liquid container via the lower lid body via the relatively large primary liquid-letting aperture before the lid body insert is assembled therewith.

The lid body insert is receivable in and supportable by the insert-supportive depression and comprises a secondary liquid-letting aperture and an insert axis. The lid body insert is rotatable about the insert axis intermediate open and closed lid body insert positions such that the secondary liquid-letting aperture is rotatably positionable in superior adjacency to the primary liquid-letting aperture when in an open lid body insert position for enabling liquid egression via both the primary and secondary liquid-letting apertures, and rotatably re-positionable relative to the primary liquid-letting aperture for preventing liquid egression via the lid assembly.

In the first lid assembly, the lid body preferably further comprises a lid body axis and the annular insert-supportive depression comprises a depression axis. The lid body axis and the depression axis are parallel to one another. Noting that the primary liquid-letting aperture is defined by a lower inner rim of the annular insert-supportive depression, the primary and secondary liquid-letting apertures are cooperative for providing a phased liquid-letting aperture. In this regard, the lid body insert is rotatably positionable relative to the lid body such that the phased liquid-letting aperture waxes and wanes intermediate fully open and fully closed phased liquid-letting aperture configurations depending on directed degrees of rotation of the lid body insert relative to the lower inner rim of the lower lid body.

In a second lid assembly embodiment, an annular insert-supportive depression is again provided, which annular insert-supportive depression further provides or comprises a primary liquid-letting aperture for primarily enabling liquid egression therethrough while the rim-receiving groove enables the user to attach the lid body to a container rim of the liquid container. The lid body insert is receivable in and supportable by the insert-supportive depression and comprises a secondary liquid-letting aperture and an insert axis. The lid body insert is rotatable about the insert axis intermediate open and closed lid body insert positions such that the secondary liquid-letting aperture is rotatably positionable in superior adjacency to the primary liquid-letting aperture when in an open lid body insert position for enabling liquid egression via both the primary and secondary liquid-letting apertures, and rotatably re-positionable in lateral adjacency to the primary liquid-letting aperture for preventing liquid egression via the lid assembly.

In the second lid assembly embodiment, a liquid return or secondary depression depends from the annular insert-supportive depression. In this embodiment, the lid body again comprises a lid body axis, and the liquid return or secondary depression comprises a return depression axis. The lid body and return depression axes are parallel to one another such that the liquid return or secondary depression is centrally offset relative to the rim-receiving groove thereby providing an offset annular region of the insert-supportive depression. The primary liquid-letting aperture is formed in the offset annular region in anterior adjacency to the liquid return or secondary depression, which depression essentially comprises at least one return aperture for returning liquid to the liquid container via the lid body.

Liquid permeable matter as exemplified by coffee or tea or a packet type liquid permeable container or a cup type liquid permeable container is receivable intermediate the liquid return depression and the lid body insert. The lid assembly thus further functions to position the liquid-permeable matter relative to the liquid container through which matter liquid (e.g. water) may be directed for further delivery to the liquid container. The lid assembly may further provide a lid body comprising an insert edge-retention track and a lid body insert comprising an outer insert edge. The outer insert edge is insertable into the insert edge-retention track when the lid body insert is received in and supported by the annular insert-supportive depression, the cooperative association of which enables both rotation of the lid body insert relative to the lid body and prevention of inadvertent removal of the lid body insert from the lid body.

Certain lid assembly embodiments according to the present invention outfit a liquid container and further position a liquid-permeable container (exemplified by the cup type single-serve liquid permeable pod or container assembly) relative to the outfitted liquid container. These lid assembly embodiments may be said to essentially or basically comprise a uniquely configured lid body comprising a rim-receiving groove, an object-supportive depression, and a primary liquid-letting aperture. The primary liquid-letting aperture enables liquid egression from the liquid container, and the object-supportive depression both support the liquid permeable container and defines a tertiary liquid-letting aperture. The tertiary liquid-letting aperture enables liquid egression from the liquid permeable container into the liquid container, and the rim-receiving groove attaches the lid body to a container rim of the liquid container.

Certain lid assembly embodiments according to the present invention provide an object-supportive depression comprising a container edge-retention track. The container edge-retention track receives and retains a container edge of the liquid-permeable container and prevents inadvertent removal thereof from the lid body. The object-supportive depression is preferably formed radially inwardly of the rim-receiving groove thereby forming an annular lid body region intermediate the object-supportive depression and the rim-receiving groove. In certain embodiments, the primary liquid-letting aperture is formed in the annular lid body region. The lid body may further preferably comprise a liquid spillway in anterior adjacency to the primary liquid-letting aperture characterized by a central spillway portion and laterally opposed guideways, the laterally opposed guideways for directing egressing liquid toward the central spillway portion.

In at least one lid assembly embodiment according to the present invention, an annular lid body insert interface is provided. The annular lid body insert interface is receivable and supportable by the lid body in superior adjacency to the object-supportive depression and comprises an outer insert edge, a secondary liquid-letting aperture, an insert axis, and a container-receiving aperture. The container receiving aperture receives the liquid permeable container thereby interfacing between the lid body and the liquid permeable container. The outer insert edge is insertable into an insert edge-retention track formed in the lid body, and the annular lid body insert interface is rotatable about the insert axis intermediate open and closed lid positions. As with all secondary liquid-letting apertures of all lid body inserts, the secondary liquid-letting aperture is rotatably positionable in superior adjacency to the primary liquid-letting aperture when in an open lid position for enabling liquid egression via both the primary and secondary liquid-letting apertures, and rotatably re-positionable relative to the primary liquid-letting aperture for preventing liquid egression via the lid assembly.

In this last regard, all lid body inserts according to the present invention are generally receivable and supportable by the lid body in superior adjacency to an object-supportive depression and comprise at least a secondary liquid-letting aperture and an insert axis. The lid body inserts are all rotatable about the insert axis intermediate open and closed lid positions such that the secondary liquid-letting aperture is rotatably positionable either in superior adjacency to the primary liquid-letting aperture when in an open lid position for enabling liquid egression or in lateral adjacency to the primary liquid-letting aperture for preventing liquid egression via the lid assembly. The lid body insert may further comprise an outer insert edge insertable into an optional insert edge-retention track as at 52 formed in the lid body.

The lid body insert may further provide or comprise an insert depression for covering an upper portion of the liquid permeable container. Further, a liquid permeable container cover may be provided in those embodiments where an upper lid body formation is integrally formed with bottom portions of a liquid permeable container. The liquid permeable container cover may be received and supported in superior adjacency to the bottom portions of the liquid permeable container via a cover-supportive formation formed in the lid body insert.

Certain lid assembly embodiments outfit a liquid container and essentially comprise or provide a lid body having a rim-receiving groove, a primary object-supportive depression as variously exemplified, a secondary object-supportive depression as variously exemplified, and a primary liquid-letting aperture as variously exemplified. The primary liquid-letting aperture enables liquid egression from the liquid container, and the secondary object-supportive depression may direct liquid toward a tertiary liquid-letting aperture formed therein, which tertiary liquid-letting aperture outlets media-permeated, flavor-infused liquid into the liquid container via the lid body. The rim-receiving groove attaches the lid body to a container rim of the liquid container.

A lid body insert may be received and supported by the primary object-supportive depression in superior adjacency to the secondary object-supportive depression. The lid body insert essentially comprises a secondary liquid-letting aperture and an insert axis such that the lid body insert is rotatable about the insert axis intermediate open and closed lid positions. The secondary liquid-letting aperture is rotatably positionable in superior adjacency to the primary liquid-letting aperture when in an open lid position for enabling liquid egression via both the primary and secondary liquid-letting apertures, and rotatably re-positionable relative to the primary liquid-letting aperture for preventing liquid egression via the lid assembly. The lid body insert may preferably comprise an insert depression for covering the secondary object-supportive depression.

BRIEF DESCRIPTIONS OF THE DRAWINGS

Other features of the invention will become more evident from a consideration of the following brief descriptions of patent drawings:

FIG. 1 is a top perspective view of a first lower lid body according to the present invention.

FIG. 2 is a top plan view of the first lower lid body according to the present invention.

FIG. 3 is a medial type cross-sectional view of the first lower lid body according to the present invention.

FIG. 14 is a medial type cross-sectional view of the first lid embodiment ensemble or lid assembly according to the present invention as sectioned from FIG. 11 from a lateral view to show in greater detail structures otherwise obscured by lateral portions of the first lid embodiment ensemble or lid assembly in the fully closed configuration.

FIG. 14A is an enlarged, fragmentary sectional view as enlarged and sectioned from FIG. 14 to show in still greater clarity structural details of anterior portions of the first lid embodiment ensemble or lid assembly.

FIG. 14B is an enlarged, fragmentary sectional view as enlarged and sectioned from FIG. 14 to show in still greater clarity structural details of posterior portions of the first lid embodiment ensemble or lid assembly.

FIG. 15 is a top perspective view of the first upper lid body insert according to the present invention.

FIG. 16 is a top plan view of the first upper lid body insert according to the present invention.

FIG. 17 is a medial cross-sectional view as sectioned from FIG. 16 to show further details of the first upper lid body insert according to the present invention.

FIG. 18 is a frontal cross-sectional view as sectioned from FIG. 16 to show further details of the first upper lid body insert according to the present invention.

FIG. 24 is a frontal type cross-sectional view of the second lower lid body according to the present invention as sectioned from FIG. 20 from an anterior view to show in greater detail structures otherwise obscured by anterior portions of the second lower lid body.

FIG. 24A is an enlarged, fragmentary sectional view as enlarged and sectioned from FIG. 24 to show in still greater clarity structural details of central posterior portions of the second lower lid body.

FIG. 25 is an enlarged, fragmentary sectional view as enlarged and sectioned from FIG. 24 to show in still greater clarity structural details of right lateral portions of the second lower lid body.

FIG. 30 is a medial type cross-sectional view of the second lid embodiment ensemble or lid assembly according to the present invention as sectioned from FIG. 27 from a lateral view to show in greater detail structures otherwise obscured by lateral portions of the second lower lid body.

FIG. 30A is an enlarged, fragmentary sectional view as enlarged and sectioned from FIG. 30 to show in still greater clarity structural details of anterior portions of the second lid embodiment ensemble or lid assembly in the fully open configuration.

FIG. 30B is an enlarged, fragmentary sectional view as enlarged and sectioned from FIG. 30 to show in still greater clarity structural details of posterior portions of the second lid embodiment ensemble or lid assembly in the fully open configuration.

FIG. 31 is a frontal type cross-sectional view of the second lid embodiment ensemble or lid assembly according to the present invention as sectioned from FIG. 27 from an anterior view to show in greater detail structures otherwise obscured by anterior portions of the second lid embodiment ensemble or lid assembly.

FIG. 31A is an enlarged, fragmentary sectional view as enlarged and sectioned from FIG. 31 to show in still greater clarity structural details of left lateral portions of the second lid embodiment ensemble or lid assembly.

FIG. 31B is an enlarged, fragmentary sectional view as enlarged and sectioned from FIG. 31 to show in still greater clarity structural details of central posterior portions of the second lid embodiment ensemble or lid assembly.

FIG. 32 is a top posterior perspective view of a third lower lid body according to the present invention.

FIG. 33 is a top plan view of the third lower lid body according to the present invention.

FIG. 34 is a medial type cross-sectional view of the third lower lid body according to the present invention as sectioned from FIG. 33 from a lateral view to show in greater detail structures otherwise obscured by lateral portions of the third lower lid body.

FIG. 35 is a frontal type cross-sectional view of the third lower lid body according to the present invention sectioned from a posterior view to show in greater detail structures otherwise obscured by posterior portions of the third lower lid body.

FIG. 38 is a frontal type cross-sectional view of the fourth lower lid body according to the present invention sectioned from FIG. 37 from a posterior view to show in greater detail structures otherwise obscured by posterior portions of the fourth lower lid body.

FIG. 38A is an enlarged, fragmentary sectional view as enlarged and sectioned from FIG. 38 to show in still greater clarity structural details of right lateral portions of the fourth lower lid body.

FIG. 39 is a medial type cross-sectional view of the fourth lower lid body according to the present invention sectioned from a lateral view to show in greater detail structures otherwise obscured by lateral portions of the fourth lower lid body.

FIG. 39A is an enlarged, fragmentary sectional view as enlarged and sectioned from FIG. 39 to show in still greater clarity structural details of posterior portions of the fourth lower lid body.

FIG. 39B is an enlarged, fragmentary sectional view as enlarged and sectioned from FIG. 39 to show in still greater clarity structural details of anterior portions of the fourth lower lid body.

FIG. 40 is an exploded perspective view of from bottom to top, a tall container, a fourth lower lid body, and a single-serve, liquid permeable pod or container assembly.

FIG. 41 is a perspective view of a tall container, a fourth lower lid body, and a single-serve, liquid permeable pod or container assembly in assembled relation.

FIG. 46 is a medial type cross-sectional view as sectioned from FIG. 45 to show in greater detail lateral portions of the fifth lower lid body.

FIG. 46A is an enlarged, fragmentary sectional view as enlarged and sectioned from FIG. 46 to show in still greater clarity structural details of anterior portions of the structures there depicted.

FIG. 46B is an enlarged, fragmentary sectional view as enlarged and sectioned from FIG. 46 to show in still greater clarity structural details of posterior portions of the structures there depicted.

FIG. 47 is a frontal type cross-sectional view as sectioned from FIG. 45 to show in greater detail lateral portions of the fifth lower lid body.

FIG. 47A is an enlarged, fragmentary sectional view as enlarged and sectioned from FIG. 47 to show in still greater clarity structural details of left lateral portions of the structures there depicted.

FIG. 47B is an enlarged, fragmentary sectional view as enlarged and sectioned from FIG. 47 to show in still greater clarity structural details of central posterior portions of the structures there depicted.

FIG. 50 is a medial type cross-sectional view as sectioned from FIG. 49 to show in greater detail lateral portions of the third lid embodiment ensemble or lid assembly according to the present invention in the closed configuration.

FIG. 50A is an enlarged, fragmentary sectional view as enlarged and sectioned from FIG. 50 to show in still greater clarity structural details of anterior portions of the third lid embodiment ensemble or lid assembly there depicted.

FIG. 50B is an enlarged, fragmentary sectional view as enlarged and sectioned from FIG. 50 to show in still greater clarity structural details of posterior portions of the third lid embodiment ensemble or lid assembly there depicted.

FIG. 61 is a posterior top perspective view of the first alternative upper insert-covered containment vessel in exploded relation with the fifth lower lid body in assembled relation with a tall container.

FIG. 62 is a medial type cross-sectional view as sectioned from FIG. 61 to show in greater detail lateral portions of the first alternative upper insert-covered containment vessel in exploded relation with the fifth lower lid body in assembled relation with a tall container.

FIG. 69 is an exploded top perspective view of the third upper lid body insert in exploded relation with an uncovered first containment vessel.

FIG. 70 is a top perspective view of the third upper lid body insert in assembled relation with the first containment vessel forming a second alternative upper insert-covered containment vessel.

FIG. 71 is an anterior elevational view of the second alternative upper insert-covered containment vessel.

FIG. 72 is a medial type cross-sectional view as sectioned from FIG. 71 to show in greater detail lateral portions of the second alternative upper insert-covered containment vessel.

FIG. 72A is an enlarged, fragmentary sectional view as enlarged and sectioned from FIG. 72 to show in greater clarity structural details of posterior portions of the structures there depicted.

FIG. 73 is a top perspective view of the second alternative upper insert-covered containment vessel with the first containment vessel being shown in cross-section.

FIG. 76 is a top perspective view of a partial second lid body insert-container combination depicting a combination bottom with upper spacer protuberances for supporting a filter portion in elevated relation relative to the combination bottom.

FIG. 77 is an anterior elevational view of a partial second lid body insert-container combination depicting a combination bottom with upper spacer protuberances for supporting a filter portion in elevated relation relative to the combination bottom.

FIG. 78 is an anterior elevational view of the second lid body insert-container combination according to the present invention.

FIG. 79 is a medial type cross-sectional view as sectioned from FIG. 78 to show in greater detail lateral portions of the second lid body insert-container combination according to the present invention.

FIG. 80 is a top perspective view of a first lower lid body-container combination according to the present invention, a cylindrical container type lower being integrally formed with a lid lower body to form the first lower lid body-container combination.

FIG. 81 is an anterior elevational view of the first lower lid body-container combination according to the present invention.

FIG. 82 is a medial type cross-sectional view as sectioned from FIG. 81 to show in greater detail lateral portions of the first lower lid body-container combination according to the present invention.

FIG. 82A is an enlarged, fragmentary sectional view as enlarged and sectioned from FIG. 82 to show in greater clarity structural details of anterior portions of the structures there depicted.

FIG. 84 is a top perspective view of a series of stacked first lower lid body-container combinations according to the present invention.

FIG. 85 is an anterior elevational view of a series of stacked first lower lid body-container combinations according to the present invention.

FIG. 86 is a medial type cross-sectional view as sectioned from FIG. 85 to show in greater detail lateral portions of the series of stacked first lower lid body-container combinations according to the present invention.

FIG. 87 is a top perspective view of a fourth lid embodiment ensemble or lid assembly with third upper lid body insert and fifth lower lid body according to the present invention.

FIG. 88 is an anterior elevational view of the fourth lid embodiment ensemble or lid assembly according to the present invention.

FIG. 89 is a medial type cross-sectional view as sectioned from FIG. 88 to show in greater detail lateral portions of the fourth lid embodiment ensemble or lid assembly according to the present invention.

FIG. 89A is an enlarged, fragmentary sectional view as enlarged and sectioned from FIG. 89 to show in greater clarity structural details of anterior portions of the structures there depicted.

FIG. 89B is an enlarged, fragmentary sectional view as enlarged and sectioned from FIG. 89 to show in greater clarity structural details of posterior portions of the structures there depicted.

FIG. 92 is a top perspective view of a second lower lid body-container combination according to the present invention, a conical container type lower being integrally formed with a lid lower body to form the second lower lid body-container combination.

FIG. 93 is an anterior elevational view of the second lower lid body-container combination according to the present invention.

FIG. 94 is a medial type cross-sectional view as sectioned from FIG. 93 to show in greater detail lateral portions of the second lower lid body-container combination according to the present invention.

FIG. 94A is an enlarged, fragmentary sectional view as enlarged and sectioned from FIG. 94 to show in greater clarity structural details of anterior portions of the structures there depicted.

FIG. 95 is a top exploded perspective view of the second lower lid body-container combination according to the present invention in exploded relation relative to a tall container and the second upper lid body insert.

FIG. 96 is an anterior exploded view of the second lower lid body-container combination according to the present invention in exploded relation relative to a tall container and the second upper lid body insert.

FIG. 97 is a top perspective view of a series of stacked second lower lid body-container combinations according to the present invention.

FIG. 98 is an anterior elevational view of a series of stacked second lower lid body-container combinations according to the present invention.

FIG. 99 is a medial type cross-sectional view as sectioned from FIG. 98 to show in greater detail lateral portions of the series of stacked second lower lid body-container combinations according to the present invention.

FIG. 100 is a first top perspective of a sectioned sixth lower lid body according to the present invention with a sectioned state of the art single-serve, liquid permeable pod or container assembly in assembled relation therewith.

FIG. 101 is a second top perspective of a sectioned sixth lower lid body according to the present invention with a sectioned state of the art single-serve, liquid permeable pod or container assembly in assembled relation therewith.

FIG. 102 is a top perspective of a sixth lower lid body according to the present invention for accommodatingly receiving a state of the art single-serve, liquid permeable pod or container assembly.

FIG. 103 is a top perspective of a sectioned sixth lower lid body according to the present invention for accommodatingly receiving a state of the art single-serve, liquid permeable pod or container assembly.

FIG. 105 is a top perspective view of a second lower lid according to the present invention in assembled relation with a tall container in a first condition of use with a single-serve liquid permeable pod or container assembly with parts broken away to show otherwise hidden features associated with the first condition of use.

FIG. 106 is an exploded perspective view of the second lid embodiment ensemble or lid assembly according to the present invention with the second lower lid body in assembled relation with a tall container and in exploded relation relative to a single-serve liquid permeable pod or container assembly.

FIG. 107 is a sectional view of the second lid embodiment ensemble or lid assembly according to the present invention in assembled relation with a tall container in the first condition of use shown with parts broken away to a single-serve liquid permeable pod or container assembly received intermediate the first upper lid body insert and the second lower lid body.

FIG. 108 is a perspective view of the fourth lower lid body according to the present invention in assembled relation with a tall container in a condition of use whereby material is being deposited into a containment vessel supported by the fourth lower lid body.

FIG. 109 is a perspective view of the fourth lower lid body according to the present invention in assembled relation with a tall container in a condition of use whereby liquid is being directed into the material contained within a containment vessel as supported by the fourth lower lid body with parts broken away to show otherwise hidden features associated with the condition of use.

FIG. 110 is an exploded perspective view of the second upper lid body insert and fourth lower lid body according to the present invention with fourth lower lid body being depicted in assembled relation with a tall container.

FIG. 117 is a top perspective view of the first lid embodiment ensemble or lid assembly as assembled atop a tall container in a closed configuration.

FIG. 118 is a cross-sectional perspective view of the first lid embodiment ensemble or lid assembly as assembled atop a tall container in a closed configuration in a fourth condition of use.

Figure 120A:
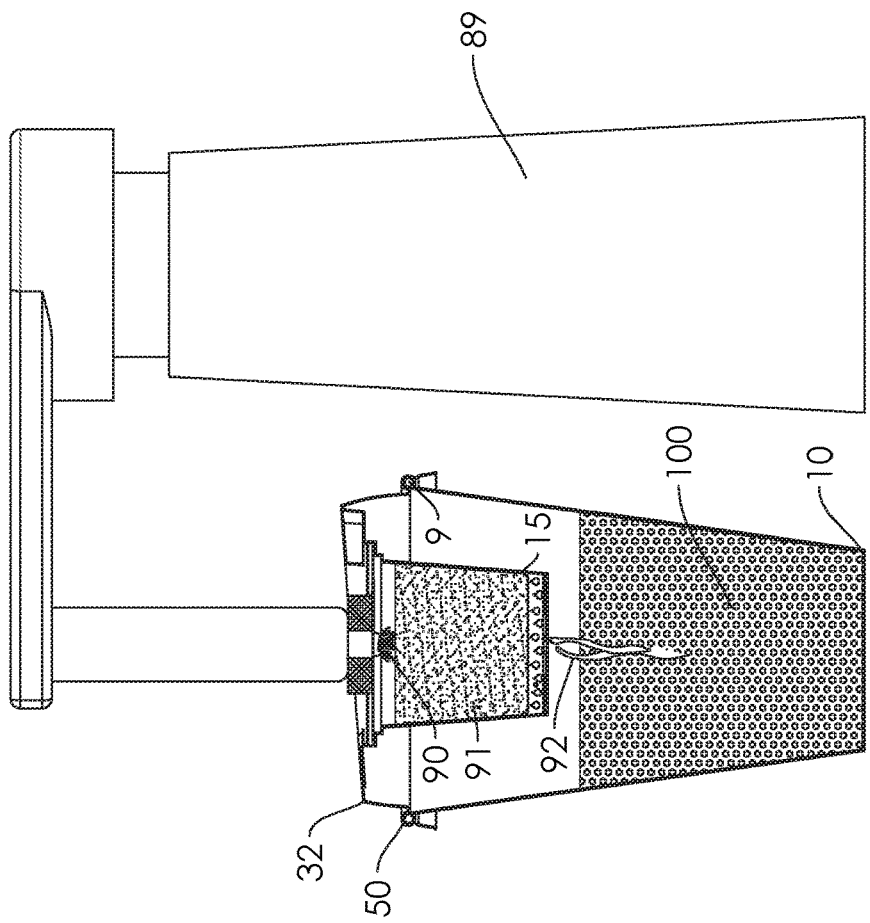
Figure 120:
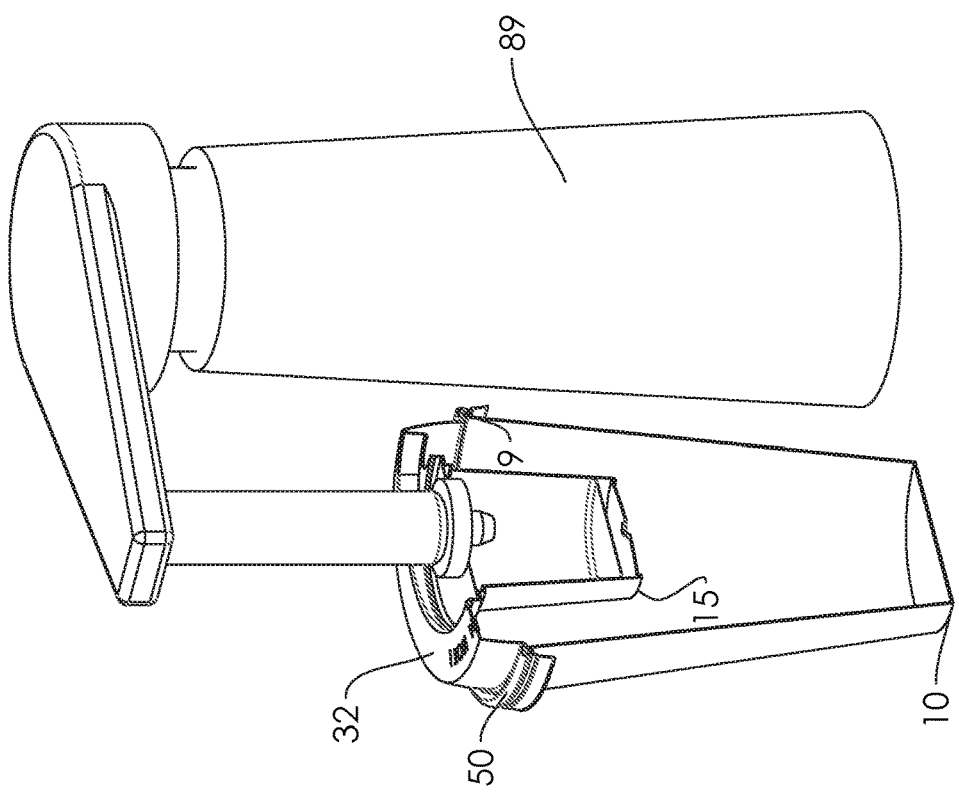

FIG. 120 is a first cross-sectional depiction of a tall container, the fourth lower lid body in assembled relation atop the tall container, and an empty single-serve, liquid permeable pod or container assembly supported by the fourth lower lid body, the view being presented in cross-section to show structural relationships of various parts prior to water delivery to the ensemble via the first water delivery mechanism.

FIG. 120A is a second cross-sectional depiction of the tall container, the fourth lower lid body in assembled relation atop the tall container, and a single-serve, liquid permeable pod or container assembly supported by the fourth lower lid body with parts broken away to show structural relationships of various parts during water delivery to the ensemble via the first water delivery mechanism.

Figures 121, 121A:
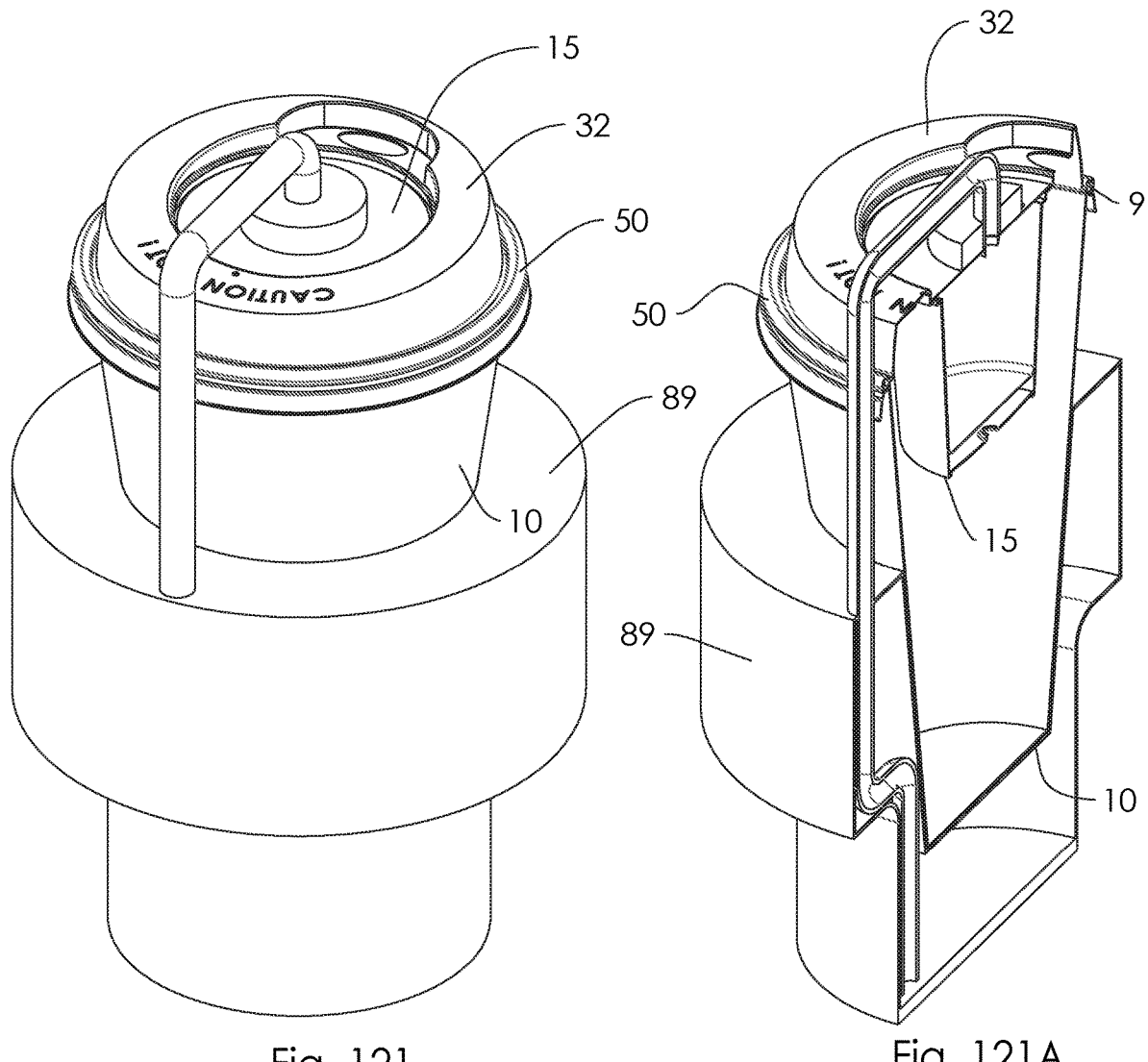

FIG. 121 is a perspective depiction of the tall container, the fourth lower lid body in assembled relation atop the tall container, and a single-serve, liquid permeable pod or container assembly supported by the fourth lower lid body prior to water delivery to the ensemble via a second water delivery mechanism.

FIG. 121A is a cross-sectional perspective depiction of the tall container, the fourth lower lid body in assembled relation atop the tall container, and an empty single-serve, liquid permeable pod or container assembly supported by the fourth lower lid body, the view being presented in cross-section to show structural relationships of various parts prior to water delivery to the ensemble via the second water delivery mechanism.

FIG. 122 is a posterior elevational depiction of the tall container, the fourth lower lid body in assembled relation atop the tall container and a single-serve, liquid permeable pod or container assembly supported by the fourth lower lid body during water delivery to the ensemble via the second water delivery mechanism.

FIG. 122A is a medial type cross-sectional depiction of the tall container, the fourth lower lid body in assembled relation atop the tall container and thee single-serve, liquid permeable pod or container assembly supported by the fourth lower lid body as sectioned from FIG. 122 to show structural relationships of various parts during water delivery to the ensemble via the second water delivery mechanism.

Figure 123A:
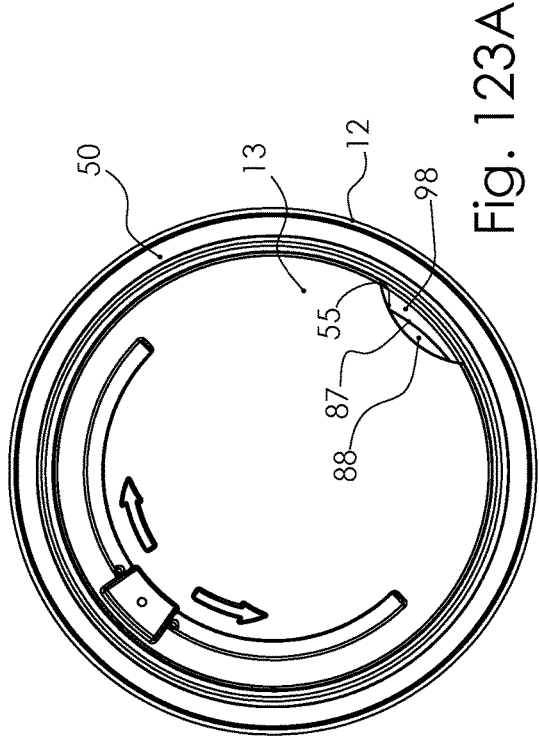
Figure 123B:
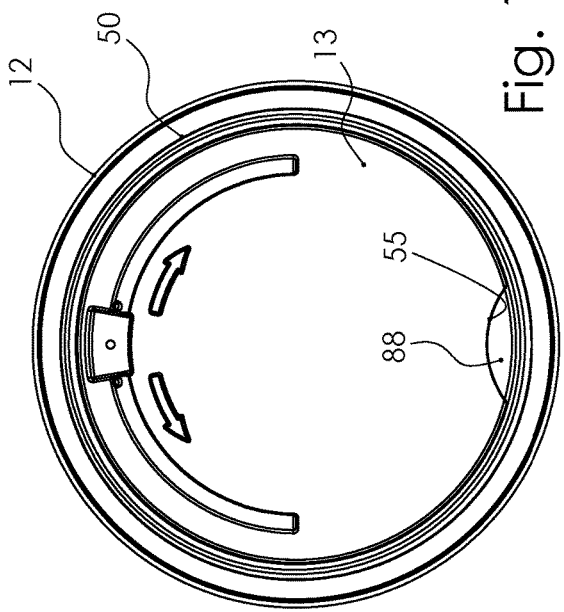
Figure 123:
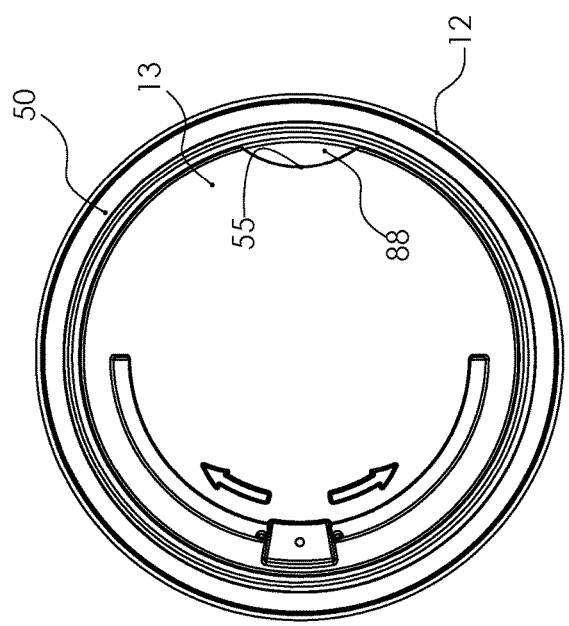

FIG. 123 is a first sequential top plan view of the first lid embodiment ensemble or lid assembly according to the present invention having an upper lid body insert with a relatively small secondary liquid-letting aperture in a fully closed lid configuration setting a reference position for a phased liquid-letting aperture position of the first lid embodiment ensemble or lid assembly.

FIG. 123A is a second sequential top plan view of the first lid embodiment ensemble or lid assembly according to the present invention having an upper lid body insert with a relatively small secondary liquid-letting aperture at a half closed phased liquid-letting aperture position at 45 rotational degrees from the reference position for the first lid embodiment ensemble or lid assembly.

FIG. 123B is a third sequential top plan view of the first lid embodiment ensemble or lid assembly according to the present invention having an upper lid body insert with a relatively small secondary liquid-letting aperture at a fully open phased liquid-letting aperture position at 90 rotational degrees from the reference position for the first lid embodiment ensemble or lid assembly.

Figure 124:
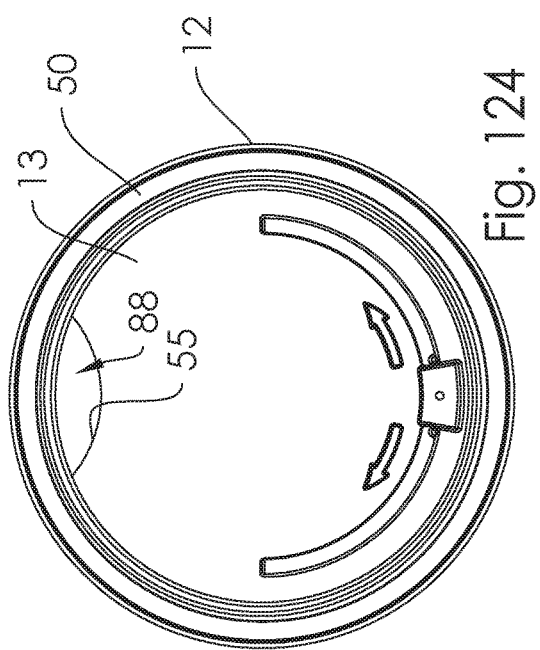

FIG. 124 is a first sequential top plan view of the first lid embodiment ensemble or lid assembly according to the present invention having an upper lid body insert with a relatively large secondary liquid-letting aperture in a fully closed lid configuration setting a reference position for a phased liquid-letting aperture position of the first lid embodiment ensemble or lid assembly.

Figure 124A:
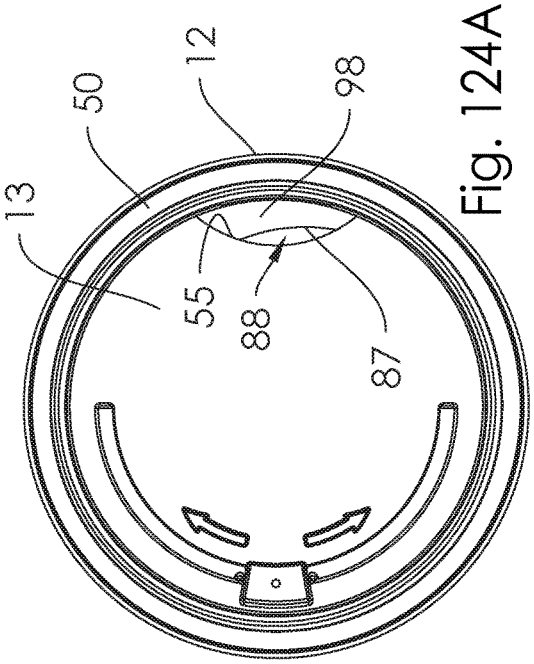

FIG. 124A is a second sequential top plan view of the first lid embodiment ensemble or lid assembly according to the present invention having an upper lid body insert with a relatively large secondary liquid-letting aperture at a first partially open phased liquid-letting aperture position at 90 rotational degrees from the reference position for the first lid embodiment ensemble or lid assembly.

Figure 124B:
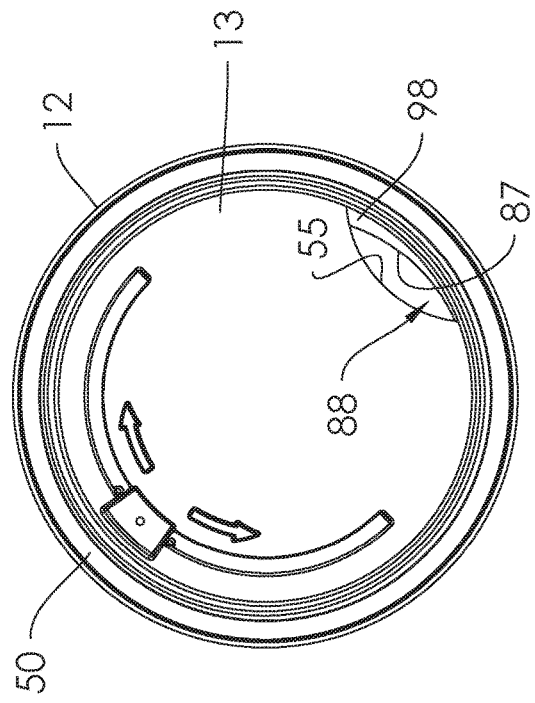

FIG. 124B is a second sequential top plan view of the first lid embodiment ensemble or lid assembly according to the present invention having an upper lid body insert with a relatively large secondary liquid-letting aperture at a second partially open phased liquid-letting aperture position at 135 rotational degrees from the reference position for the first lid embodiment ensemble or lid assembly.

Figure 124C:
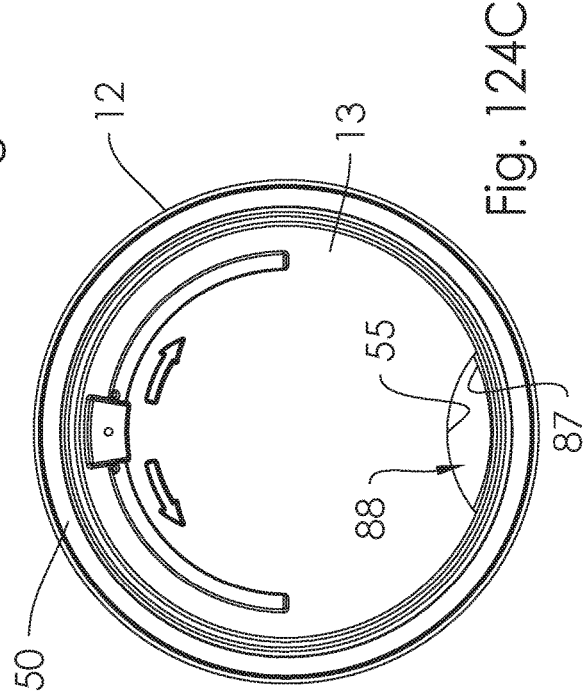

FIG. 124C is a third sequential top plan view of the first lid embodiment ensemble or lid assembly according to the present invention having an upper lid body insert with a relatively large secondary liquid-letting aperture at a fully open phased liquid-letting aperture position at 180 rotational degrees from the reference position for the first lid embodiment ensemble or lid assembly.

DETAILED DESCRIPTION OF THE PREFERRED EMBODIMENTS

Referring now to the drawings with more specificity, the preferred embodiments of the present invention primarily concern lid assemblies as variously exemplified for outfitting a liquid container as at 10. Certain lid assembly embodiments according to the present invention preferably comprise, in combination, a lower lid body as variously referenced at 12, 22, 22', 32, 42; and an upper lid body insert as alternatively referenced at 13 and 14. Certain other lid assembly embodiments provide an integrally formed lid body-container combination as variously referenced at 28 and 35 further usable in combination with a lid body insert as exemplified by lid body inserts 13 and 14. Certain lid body insert-container combinations are further contemplated as at embodiments 18 and 25.

Referencing FIGS. 1-3, the reader will there consider the first lower lid body 12 according to the present invention. Referencing FIGS. 4-7, the reader will there consider the first lower lid body 12 in assembled relation with the first upper lid body insert 13 thereby together forming a first lid embodiment ensemble or lid assembly 11 according to the present invention. The lower lid body 12 preferably comprises a rim-receiving groove as at 50, an annular insert-supporting depression as at 51, and an insert edge-retention track as at 52. The annular insert-supporting depression 51 provides or centrally defines a relatively large, primary liquid-letting aperture as at 53 for enabling both liquid ingression and liquid egression or passage therethrough. The rim-receiving groove 50 primarily functions to attach the lower lid body 12 to a container rim 9 of the liquid container 10 according to state of the art principles relatively well known in the industry.

The first upper lid body insert 13 is receivable in and supportable by the insert-supporting depression 51 and comprises an outer insert edge as at 54, a secondary liquid-letting aperture as at 55, and an insert axis as at 101. The outer insert edge 54 is insertable into the insert edge-retention track 52 when the first upper lid body insert 13 is received in and supported by the annular insert-supporting depression 51. The first upper lid body insert 13 is rotatable about the insert axis 101 intermediate open and closed lid body insert positions as respectively and comparatively depicted in FIGS. 4-9 versus FIGS. 10-14B.

The secondary liquid-letting aperture 55 is rotatably positionable in superior adjacency to the primary liquid-letting aperture 53 when in an open lid body insert position for enabling liquid egression via both the primary and secondary liquid-letting apertures 53 and 55. The secondary liquid-letting aperture 55 is further or rotatably re-positionable relative to the primary liquid-letting aperture 53 in lateral adjacency thereto for preventing liquid egression via the lid assembly 11 as portions of the annular insert-supporting depression 51 effectively cover or close the secondary liquid-letting aperture 55 when in the closed lid body insert position.

Referencing FIGS. 19-35, the reader will there consider a second lower lid body 22 and a slightly different third lower lid body 22' usable in combination with the first upper lid body insert 13 to form a second lid embodiment ensemble or lid assembly 21. It will be understood from a consideration of the figures that the second lower lid body 22 and the third lower lid body 22' of the lid assembly 21 both further comprise or provide a liquid return depression 56 that is integrally formed with and depends from the annular insert-supporting depression 51. The second and third lower lid bodies 22 and 22' may further comprise a lid body axis as depicted and referenced at 102, and the liquid return depression 56 may preferably comprise a return depression axis as depicted and referenced at 103.

The lid body and return depression axes 102 and 103 are preferably parallel to one another such that the liquid return depression 56 is centrally offset relative to the rim-receiving groove 50 thereby providing an offset annular region 58 of the insert-supporting depression 51 of the second and third lower lid bodies 22 and 22'. The primary liquid-letting aperture 59 of the second and third lower lid bodies 22 and 22' is formed in the offset annular region 58 in anterior adjacency to the liquid return depression 56. The liquid return depression 56 preferably comprises at least one liquid return aperture 57 for returning liquid 100 to the liquid container 10 via the lid bodies 22 and 22'. The second lower lid body 22 differs from third lower lid body 22' by incorporating relatively larger liquid return apertures 57 in the liquid return depression 56 of second lower lid body 22 as compared to the relatively smaller liquid return apertures 57' formed in the liquid return depression 56 of the third lower lid body 22'.

Referencing FIGS. 105-107 the reader will there consider a method of using the lid assembly 21. In this regard, a packet type, single-serve, liquid permeable pod or container assembly is generally depicted and referenced at 39 and received within the liquid return depression 56. Coffee or tea material 85 may be housed within the packet type single-serve, liquid permeable pod or container assembly 39 and when liquid (e.g. water) is directed therethrough, outletting liquid is coffee-infused or tea-infused liquid as it returns to the liquid container 10 via the apertures 57 or 57'. Comparatively referencing FIG. 106 versus FIG. 107, the reader will there note that the packet type single-serve, liquid permeable pod or container assembly 39 may be housed intermediate the lower lid bodies 22 and 22' and the first upper lid body insert 13 within a compartment defined, in part, by the lower liquid return depression 56 and the upper lid body insert 13.

The lid assembly 21 incorporating the third lower lid body 22' is generally depicted in FIGS. 32-35 and is very similar to the lid assembly 21 incorporating the second lower lid body 22 but for the size of the apertures 57' and 57. The relatively smaller apertures 57' formed in the third lower lid body 22' enable the user to use tea or coffee material 85 without a bag or packet. The reader will note the liquid-letting return apertures 57' are significantly smaller in diameter as compared the relatively larger liquid-letting return apertures 57, and more akin to "needle pocks" to create the effect of a filter at secondary depression 56 of the third lower lid body 22'. The tea leaves or coffee ground material 85, being individually sized or dimensioned to be larger than the respective apertures 57', may be left squeezed between the upper lid body insert 13 and the bottom of the secondary depression 56 of the third lower lid body 22'.

Referencing FIGS. 19-35, the embodiments there generally depicted are designed to provide a secondary depression 56 to accommodate a tea or coffee bag otherwise referred to as a packet type single-serve liquid permeable pod or container assembly 39. The reader will note the secondary depression 56 could be made deeper to resemble the first lid body-container combination 28 generally depicted in FIGS. 80-86 or the second lid body-container combination 35 as generally depicted in FIGS. 92-99. The secondary depression 56 is moved rearward or posteriorly to accommodate the primary liquid-letting aperture 59. The off center position of the secondary depression 56 is optional; it could also be placed in the concentric position. Uses of these concepts are generally depicted in FIGS. 105-118.

The benefits of this lid assembly 21 include the tea/coffee bag or packet staying squeezed between the upper lid body insert 13 and the bottom of the secondary depression 56 even after brewing process ends. In many cases the tea/coffee bag or packet has no place to go after brewing and creates not only significant discomfort at the time of consumption, but also negatively effects taste of tea after tea bag is left in the cup for duration of consumption. There is an option to throw away such tea bag, but this tends to increase the chance of spillage. These problems are eliminated with lid assembly 21.

Referencing FIGS. 36-43B, the reader will there consider a fourth lower lid body 32 according to the present invention, which, when used in combination with a second upper lid body insert 14 according to the present invention, together form a lid assembly 31 for outfitting a liquid container 10 and positioning a cup type single-serve, liquid-permeable pod or container assembly 15 relative to the liquid container 10. The lid assembly 31 may be said to preferably comprise the fourth lower lid body 32 and the upper lid body insert 14. The fourth lower lid body 32 preferably comprises a rim-receiving groove 50, an object-supportive depression as at 60, and a primary liquid-letting aperture as at 59.

The primary liquid-letting aperture 59 primarily enables liquid egression from the liquid container 10. The object-supportive depression 60 supports the cup type single-serve liquid permeable pod or container assembly 15 and centrally defines a container wall-receiving or tertiary liquid-letting aperture as at 61. The tertiary liquid-letting aperture 61 receives the cup type, single-serve, liquid permeable pod or container assembly 15, and the liquid permeable pod or container assembly 15, containing coffee, tea, or some similar type of liquid-permeable media, outlets media-permeated, flavor-infused liquid into the liquid container 10. The rim-receiving groove 50 attaches the fourth lower lid body 32 to a container rim 9 of the liquid container 10. The object-supportive depression as at 60 may preferably comprise a container edge-retention track as at 62. The container edge-retention track 62 receives and retains a container edge 63 of the cup type single-serve liquid permeable pod or container assembly 15 (or more succinctly: liquid permeable container 15) and prevents inadvertent removal thereof from the fourth lower lid body 32.

Referencing FIGS. 44-56, the reader will there consider a fifth lower lid body 42 according to the present invention, which, when used in combination with the second upper lid body insert 14 according to the present invention, together form a lid assembly 41 for outfitting a liquid container 10 and also positioning a cup type, single-serve, liquid-permeable pod or container assembly 15 relative to the liquid container 10. The lid assembly 41 may be said to preferably comprise the fifth lower lid body 42 and the upper lid body insert 14. The fifth lower lid body 42 preferably comprises a rim-receiving groove 50, an object-supportive depression as at 60, a primary liquid-letting aperture as at 59, an insert-supportive depression as at 64, and an insert edge-retention track as at 52.

The primary liquid-letting aperture 59 enables liquid egression from the liquid container 10, and the object-supportive depression 60 supports the cup type, single-serve, liquid permeable pod or container assembly 15 and centrally defines a container wall-receiving or tertiary liquid-letting aperture as at 61. The tertiary liquid-letting aperture 61 receives the cup type, single-serve, liquid permeable pod or container assembly 15, and the liquid permeable pod or container assembly 15, containing coffee, tea, or some similar type of liquid-permeable media, outlets media-permeated, flavor-infused liquid into the liquid container 10. The rim-receiving groove 50 attaches the fifth lower lid body 42 to a container rim 9 of the liquid container 10. The second upper lid body insert 14 may be inserted into or received by the fifth lower lid body 42 thereby covering the cup type, single-serve, liquid permeable pod or container assembly 15 with an outer insert edge 54 being received in the insert edge-retention track 52.

In keeping with the notion that the second upper lid body insert 14 may cover the cup type, single-serve, liquid permeable pod or container assembly or liquid permeable container 15, the reader is directed to FIGS. 57-62. Referencing FIGS. 57-62, the reader will consider bottom portions 16 of a liquid permeable container assembly 15 with a (foil) cover element 19 removed. The bottom portions 16 of the liquid permeable container assembly 15 may be said to preferably comprise an inner filter element as at 65 and a container outlet as at 66 spaced from a bottom filter portion as at 67. The second upper lid body insert 14 may thus be inserted into or received by the fifth lower lid body 42 thereby covering the bottom portions 16 of a cup type, single-serve, liquid permeable pod or container assembly 15 with cover element 19 removed as generally depicted in FIGS. 57-62. The second upper lid body insert 14 may further preferably comprise a radially centralized and planar insert depression portion as at 76, which insert depression 76 may cover an upper portion of the liquid permeable container assembly 15.

Referencing FIGS. 63-68 the reader will there consider a first lid body insert-container combination 18 usable in combination with a cover element 19 to form a first cover-container-insert combination as at 20. The first lid body insert-container combination 18 basically comprises a cylindrical liquid permeable container bottom portion as at 69 integrally formed with an upper lid body insert portion as at 70. The cover element 19 may seat down atop an annular cover support depression portion 71 adjacent upper portions of the container bottom portion 70 within the lid body insert portion 70 as comparatively depicted in FIG. 63 versus FIG. 64.

Figure 4:
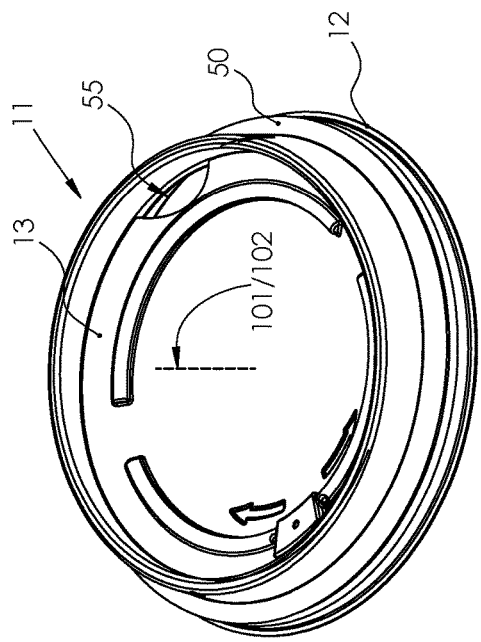
FIG. 4 is a top posterior perspective view of a first lid embodiment ensemble or lid assembly with a first upper lid body insert and the first lower lid body according to the present invention in a fully open configuration.
Figure 7:
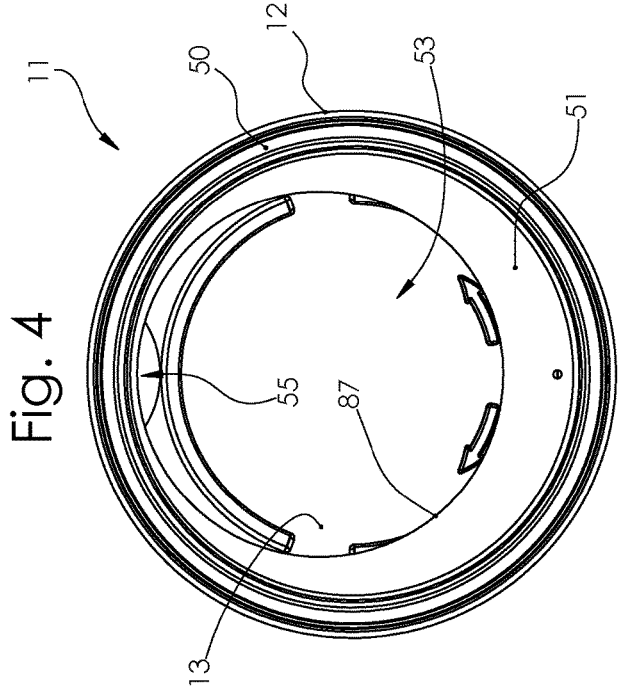
FIG. 7 is a bottom plan view of the first lid embodiment ensemble or lid assembly according to the present invention in the fully open configuration.
Figure 5:
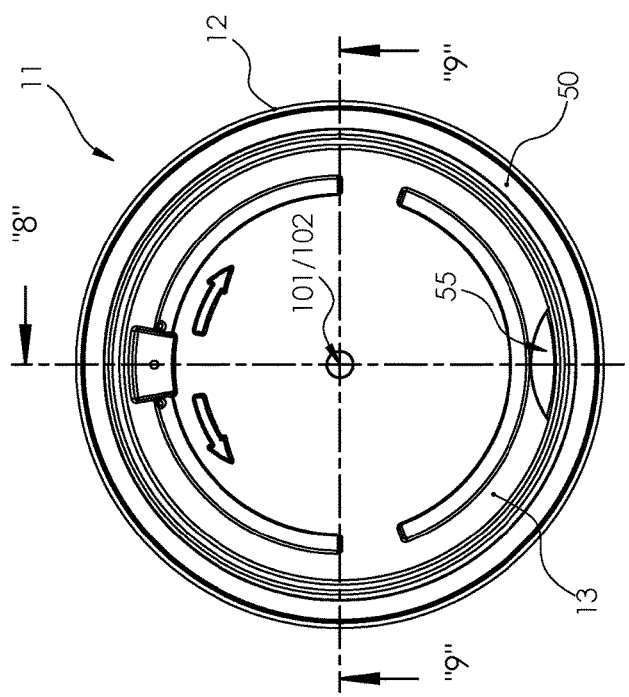
FIG. 5 is a top plan view of the first lid embodiment ensemble or lid assembly according to the present invention in the fully open configuration.
Figure 6:
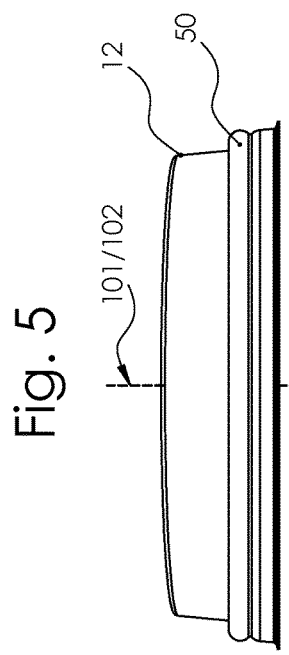
FIG. 6 is a first anterior edge elevational view of the first lid embodiment ensemble or lid assembly according to the present invention.
Figure 8B:
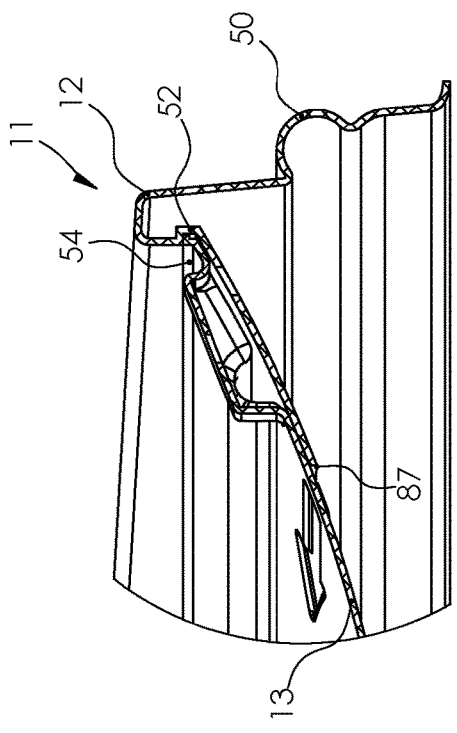
FIG. 8B is an enlarged, fragmentary sectional view as enlarged and sectioned from FIG. 8 to show in still greater clarity structural details of posterior portions of the first lid embodiment ensemble or lid assembly in the fully open configuration.
Figure 8A:
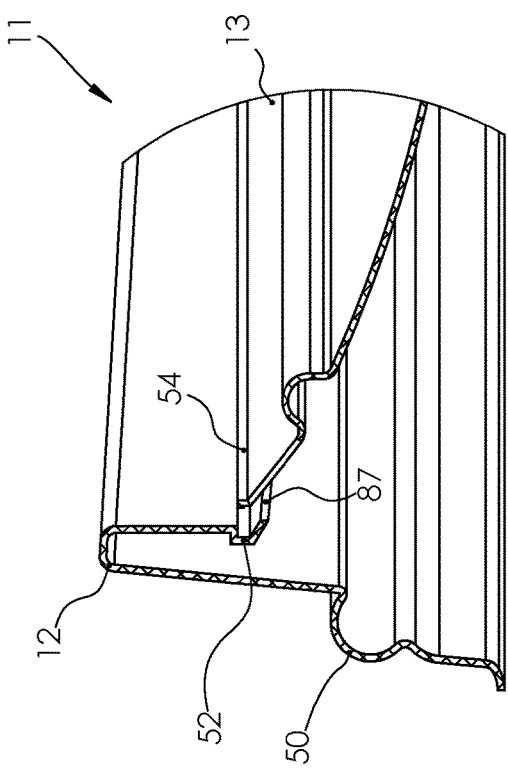
FIG. 8A is an enlarged, fragmentary sectional view as enlarged and sectioned from FIG. 8 to show in still greater clarity structural details of anterior portions of the first lid embodiment ensemble or lid assembly in the fully open configuration.
Figure 8:
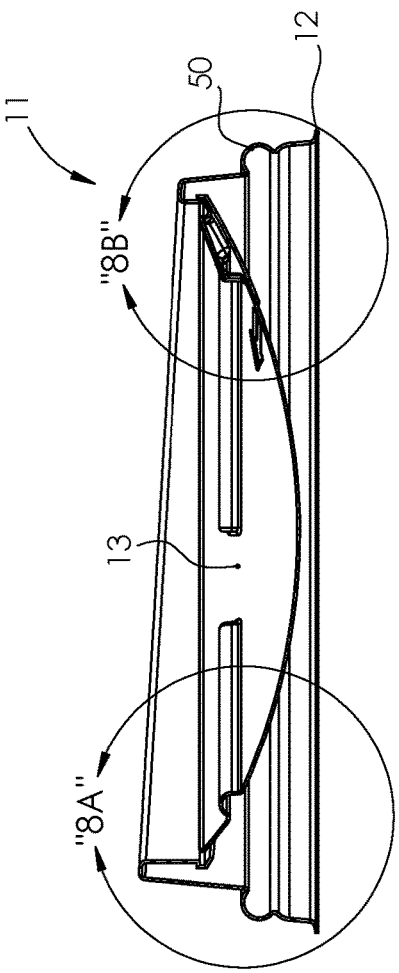
FIG. 8 is a medial type cross-sectional view of the first lid embodiment ensemble or lid assembly according to the present invention as sectioned from FIG. 5 from a lateral view to show in greater detail structures otherwise obscured by lateral portions of the first lid embodiment ensemble or lid assembly in the fully open configuration.
Figure 9A:
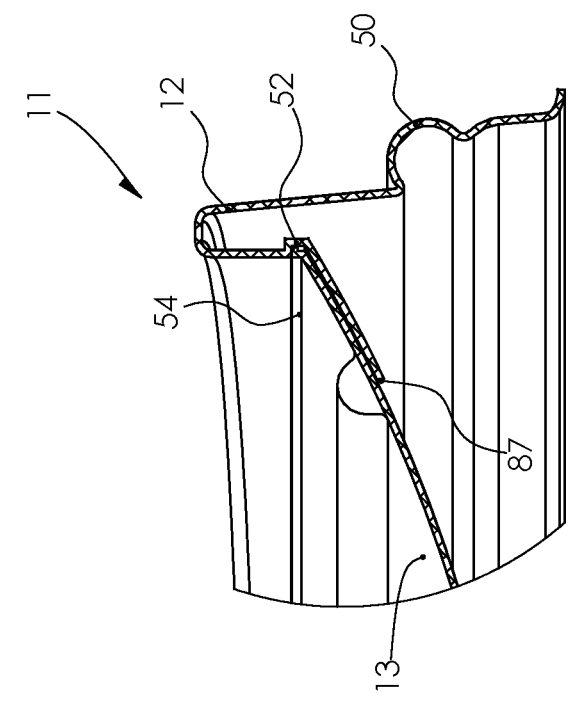
FIG. 9A is an enlarged, fragmentary sectional view as enlarged and sectioned from FIG. 9 to show in still greater clarity structural details of right lateral portions of the first lid embodiment ensemble or lid assembly.
Figure 9B:
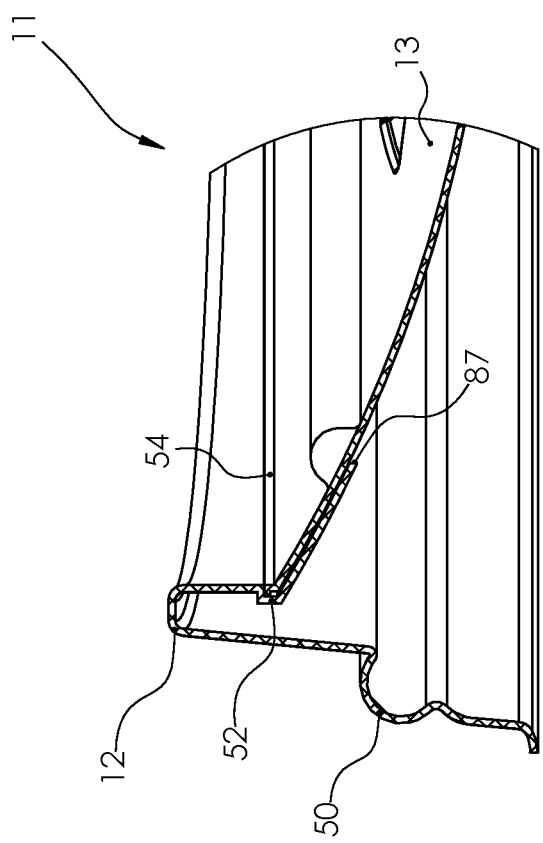
FIG. 9B is an enlarged, fragmentary sectional view as enlarged and sectioned from FIG. 9 to show in still greater clarity structural details of left lateral portions of the first lid embodiment ensemble or lid assembly.
Figure 9:
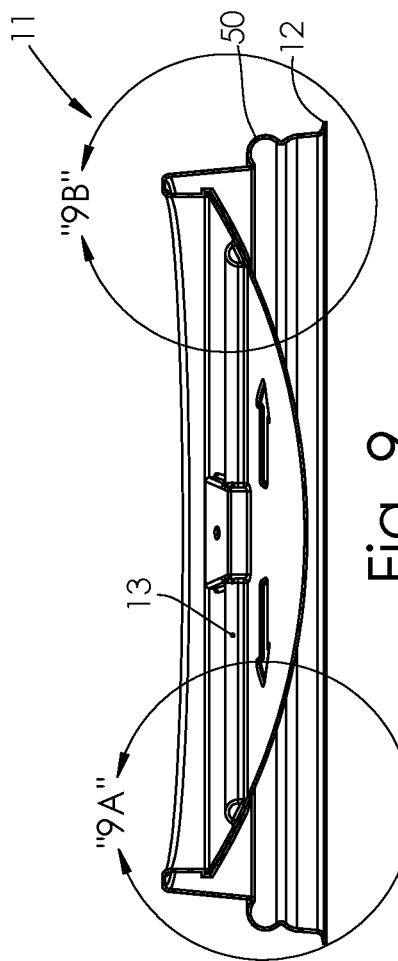
FIG. 9 is a frontal type cross-sectional view of the first lid embodiment ensemble or lid assembly according to the present invention as sectioned from FIG. 5 from an anterior view to show in greater detail structures otherwise obscured by anterior portions of the first lid embodiment ensemble or lid assembly in the fully open configuration.
Figure 10:
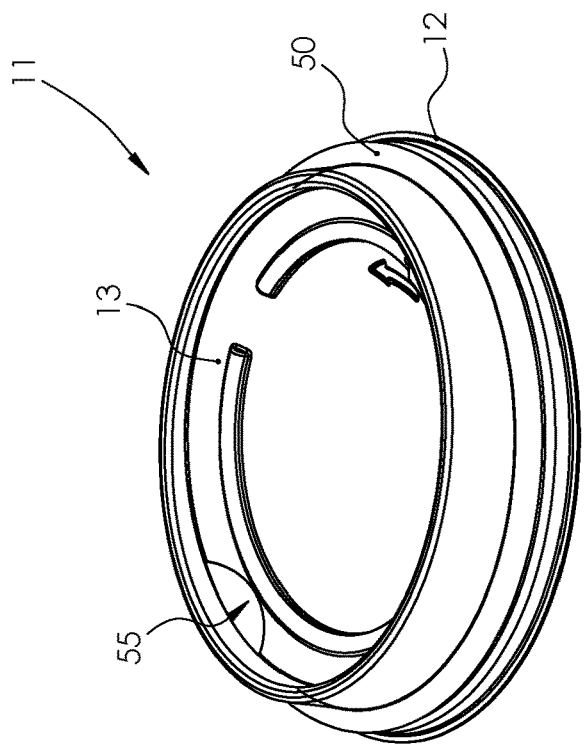
FIG. 10 is a top posterior perspective view of the first lid embodiment ensemble or lid assembly according to the present invention in a fully closed configuration.
Figure 12:
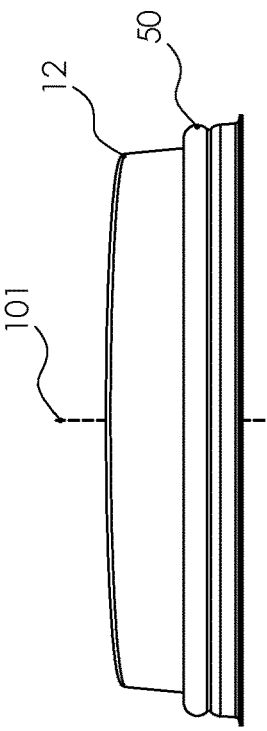
FIG. 12 is a second anterior edge elevational view of the first lid embodiment ensemble or lid assembly according to the present invention.
Figure 11:
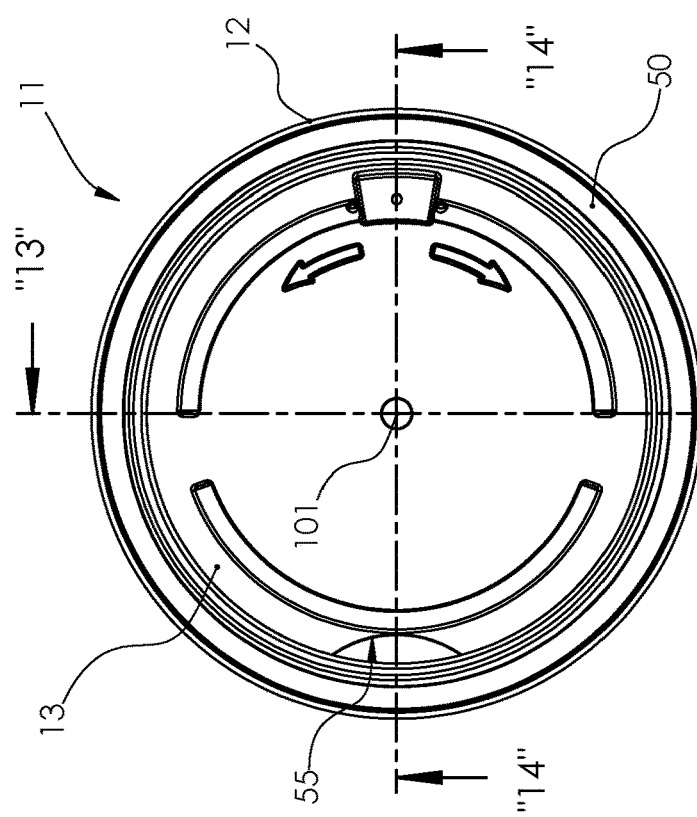
FIG. 11 is a top plan view of the first lid embodiment ensemble or lid assembly according to the present invention in the fully closed position.
Figure 13A:
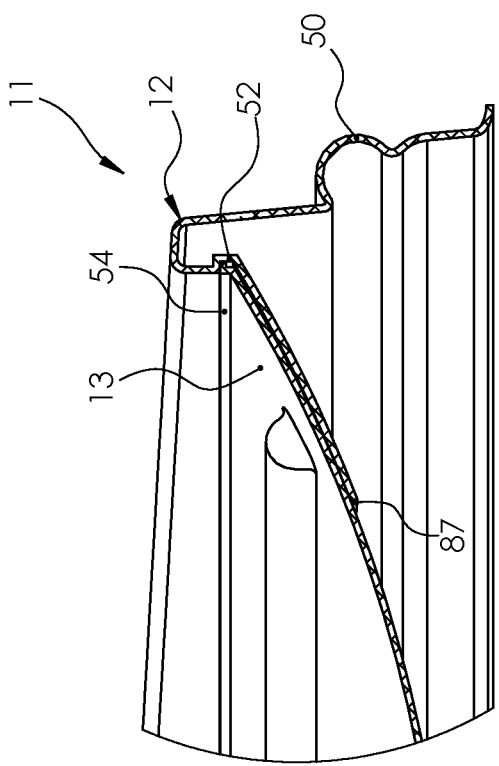
FIG. 13A is an enlarged, fragmentary sectional view as enlarged and sectioned from FIG. 13 to show in still greater clarity structural details of left lateral portions of the first lid embodiment ensemble or lid assembly.
Figure 13B:
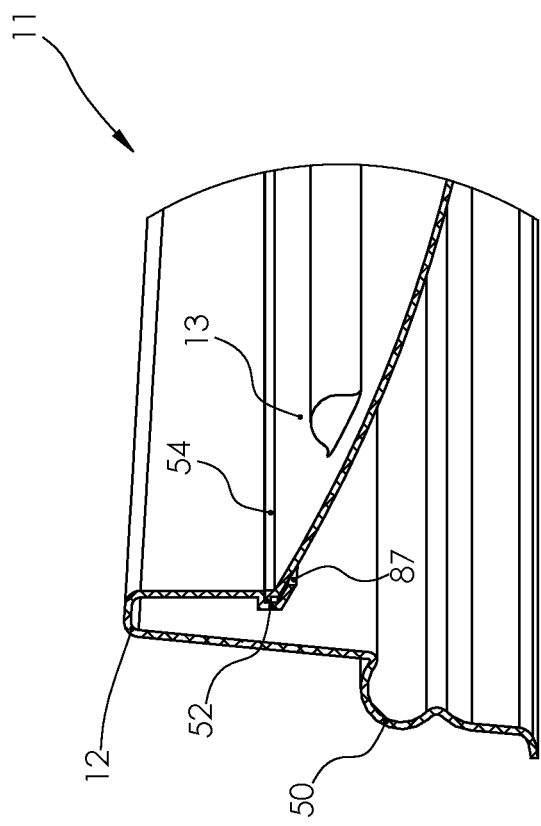
FIG. 13B is an enlarged, fragmentary sectional view as enlarged and sectioned from FIG. 13 to show in still greater clarity structural details of right lateral portions of the first lid embodiment ensemble or lid assembly.
Figure 13:
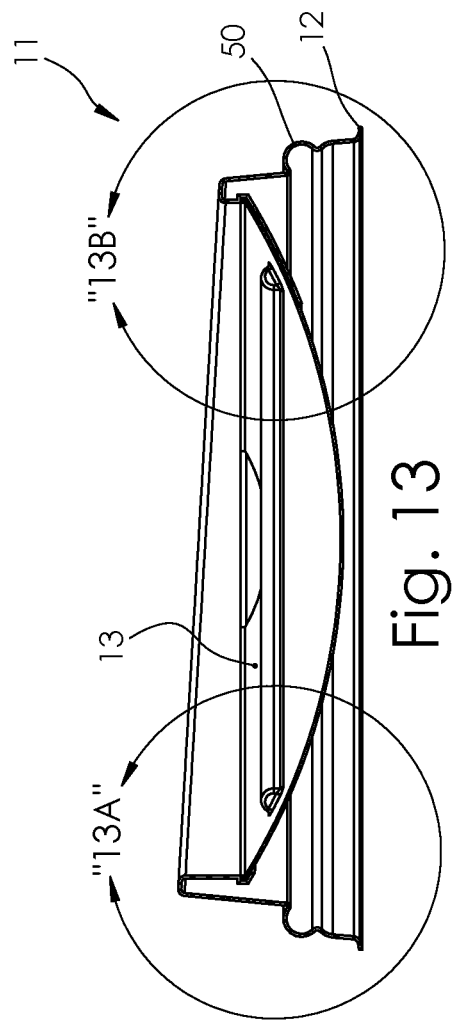
FIG. 13 is a frontal type cross-sectional view of the first lid embodiment ensemble or lid assembly according to the present invention sectioned from FIG. 11 from a posterior view to show in greater detail structures otherwise obscured by posterior portions of the first lid embodiment ensemble or lid assembly in the fully closed configuration.
Figure 19:
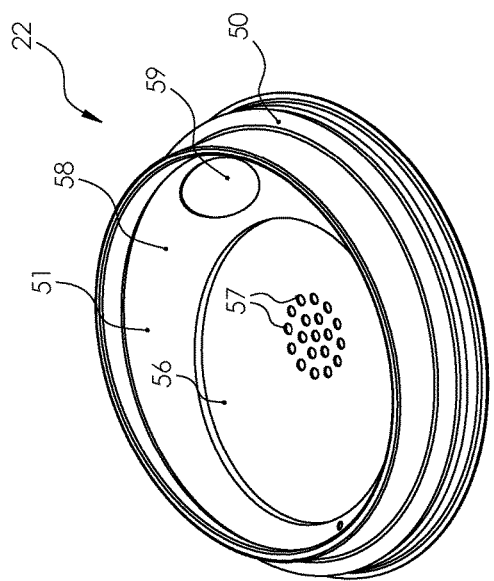
FIG. 19 is a top posterior perspective view of a second lower lid body according to the present invention.
Figure 22:
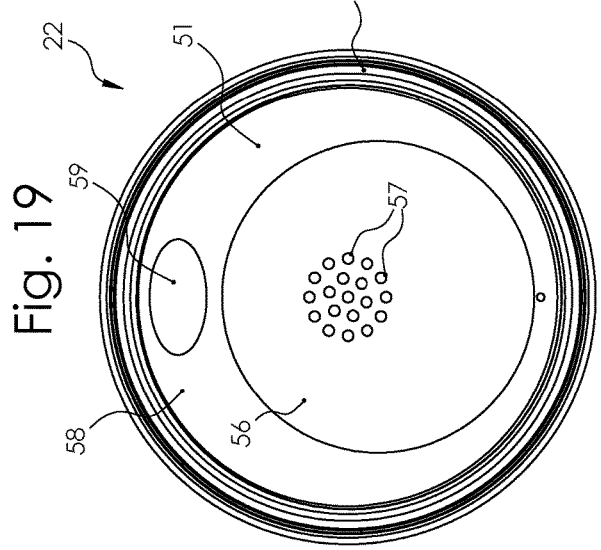
FIG. 22 is a top plan view of the second lower lid body according to the present invention.
Figure 20:
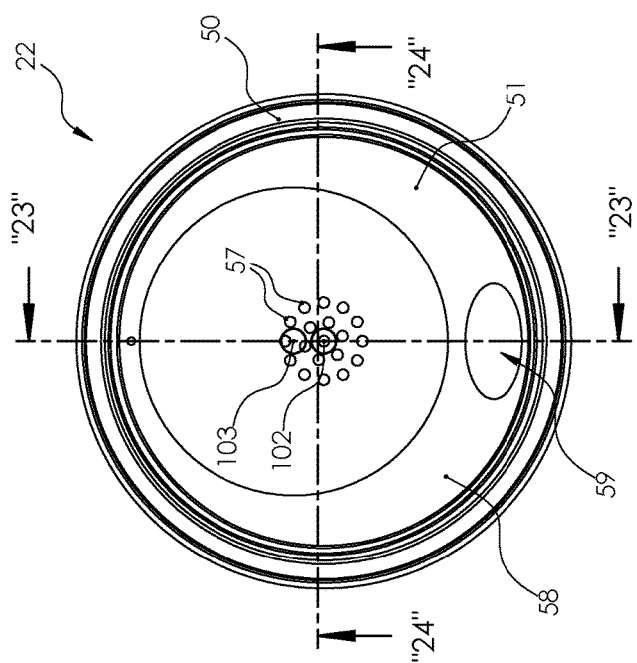
FIG. 20 is a top plan view of the second lower lid body according to the present invention.
Figure 21:
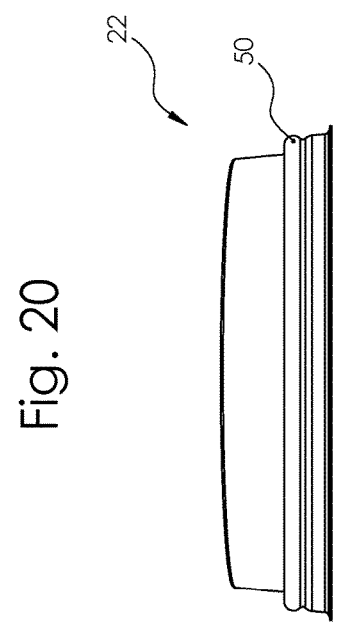
FIG. 21 is an anterior edge elevational view of the second lower lid body according to the present invention.
Figure 23A:
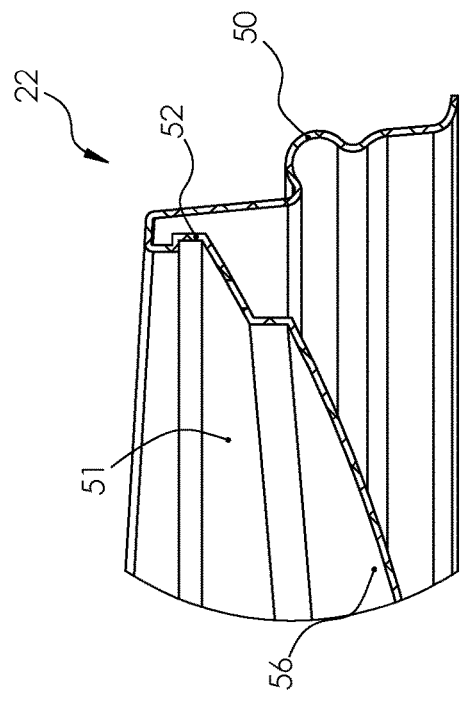
FIG. 23A is an enlarged, fragmentary sectional view as enlarged and sectioned from FIG. 23 to show in still greater clarity structural details of anterior portions of the second lower lid body.
Figure 23B:
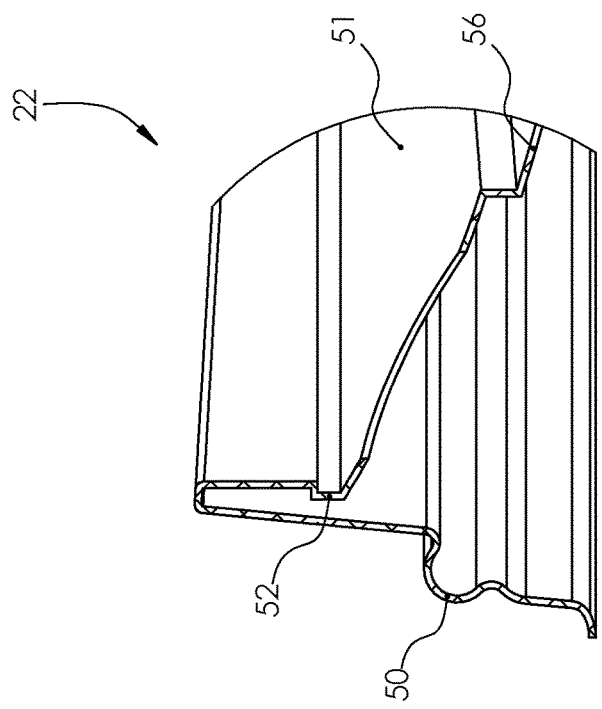
FIG. 23B is an enlarged, fragmentary sectional view as enlarged and sectioned from FIG. 23 to show in still greater clarity structural details of posterior portions of the second lower lid body.
Figure 23:
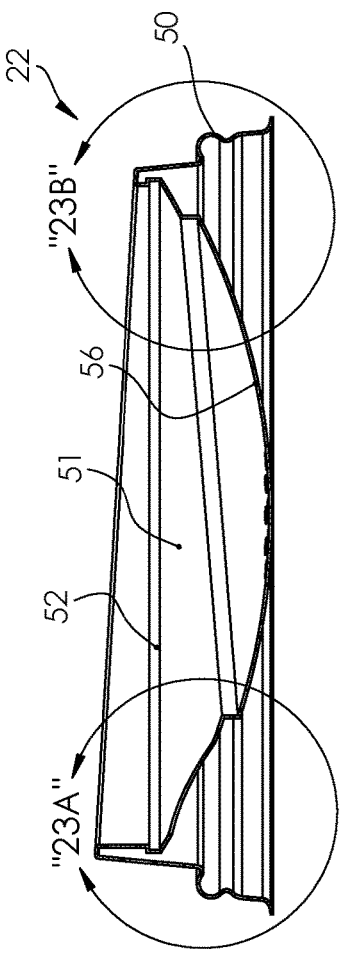
FIG. 23 is a medial type cross-sectional view of the second lower lid body according to the present invention as sectioned from FIG. 20 from a lateral view to show in greater detail structures otherwise obscured by lateral portions of the second lower lid body.
Figure 26:
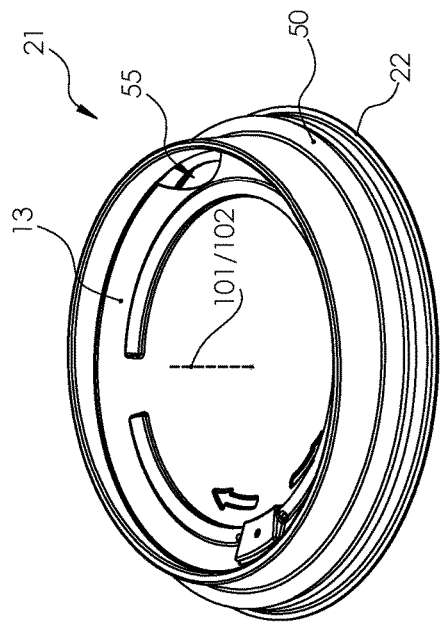
FIG. 26 is a top posterior perspective view of a second lid embodiment ensemble or lid assembly with the first upper lid body insert and the second lower lid body according to the present invention in an open configuration.
Figure 29:
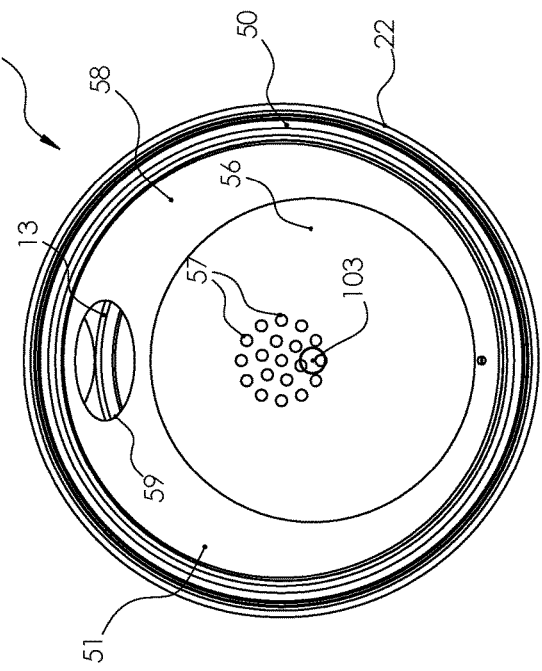
FIG. 29 is a bottom plan view of the second lid embodiment ensemble or lid assembly according to the present invention in the fully open configuration.
Figure 27:
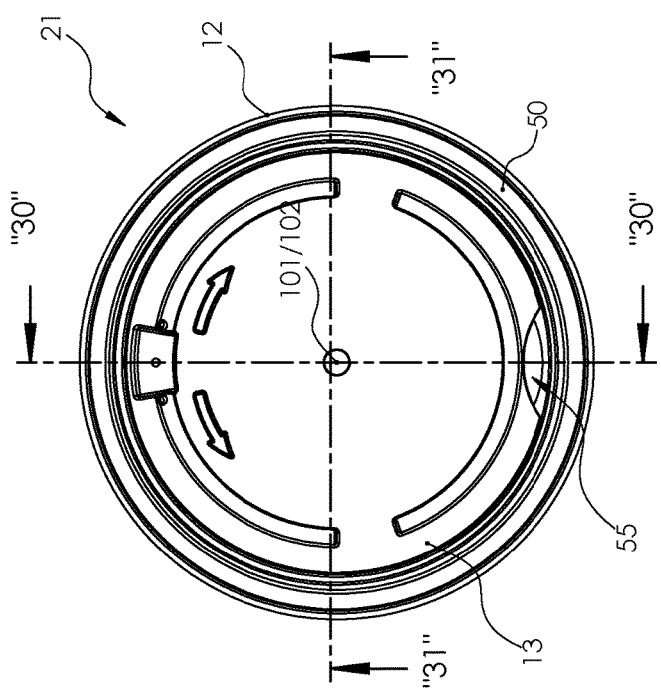
FIG. 27 is a top plan view of the second lid embodiment ensemble or lid assembly according to the present invention in a fully open configuration.
Figure 28:
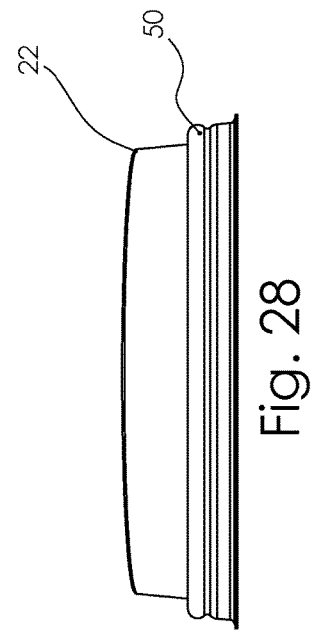
FIG. 28 is an anterior edge elevational view of the second lid embodiment ensemble or lid assembly according to the present invention.
Figure 36:
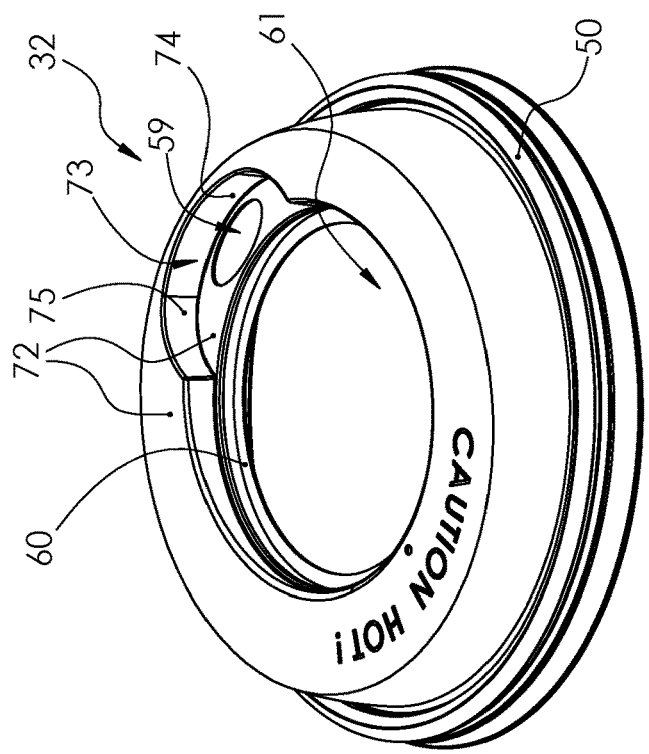
FIG. 36 is a top posterior perspective view of a fourth lower lid body according to the present invention.
Figure 37:
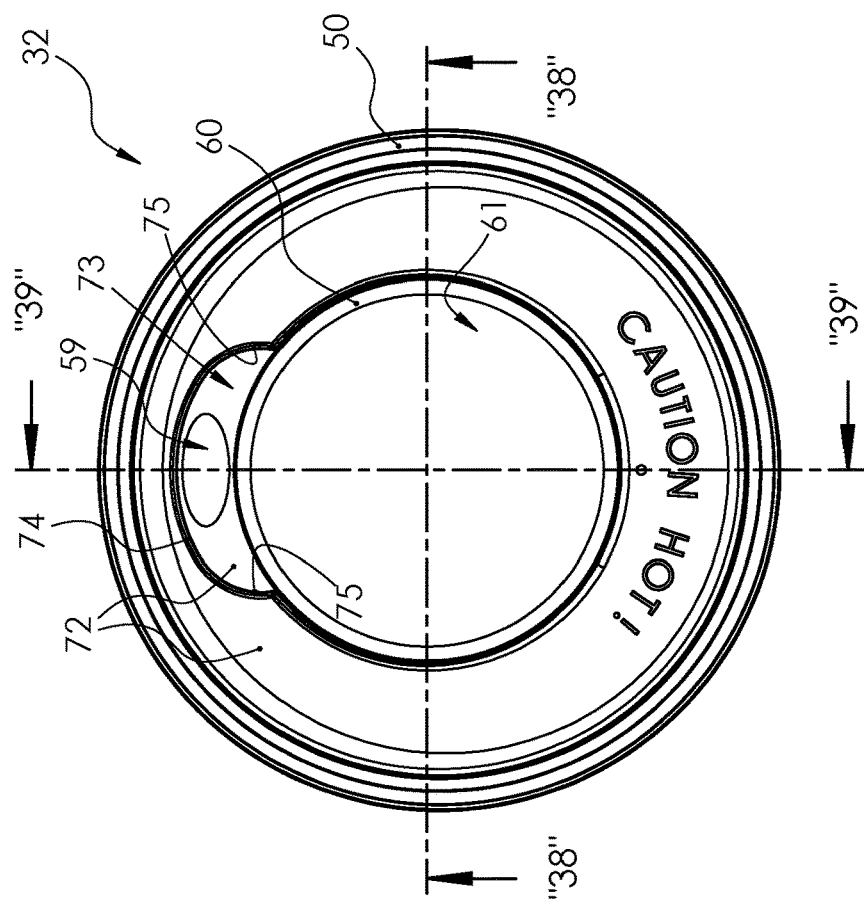
FIG. 37 is a top plan view of the fourth lower lid body according to the present invention.
Figure 42:
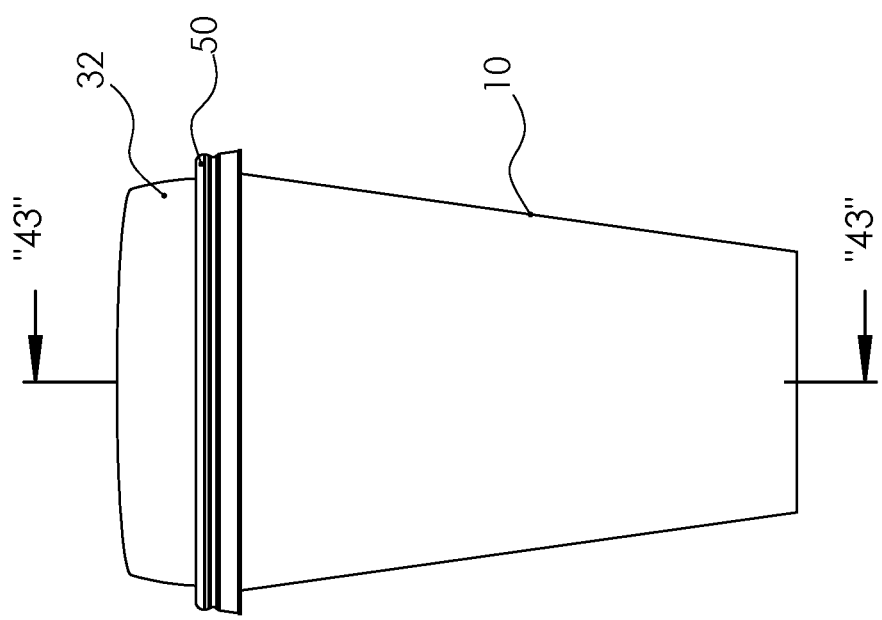
FIG. 42 is an anterior elevational view a tall container, a fourth lower lid body, and a single-serve, liquid permeable pod or container assembly in assembled relation.
Figure 43A:
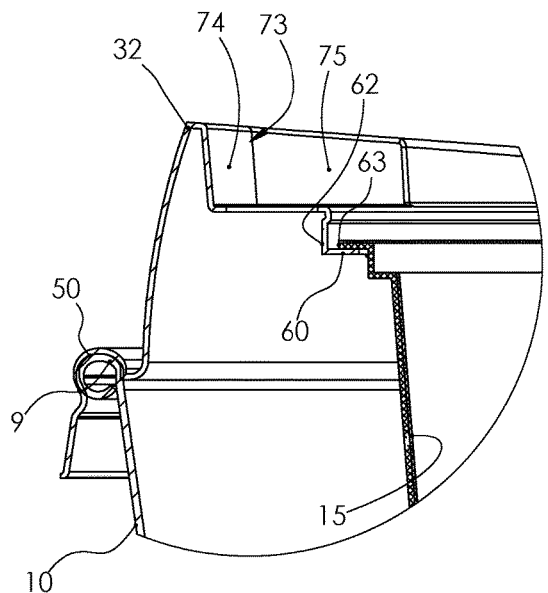
FIG. 43A is an enlarged, fragmentary sectional view as enlarged and sectioned from FIG. 43 to show in still greater clarity structural details of anterior portions of the structures there depicted.
Figure 43B:
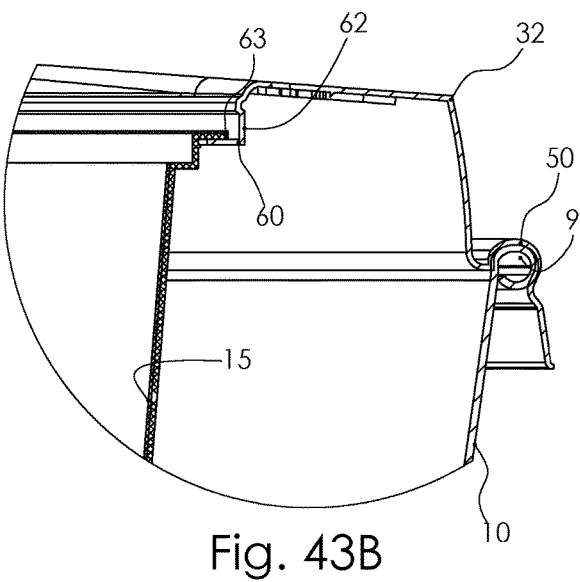
FIG. 43B is an enlarged, fragmentary sectional view as enlarged and sectioned from FIG. 43 to show in still greater clarity structural details of posterior portions of the structures there depicted.
Figure 43:
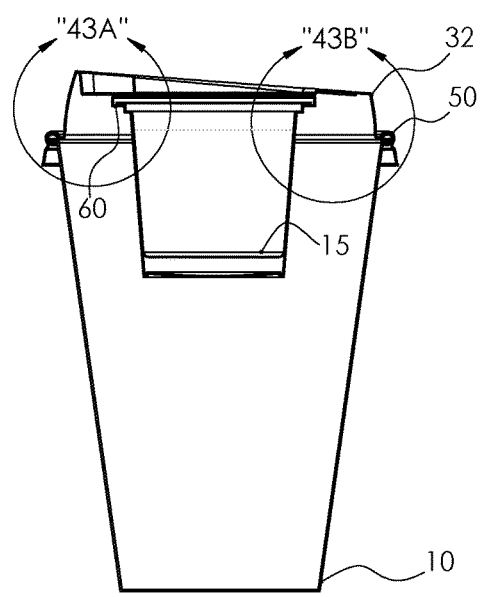
FIG. 43 is a medial type cross-sectional view as sectioned from FIG. 42 to show in sectional detail the tall container, fourth lower lid body, and single-serve, liquid permeable pod or container assembly in assembled relation.
Figure 44:
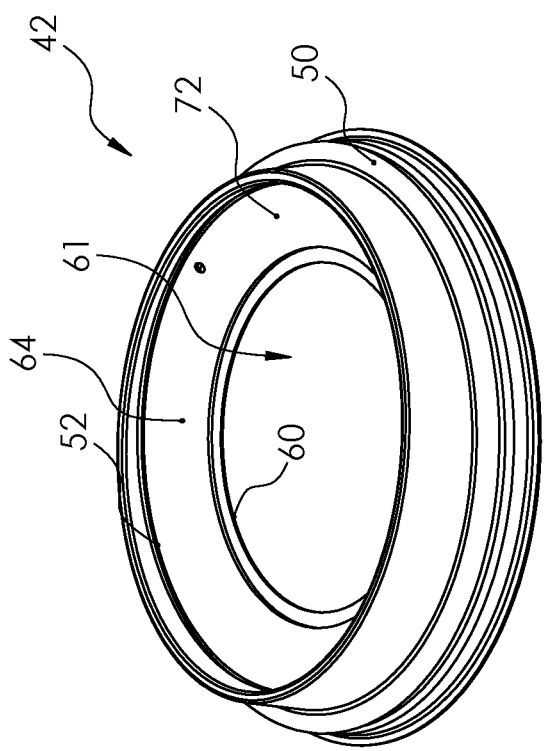
FIG. 44 is an anterior top perspective view of a fifth lower lid body according to the present invention.
Figure 45:
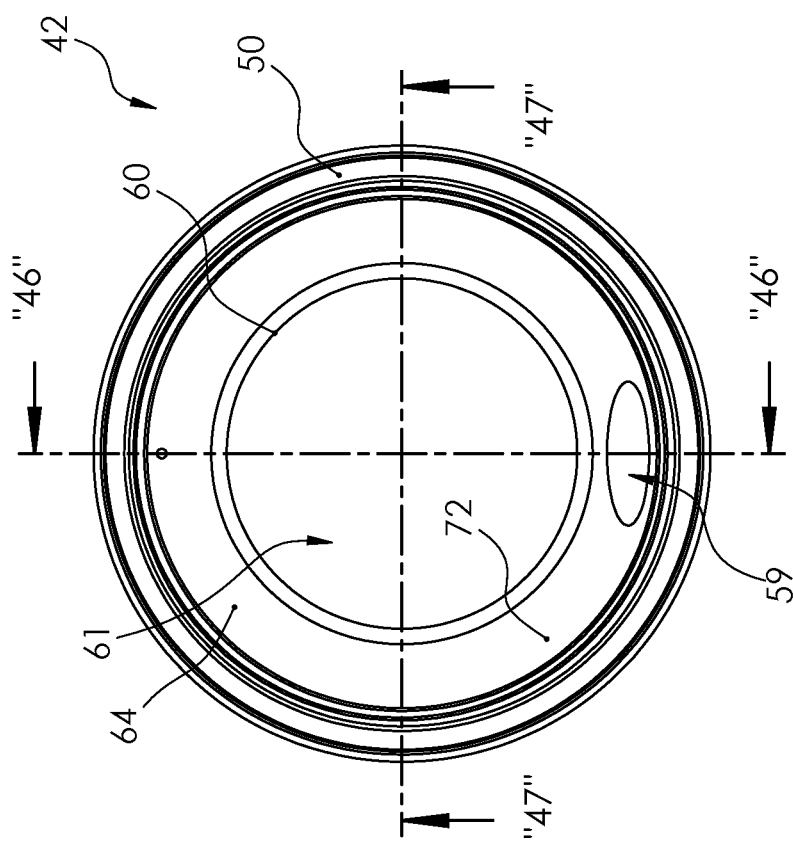
FIG. 45 is a top perspective view of the fifth lower lid body according to the present invention.
Figure 48:
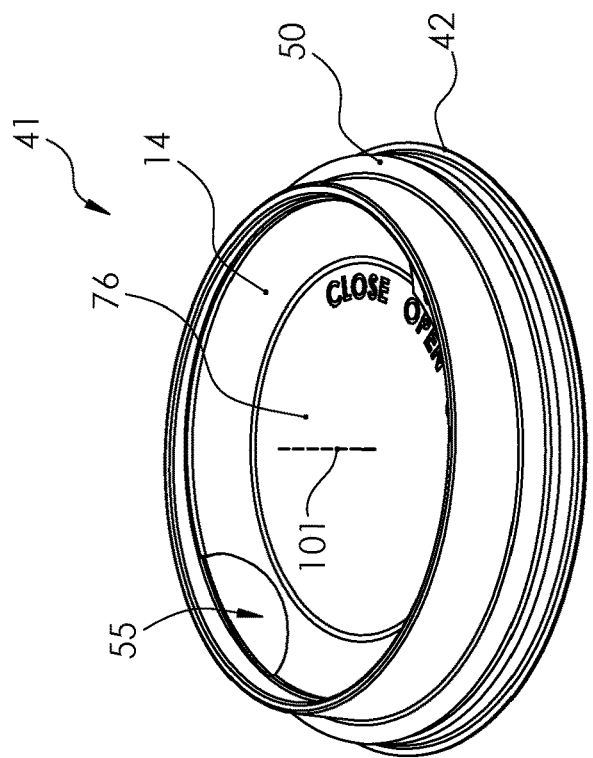
FIG. 48 is a top perspective view of a third lid embodiment ensemble or lid assembly with a second upper lid body insert and fifth lower lid body according to the present invention in a closed configuration.
Figure 49:
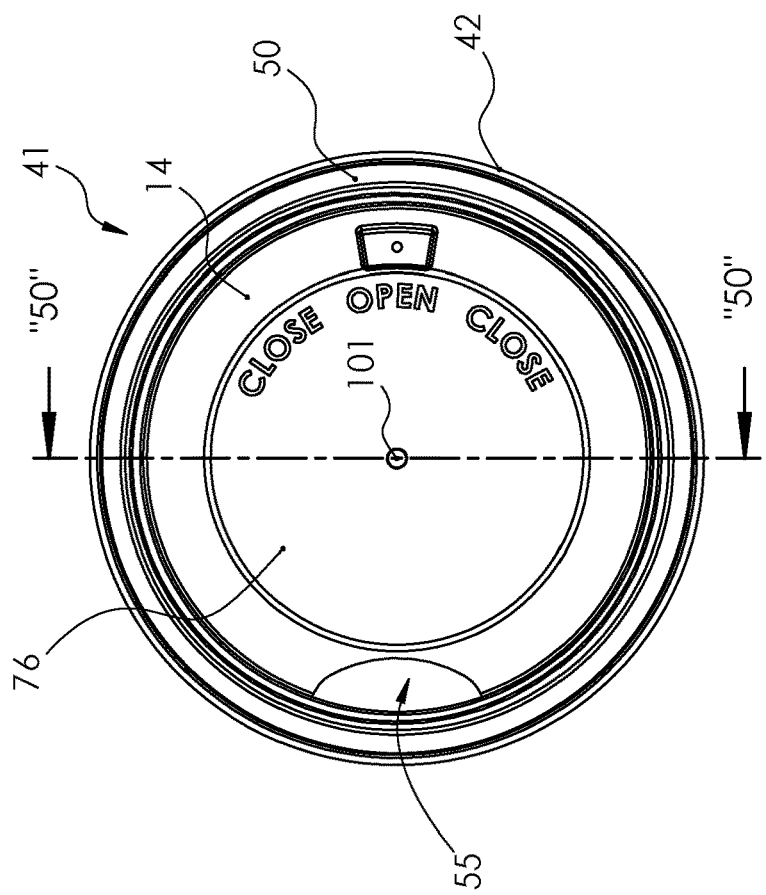
FIG. 49 is a top plan view of the third lid embodiment ensemble or lid assembly according to the present invention in the closed configuration.
Figure 52:
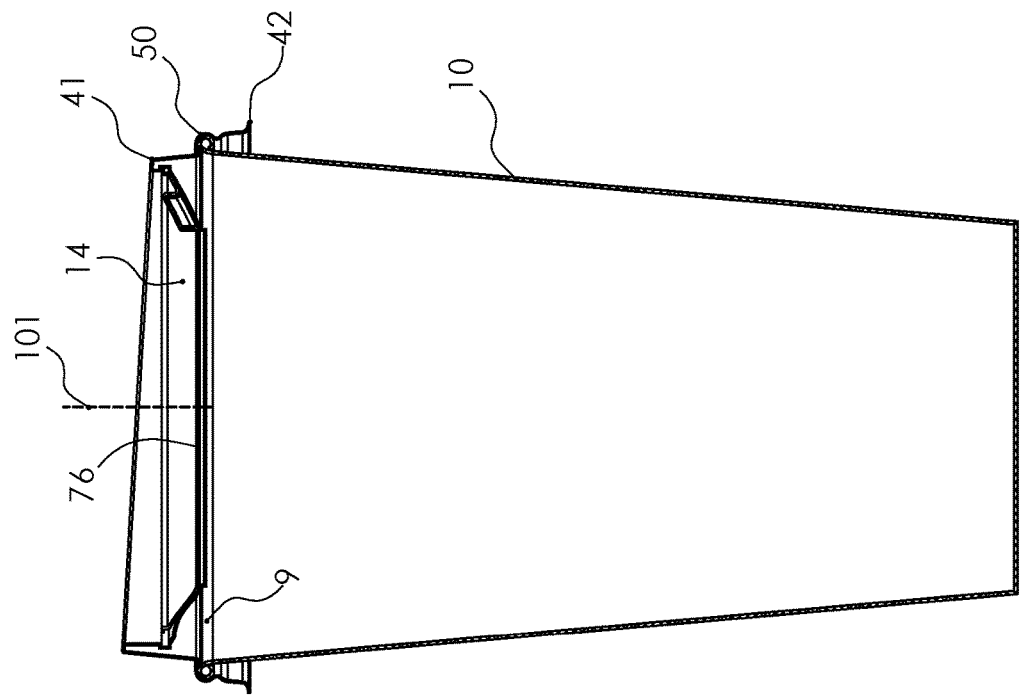
FIG. 52 is a medial type cross-sectional view as sectioned from FIG. 51 to show in greater detail lateral portions of the third lid embodiment ensemble or lid assembly in assembled relation with the tall container.
Figure 51:
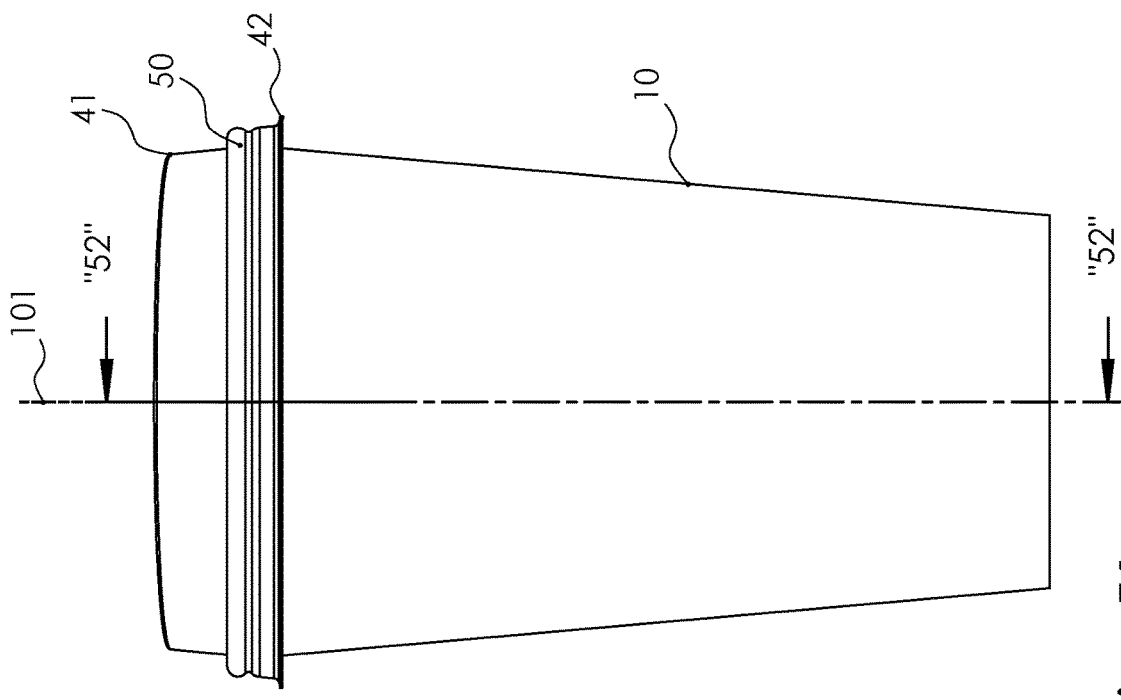
FIG. 51 is a first anterior elevational view of the third lid embodiment ensemble or lid assembly in assembled relation with a tall container.
Figure 53:
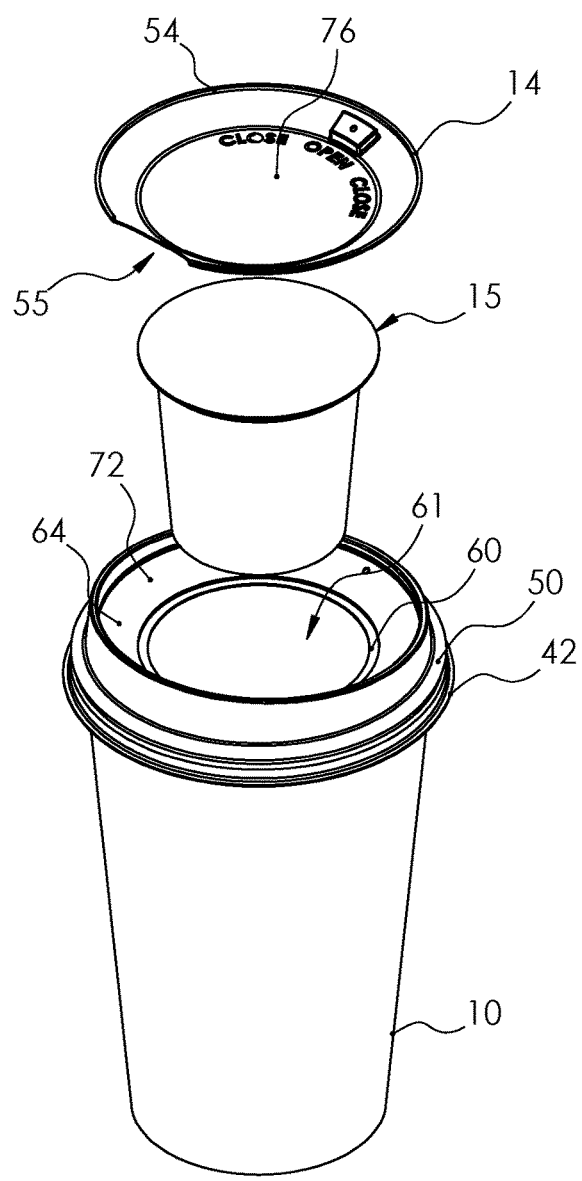
FIG. 53 is an anterior top exploded perspective view of the third lid embodiment ensemble or lid assembly in exploded relation relative to a single-serve, liquid permeable pod or container assembly, and a tall container.
Figure 54:
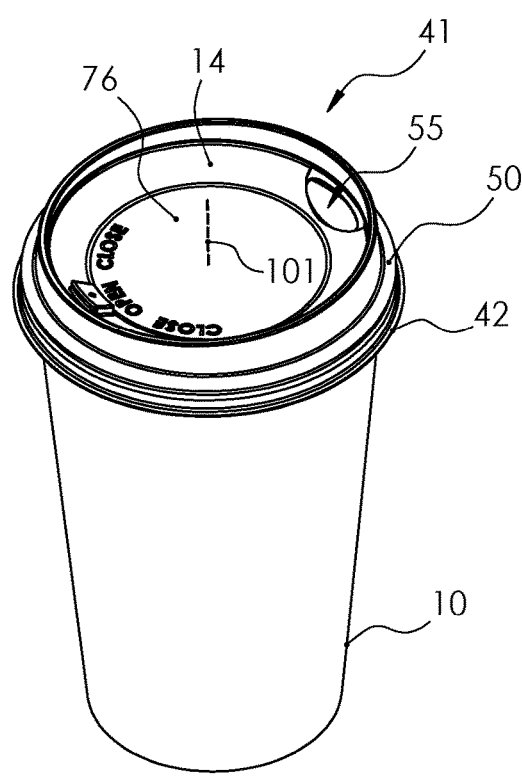
FIG. 54 is a posterior top perspective view of the third lid embodiment ensemble or lid assembly in exploded relation with a tall container.
Figure 56:
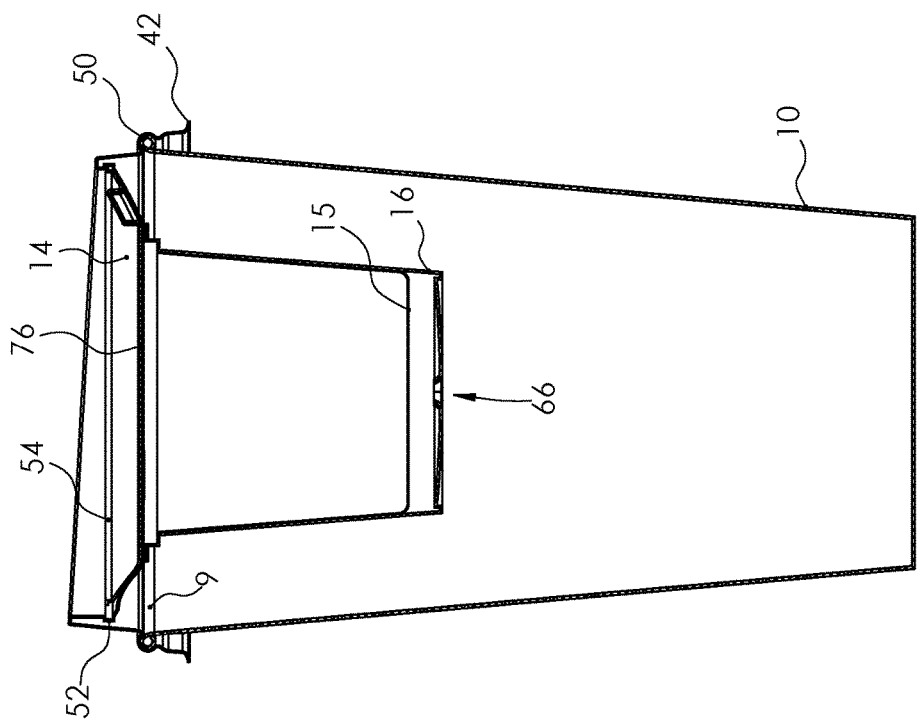
FIG. 56 is a medial type cross-sectional view as sectioned from FIG. 55 to show in greater detail lateral portions of the third lid embodiment ensemble or lid assembly in assembled relation with the tall container and a single-serve, liquid permeable pod or container assembly received in a first containment vessel.
Figure 55:
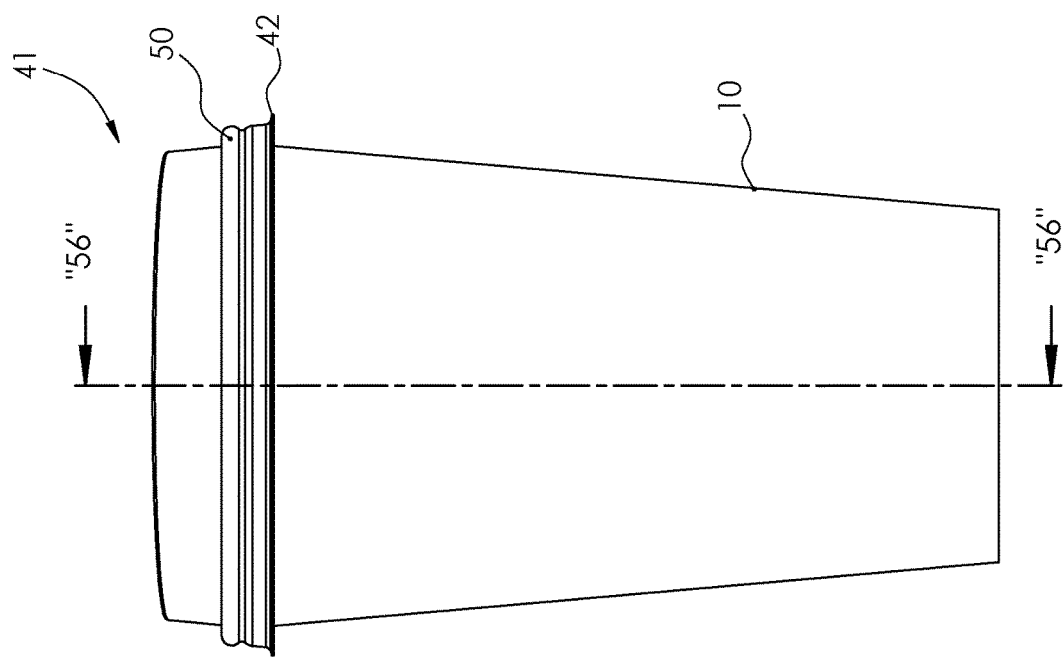
FIG. 55 is a second anterior elevational view of the third lid embodiment ensemble or lid assembly in assembled relation with a tall container.
Figure 57:
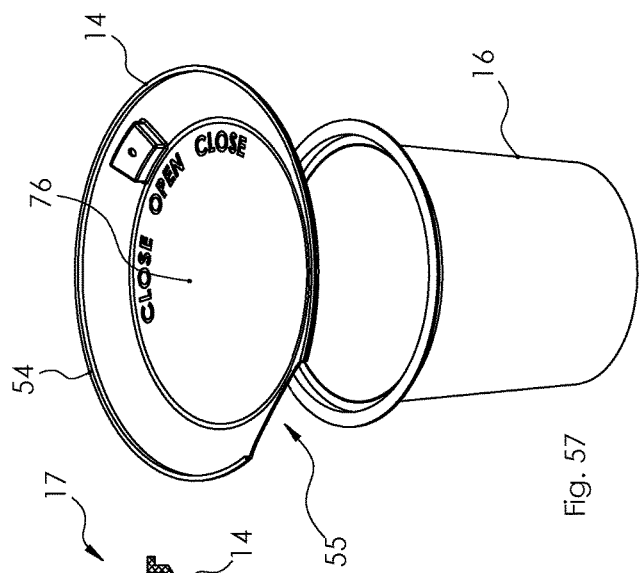
FIG. 57 is an exploded top perspective view of the second upper lid body insert in exploded relation with an uncovered first containment vessel.
Figure 58:
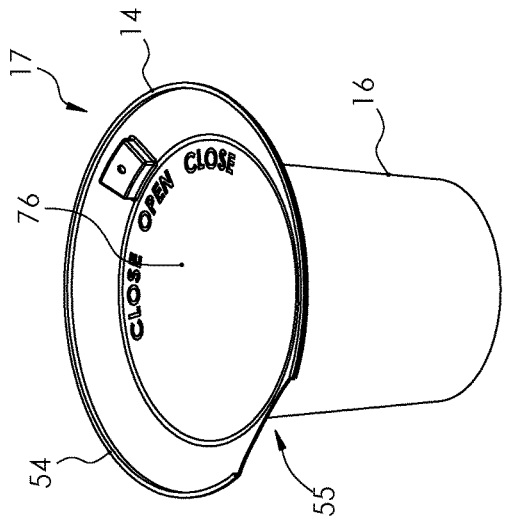
FIG. 58 is a top perspective view of the second upper lid body insert in assembled relation with the first containment vessel forming a first alternative upper insert-covered containment vessel.
Figure 60A:
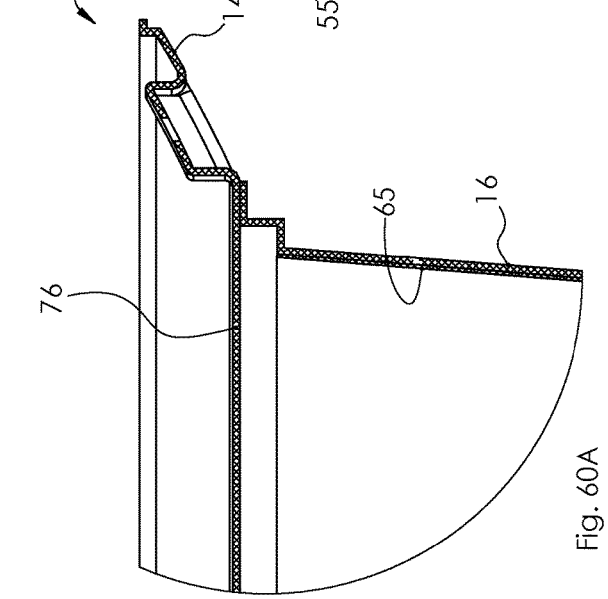
FIG. 60A is an enlarged, fragmentary sectional view as enlarged and sectioned from FIG. 60 to show in greater clarity structural details of posterior portions of the first alternative upper insert-covered containment vessel with single-serve, liquid permeable pod or container assembly there depicted.
Figure 60:
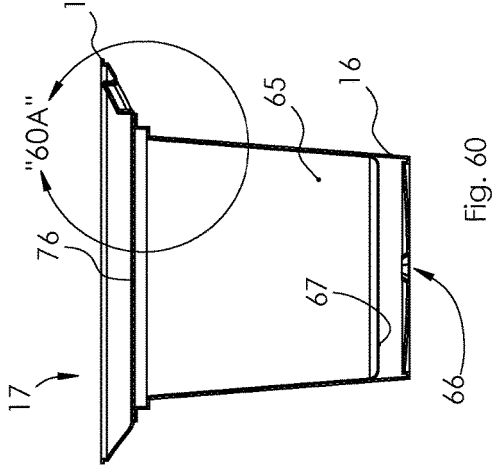
FIG. 60 is a medial type cross-sectional view as sectioned from FIG. 59 to show in greater detail lateral portions of the first alternative upper insert-covered containment vessel with a single-serve, liquid permeable pod or container assembly received therein.
Figure 59:
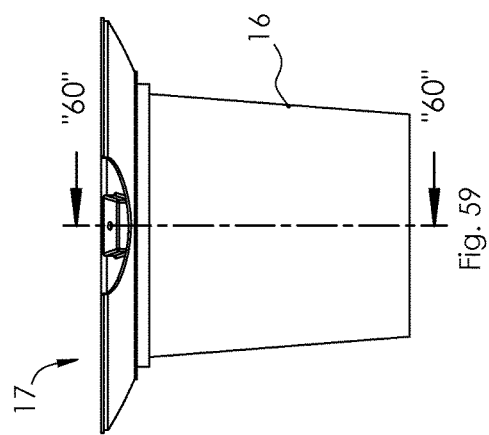
FIG. 59 is an anterior elevational view of the first alternative upper insert-covered containment vessel.
Figure 66:
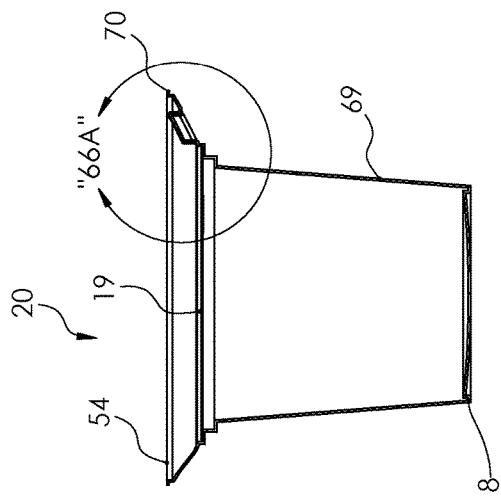
FIG. 66 is a medial type cross-sectional view as sectioned from FIG. 65 to show in greater detail lateral portions of the first covered lid body insert-container combination.
Figure 65:
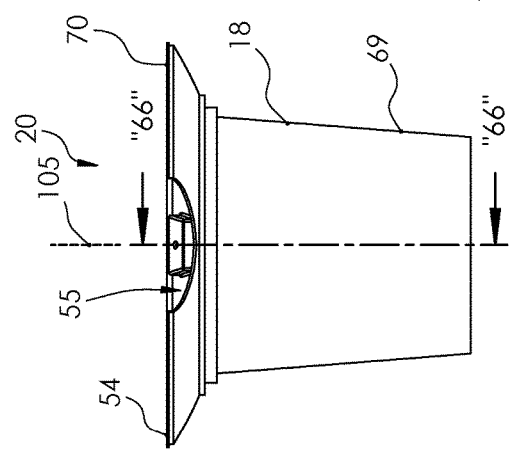
FIG. 65 is an anterior elevational view of the first covered lid body insert-container combination.
Figure 66A:
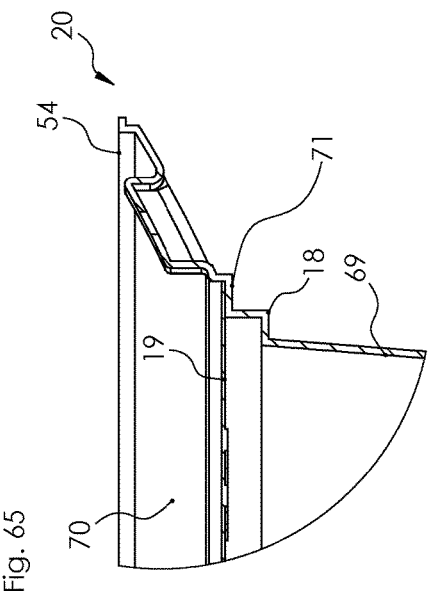
FIG. 66A is an enlarged, fragmentary sectional view as enlarged and sectioned from FIG. 66 to show in greater clarity structural details of posterior portions of the structures there depicted.
Figure 63:
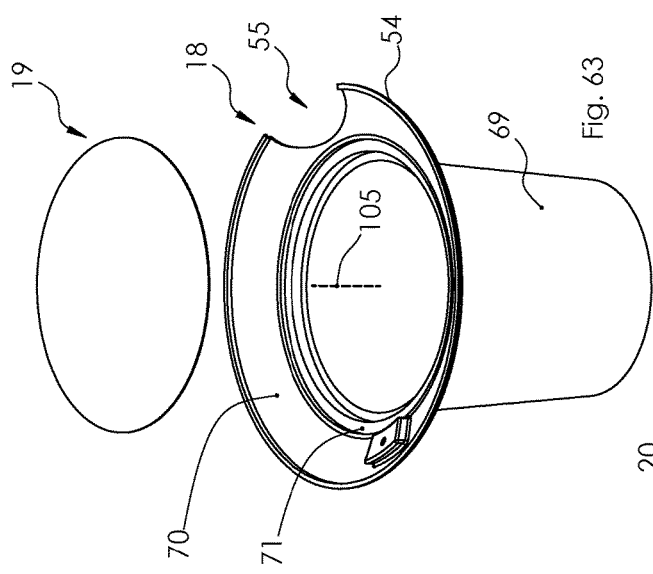
FIG. 63 is an exploded top perspective view of a first lid body insert-container combination in exploded relation with a container cover.
Figure 64:
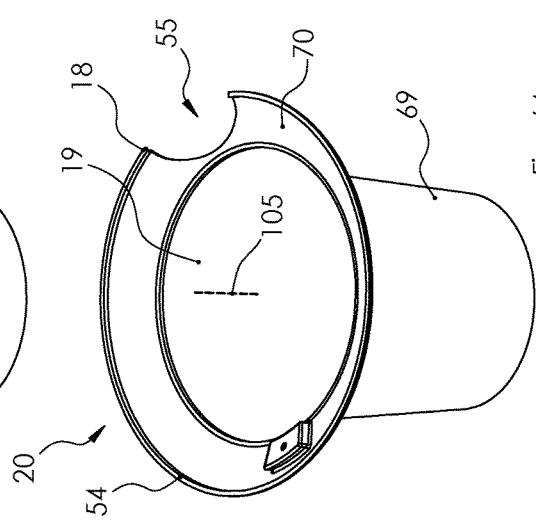
FIG. 64 is a top perspective view of the lid body insert-container combination in assembled relation with the container cover thereby forming a first covered lid body insert-container combination.
Figure 68:
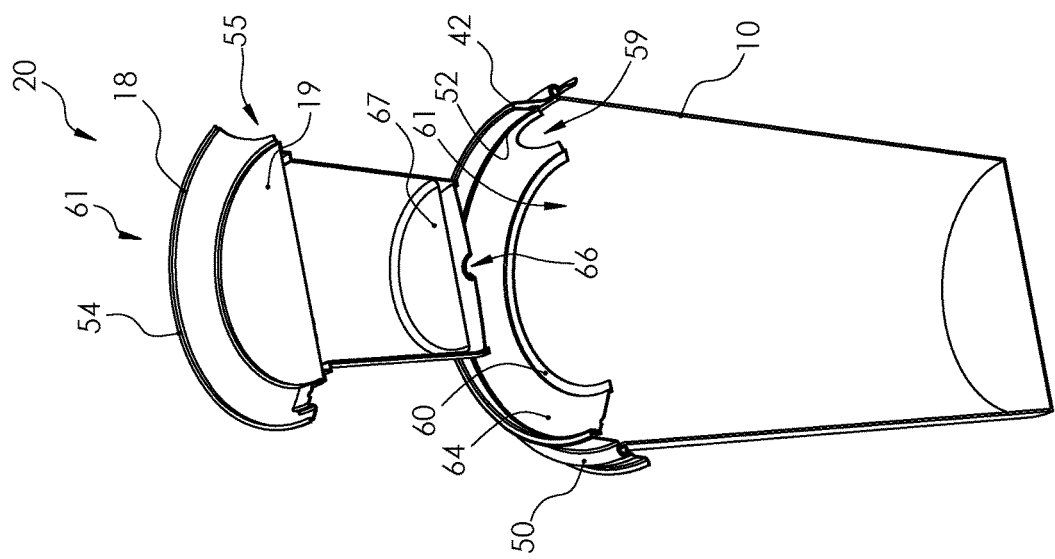
FIG. 68 is a medial type cross-sectional view as sectioned from FIG. 67 to show in greater detail lateral portions of the first covered lid body insert-container combination in exploded relation with the fifth lower lid body in assembled relation with a tall container.
Figure 67:
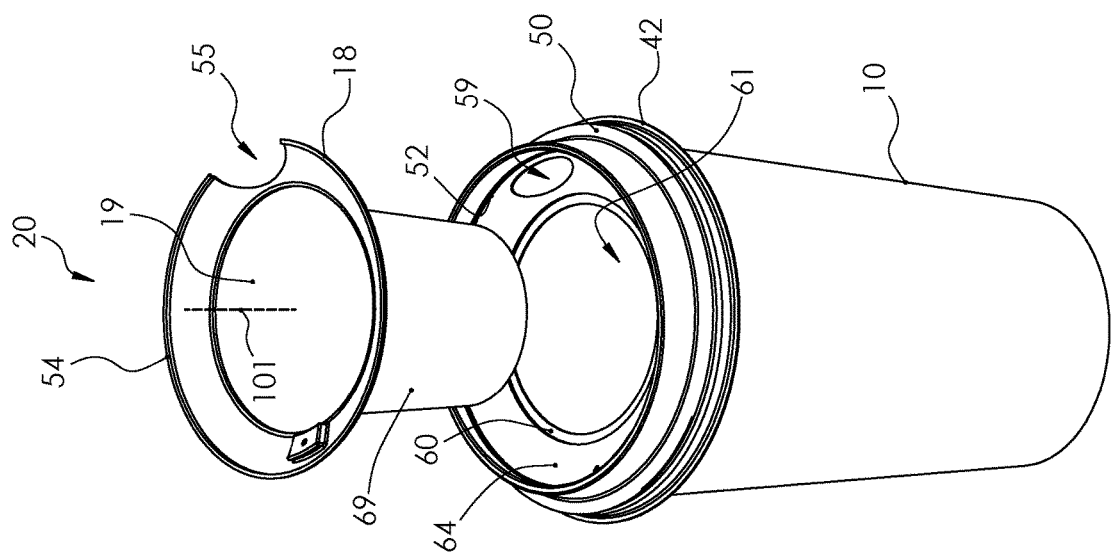
FIG. 67 is a posterior top perspective view of the first covered lid body insert-container combination in exploded relation with the fifth lower lid body in assembled relation with a tall container.

The cover-container-insert combination 20 may thus be received and supported by the fifth lower lid body 42 as generally and comparatively depicted in FIG. 67 versus FIG. 68. The lid assembly according to the present invention may thus be said to further comprise a liquid permeable container cover as at cover element 19 when the lid body insert portion is integrally formed with structure akin to bottom portions 16 of the liquid permeable container 15. The liquid permeable container cover 19 may be received and supported in superior adjacency to the bottom portions 16 of the liquid permeable container 15 or the cylindrical liquid permeable container bottom portion as at 69 via a cover-supportive formation as at cover support depression portion 71 formed in the first lid body insert-container combination 18.

Referencing FIGS. 69-73, the reader will there consider a variant of an upper lid body insert or a third upper lid body insert 24 usable in combination with an uncovered first containment vessel akin to bottom portions 16 of a cup type, single-serve, liquid permeable pod or container assembly 15. The third upper lid body insert 24 is substantially planar in configuration and functions to cover the containment vessel akin to bottom portions 16 to form a covered-bottom combination as at 23. Referencing FIGS. 74 and 75, the reader will there consider a second lid body insert-container combination 25 usable in combination with a container cover element 19 to form a second cover-container-insert combination as at 26.

Referencing FIGS. 76-79, the reader will there consider that the present invention further contemplates a lid assembly whereby the alternative second lid body insert-container combination 25 is usable in combination with lower lid body 42. The alternative second lid body insert-container combination 25 essentially comprises cylindrical liquid permeable container bottom portion 69 integrally formed with upper lid body insert portion as at 70. The cover element 19 may seat down atop a cover support depression portion 71 adjacent upper portions of the container bottom portion 69 and within the lid body insert portion 70.

The alternative second lid body insert-container combination 25 may further comprise a combination bottom 78 having upwardly extending spacer protuberances 77 for supporting a material filter portion 27 in elevated relation relative to the combination bottom 78. The present invention may thus be said to further comprise a permeable container bottom portion 69, which permeable container containment portion 69 receives and contains a liquid permeable container exemplified by the material filter portion 27. A liquid permeable container cover 19 may be received and supported in superior adjacency to the liquid permeable container or material filter portion 27 as contained within the container bottom portion 69 via a cover support depression portion 71 formed in the upper lid body insert portion 70.

The first lid body insert-container combination 18 is also receivable and supportable by the fifth lower lid body 42 in superior adjacency to the object-supportive depression 60 and comprises the outer insert edge 54, a secondary liquid-letting aperture 55, and an insert-container axis as at 105. The outer insert edge 54 is insertable into the insert edge-retention track 52 formed in the fifth lower lid body 42 when the lid body insert-container combination 18 is received and supported by the fifth lower lid body 42. The first lid body insert-container combination 18 is rotatable about the insert-container axis 105 intermediate open and closed lid body insert positions.

The secondary liquid-letting aperture 55 is thus rotatably positionable in superior adjacency to the primary liquid-letting aperture 59 when in an open lid body insert position for enabling liquid egression via both the primary and secondary liquid-letting apertures 59 and 55. The secondary liquid-letting aperture 55 is further rotatably positionable or re-positionable in lateral adjacency to the primary liquid-letting aperture 55 for preventing liquid egression via the lid assembly comprising the first lid body insert-container combination 18 or cover-container-insert combination 20 and fifth lower lid body 42.

The object-supportive depression 60 may preferably be formed radially inwardly of the rim-receiving groove 50 thereby forming an annular lid body region 72 intermediate the container-supportive depression 60 and the rim-receiving groove 50 co-extensive with the insert-supportive depression 64 in the fifth lower lid body 42 and extending in a plane parallel to the depression plane 106 in the fourth lower lid body 32. The primary liquid-letting aperture 59 is preferably formed in the annular lid body region 72. The fourth lower lid body 32 further preferably comprises a liquid spillway as at 73 in adjacency to the primary liquid-letting aperture 59. The liquid spillway 73 may be characterized by comprising a central spillway portion 74 and laterally opposed guideways 75. The laterally opposed guideways 75 function to structurally direct egressing liquid toward the central spillway portion 74.

Referencing FIGS. 80-86, the reader will there consider a first lid body-container combination 28 according to the present invention. The first lid body-container combination 28 preferably comprises a cylindrical container type lower portion 30 integrally formed with an upper lid body portion 29. The first lid body-container combination 28 outfits a liquid container 10 and positions a liquid-permeable container filter portion 27 relative to the liquid container 10. The lid body portion 29 preferably comprises a rim-receiving groove 50, an insert-supportive depression as at 64, and a primary liquid-letting aperture as at 59. The first lid body-container combination 28 is nestable with a series of successive first lid body-container combinations 28 each of which are substantially identical to one another as generally depicted in FIGS. 84-86.

Noting that the lid body portion 29 comprises an insert-supportive depression 64, the lid body insert 14 may be received and supported by the lid body portion 29 in superior adjacency to the liquid permeable container containment portion or cylindrical container type lower portion 30. The reader will recall that the lid body insert 14 comprises an outer insert edge 54, a secondary liquid-letting aperture 55, and an insert axis as at 101.

The outer insert edge 54 is insertable into an insert edge-retention track 52 formed in the lid body portion 29, and thus the lid body insert 14 is rotatable about the insert axis 101 intermediate open and closed lid body insert positions. The secondary liquid-letting aperture 55 is thereby rotatably positionable in superior adjacency to the primary liquid-letting aperture 59 when in an open lid body insert position for enabling liquid egression via both the primary and secondary liquid-letting apertures 59 and 55. The secondary liquid-letting aperture 55 is rotatably re-positionable in lateral adjacency to the primary liquid-letting aperture 59 for preventing liquid egression via the resultant lid assembly substantially as previously described.

Referencing FIGS. 87-91, the reader will there consider a fourth lid embodiment ensemble or lid assembly 33 comprising a third upper lid body insert 34 and the fifth lower lid body 42 for outfitting a liquid container 10. The third upper lid body insert 34 is receivable and supportable by the insert-supportive depression as at 64 and comprises an outer insert edge 54, a secondary liquid-letting aperture 55, an insert axis 101, and an inner container support edge as at 80. The outer insert edge 54 is insertable into an insert edge-retention track 52 formed in the fifth lower lid body 42.

The inner container support edge 80 seats down atop the object-supportive depression as at 60 and forms a secondary, insert-based, object-supportive depression as at 81. The third upper lid body insert 34 is rotatable about the insert axis 101 intermediate open and closed lid body insert positions. The secondary liquid-letting aperture 55 is thereby rotatably positionable in superior adjacency to the primary liquid-letting aperture 59 when in an open lid body insert position for enabling liquid egression via both the primary and secondary liquid-letting apertures 59 and 55, and rotatably re-positionable in lateral adjacency relative to the primary liquid-letting aperture 59 for preventing liquid egression via the lid assembly 33. A cup type, single-serve, liquid permeable pod or container assembly or liquid permeable container 15 may be received by the third upper lid body insert 34 as seated atop the fifth lower lid body 42 for positioning the liquid permeable container 15 relative to the liquid container 10 as generally and comparatively depicted in FIGS. 90 and 91.

Referencing FIGS. 92-99, the reader will there consider a second lid body-container combination 35 according to the present invention. The second lid-body combination container 35 is primarily designed for cold brew coffee and tea beverages. Cold liquid may be directed slowly through permeable coffee/tea pad and returns to the liquid container 10 through a tertiary liquid-letting aperture 83. The second lid body-container combination 35 comprises a conical container type lower portion 37 integrally formed with an upper lid body portion 36. More particularly, the second lid body-container combination 35 may be said to comprise a rim-receiving groove 50, a primary object-supportive depression as at 82, a secondary object-supportive depression as at 84, and a primary liquid-letting aperture as at 59.

The primary liquid-letting aperture 59 enables liquid egression from the liquid container 10. The secondary object-supportive depression 84 comprises a depending conical container type lower portion 37 that directs liquid toward the tertiary liquid-letting aperture 83 formed therein. The tertiary liquid-letting aperture 83 outlets media-permeated, flavor-infused liquid into the liquid container 10. The rim-receiving groove 50 attaches the second lid body-container combination 35 to a container rim 9 of the liquid container 10. The second lid body-container combination 35 is usable with the second upper lid body insert 14, which second upper lid body insert 14 may cover the upper portions of the secondary object-supportive depression 84 having a depending conical container type lower portion 37 as generally and comparatively depicted in FIGS. 95 and 96.

The second upper lid body insert 14 may thus be inserted into or received by the second lid body-container combination 35 thereby covering the secondary object-supportive depression 84. A cover element 19 may also be inserted atop the secondary object-supportive depression 84 (not specifically illustrated). It will be recalled that the second upper lid body insert 14 preferably comprises a radially centralized and planar insert depression portion as at 76, which insert depression 76 may cover an upper portion of the secondary object-supportive depression 84. The second lid body-container combination 35 is nestable with a series of successive lid body-container combinations 35 each being substantially identical to one another as generally and comparatively depicted in FIGS. 97-99.

Referencing FIGS. 100-104A, the reader will there consider a sixth lower lid body 38 according to the present invention for positioning a state of the art cup type, single-serve, liquid permeable pod or container assembly 15 relative to a liquid container 10. The sixth lower lid body 38 preferably comprises a rim-receiving groove 50, an object-supportive depression as at 60, and a primary liquid-letting aperture as at 59. The primary liquid-letting aperture 59 enables liquid egression from the liquid container 10, and the object-supportive depression 60 supports the cup type, single-serve, liquid permeable pod or container assembly 15 and centrally defines a container wall-receiving or tertiary liquid-letting aperture as at 61.

The tertiary liquid-letting aperture 61 receives the cup type, single-serve, liquid permeable pod or container assembly 15, and the liquid permeable pod or container assembly 15, containing coffee, tea, or some similar type of liquid-permeable media, outlets media-permeated, flavor-infused liquid into the liquid container 10. The rim-receiving groove 50 attaches the sixth lower lid body 38 to a container rim 9 of the liquid container 10. The object-supportive depression 60 may preferably comprise a container edge-retention track as at 62. The container edge-retention track 62 receives and retains a container edge 63 of the cup type, single-serve, liquid permeable pod or container assembly 15 (i.e. liquid permeable container 15) and prevents inadvertent removal thereof from the sixth lower lid body 38.

Further referencing FIGS. 105-107 the reader will there again consider the method of using the lid assembly 21. A packet type, single-serve, liquid permeable pod or container assembly is generally depicted and referenced at 39 and received within the liquid return depression 56. Coffee or tea material may be housed within the packet type, single-serve, liquid permeable pod or container assembly 39 and when liquid is directed therethrough, outletting liquid is coffee-infused or tea-infused liquid as it returns to the liquid container 10 via the apertures 57 or 57'.

Comparatively referencing FIG. 106 versus FIG. 107, the reader will there note that the packet type, single-serve, liquid permeable pod or container assembly 39 may be housed intermediate the second and third lower lid bodies 22 and 22' and the first upper lid body insert 13 within a compartment defined, in part, by the lower liquid return depression 56 and the upper lid body insert 13. In other words, the reader will there consider a packet type, single-serve, liquid permeable pod or container assembly 39 exemplified by a tea bag being used with lid assembly 21. The reader should note that the packet type, single-serve, liquid permeable pod or container assembly 39 or tea bag remains in place and is structurally squeezed throughout duration of tea consumption as shown in FIG. 107.

Referencing FIGS. 108-111, the reader will note the cylindrical container type lower portion 30 integrally formed with an upper lid body portion 29 of the first lid body-container combination 28. Coffee or tea material 85 may be received in the cylindrical container type lower portion 30 and when liquid 90 is directed therethrough, outletting liquid 92 is coffee-infused or tea-infused liquid as it returns to the liquid container 10 via the aperture or outlet 66. The second upper lid body insert 14 may be inserted atop the first lid body-container combination 28 once the liquid container 10 has been filled as generally and comparatively depicted in FIGS. 110 and 111.

Figure 111:
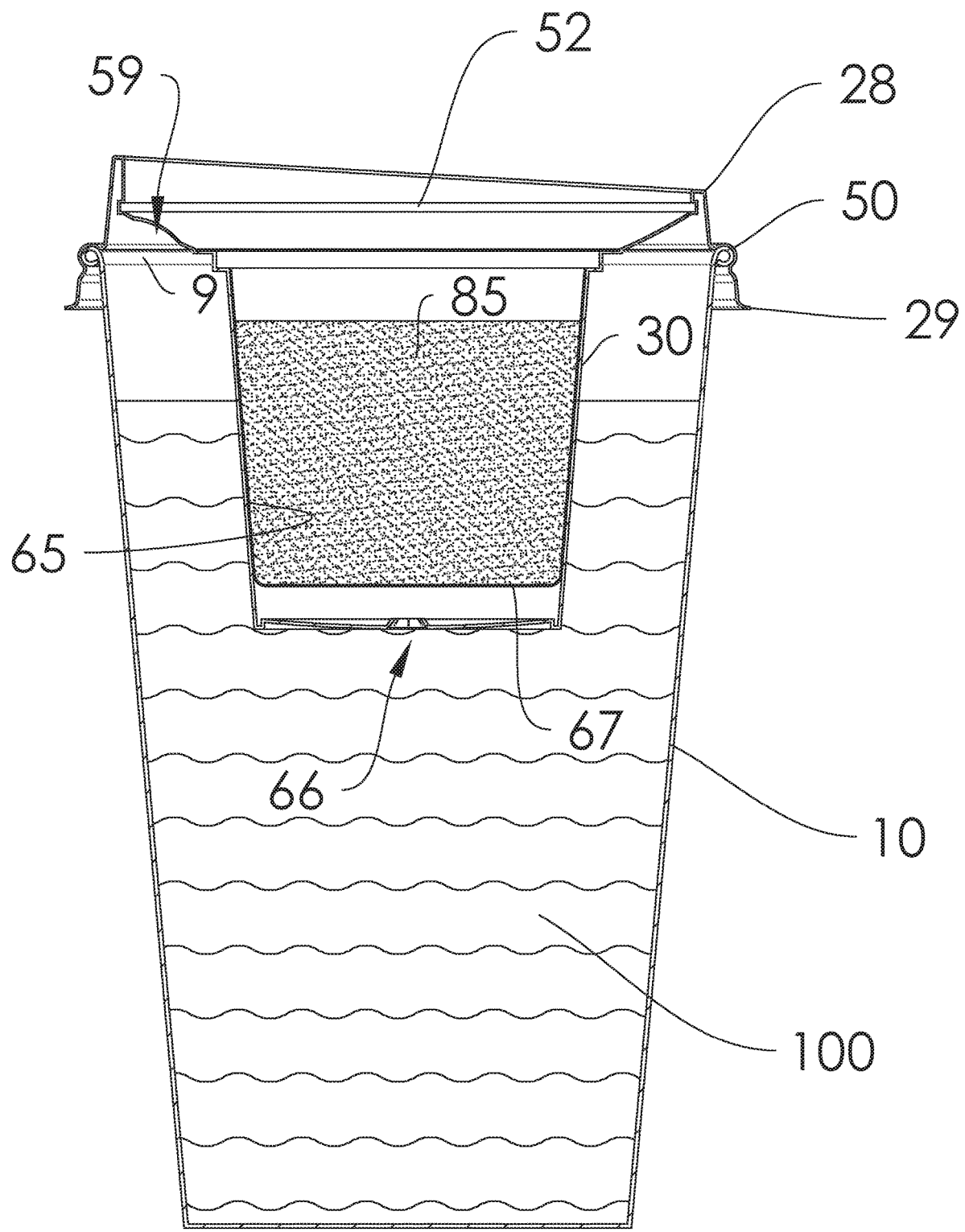
FIG. 111 is a cross-sectional view of the first lower lid body-container combination according to the present invention in assembled relation with a tall container in a condition of use whereby liquid has been being directed through the material contained within the cylindrical container type lower.
Figures 112, 113, 114:
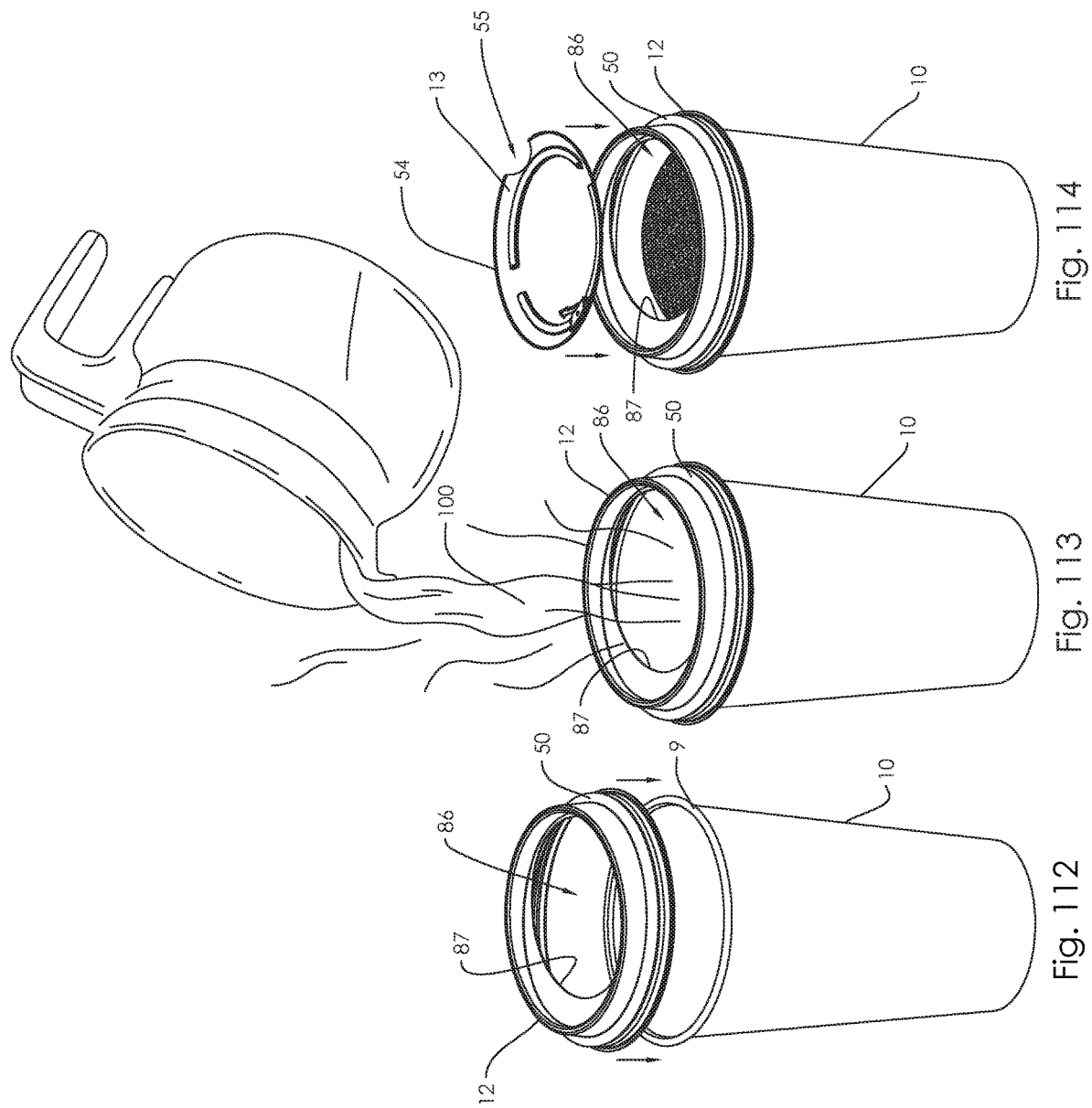
FIG. 112 is a first sequential exploded perspective view of the first lower lid body and a tall container.
FIG. 113 is a second sequential perspective depiction of the first lower lid body in assembled relation with a tall container with liquid being directed thereinto.
FIG. 114 is a third sequential perspective view of the first lower lid body in assembled relation with a tall container in a second condition of use, the first upper lid body insert being exploded from the first lower lid body.

FIGS. 108-111 thus depict possible commercial applications of the first lid body-container combination 28. The reader will note that before ground coffee/tea material 85 is inserted into the cylindrical container type lower portion 30 of the first lid body-container combination 28, a paper filter element 65 may be inserted into the first lid body-container combination 28. Further, coffee/tea leftover stays in the cylindrical container type lower portion 30 throughout duration of coffee/tea consumption as generally depicted in FIG. 111. The same application applies to the second lid body-container combination 35.

Figures 115, 116:
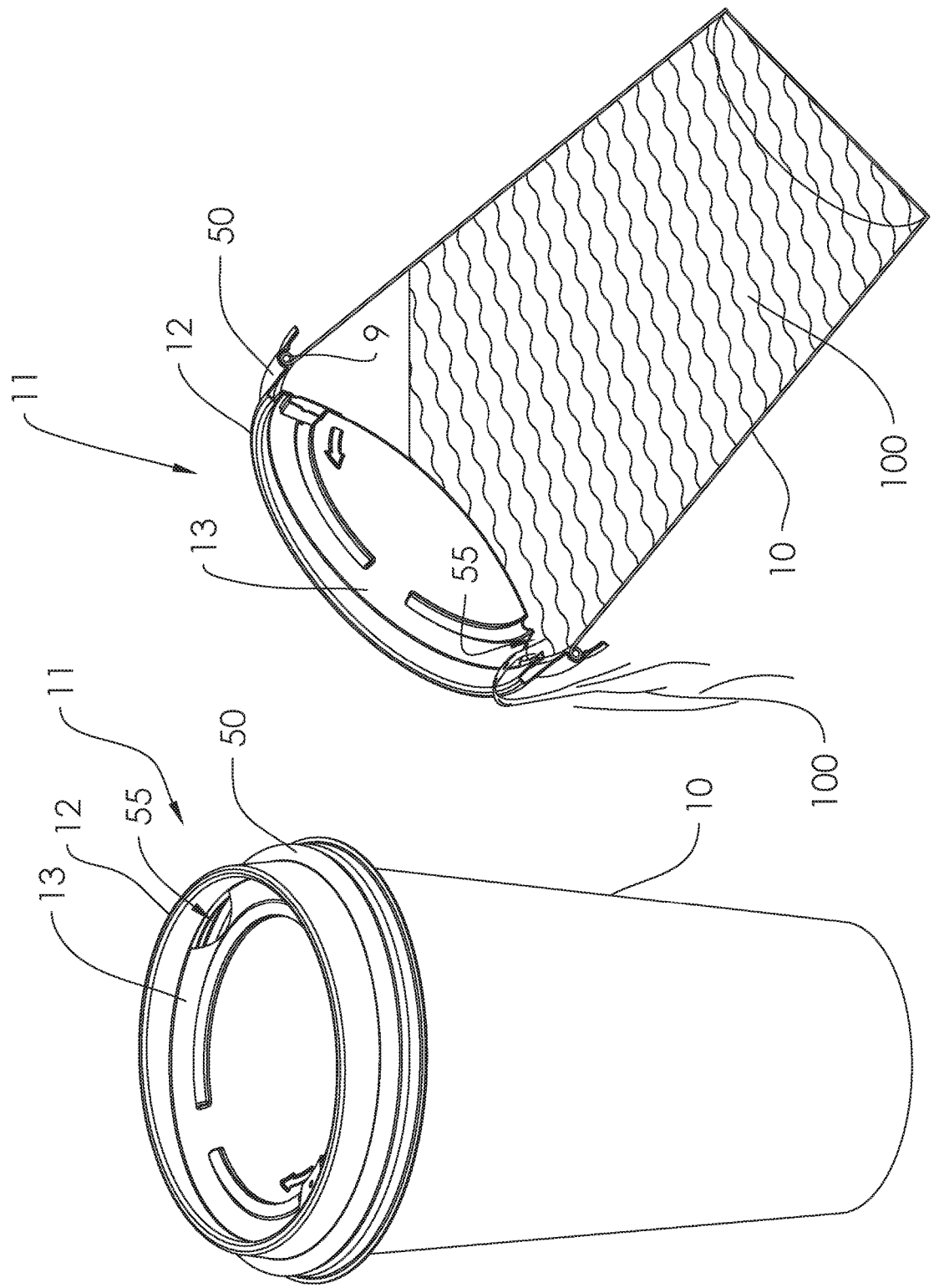
FIG. 115 is a top perspective view of the first lid embodiment ensemble or lid assembly as assembled atop a tall container in an open configuration.
FIG. 116 is a cross-sectional perspective view of the first lid embodiment ensemble or lid assembly as assembled atop a tall container in an open configuration with liquid being directed therefrom in a third condition of use.
Figure 119B:
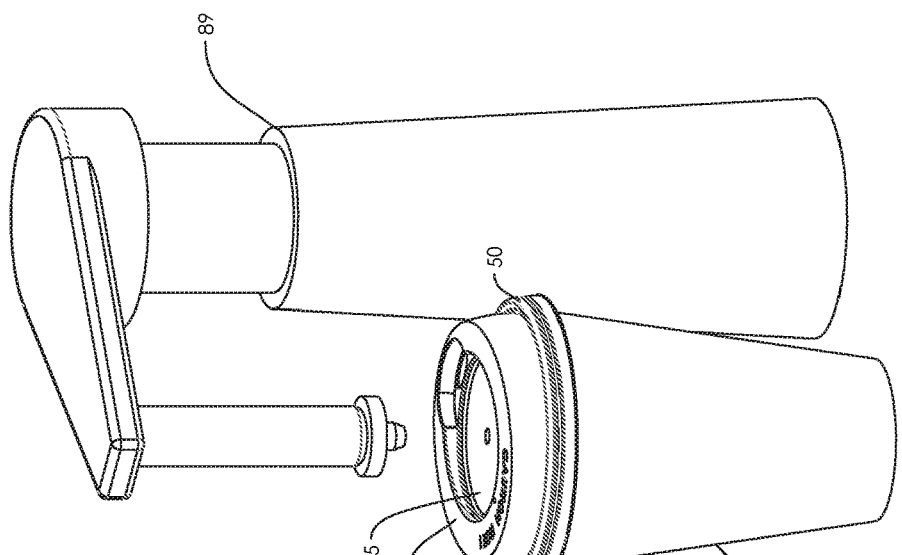
FIG. 119B is a third sequential depiction of the tall container, the fourth lower lid body in assembled relation atop the tall container, and the single-serve, liquid permeable pod or container assembly supported by the fourth lower lid body after water delivery to the ensemble via the first water delivery mechanism.
Figure 119A:
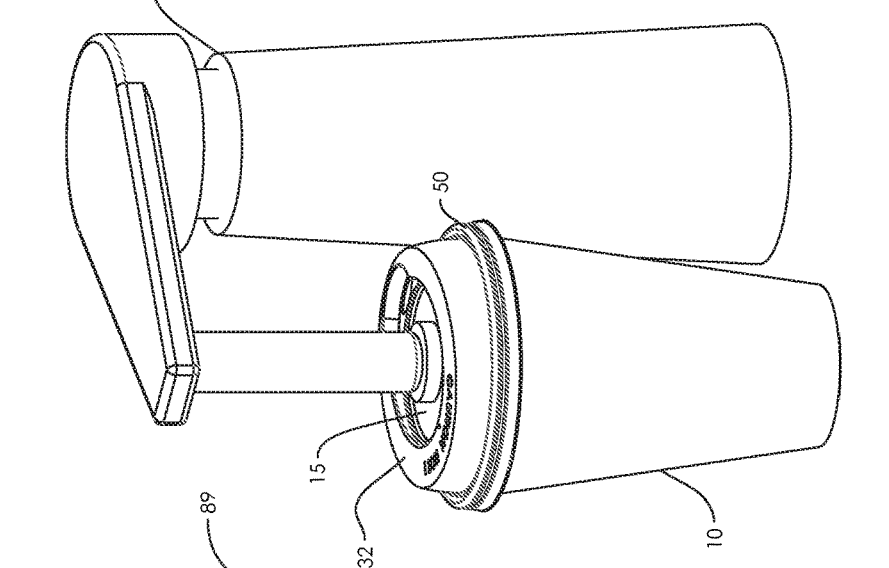
FIG. 119A is a second sequential depiction of the tall container, the fourth lower lid body in assembled relation atop the tall container, and the single-serve, liquid permeable pod or container assembly supported by the fourth lower lid body during water delivery to the ensemble via the first water delivery mechanism.
Figure 119:
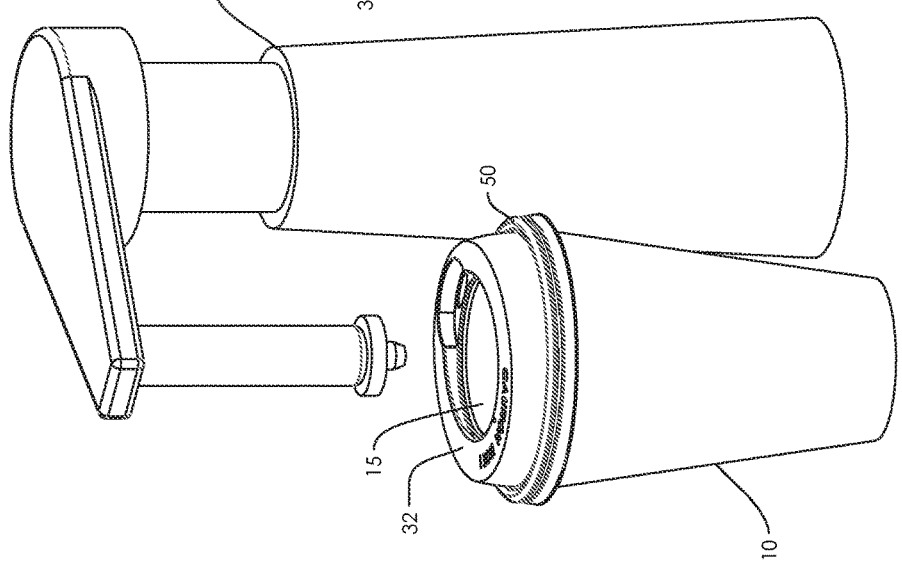
FIG. 119 is a first sequential depiction of a tall container, the fourth lower lid body in assembled relation atop the tall container, and a single-serve, liquid permeable pod or container assembly supported by the fourth lower lid body prior to water delivery to the ensemble via a first water delivery mechanism.

A similar market adaptation is further generally depicted in FIGS. 112-118 in connection with the first lower lid body 12 and lid assembly 11 by Quick Service Restaurants or QSRs, and other beverage serving establishments. FIG. 116, in particular, depicts a tilted liquid container 10 with liquid 100 inside flowing with the lid body insert 13 in the open lid body insert position, while FIG. 118 depicts the same tilted liquid container 10 with the lid body insert 13 in a closed lid body insert position for preventing liquid flow from the liquid container 10. One of the primary concepts being addressed with these figures is to prevent a server from only placing the first lower lid body 12 on the liquid container 10 when it is filled with hot liquid. This provides different options for the lid body insert 13 as inserted by the server or by the customer as a choice in much the same manner that outlet plugs currently provide the customer with spillage prevention in some establishments.

Comparatively referencing FIGS. 1-18 versus FIGS. 112-118, the reader will there note the first lower lid body 12 and lid assembly 11 with upper lid body insert 13. The first lower lid body 12 provides a significantly bigger lid body opening 86 that is moved eccentrically forward to make it perfectly round and at the same time limit liquid flow with the open/close functions of the upper lid body insert 13. In this regard, the reader will note that the lid body axis 102 is parallel to the opening axis 104 of the lid body opening 86 that further functions as the primary liquid-letting aperture 53 of the first lower lid body 12. The closed lid body insert position depicted in 10-14B, 123, and 124 requires the upper lid body insert 13 to be rotated such that the secondary liquid-letting aperture 55 is completely blocked by the side overlap portion 98 of the lid body 12.

The lid assembly 11 according to the present invention may thus be said to comprise a lid body axis as at 102, and the annular insert-supporting depression 51 comprises a depression or opening axis as at 104. The lid body axis 102 and the depression axis 104 are parallel to one another. The primary liquid-letting aperture 53 or lid body opening 86 is defined by a lower inner rim 87 of the annular insert-supporting depression 51. Together, the primary and secondary liquid-letting apertures 53 and 55 are cooperative for providing a phased liquid-letting aperture 88 depending on the angle of rotation of the upper lid body insert 13 relative to the lower lid body 12.

The lid body insert 13 is rotatably positionable relative to the first lower lid body 12 such that the phased liquid-letting aperture 88 waxes and wanes intermediate fully open and fully closed phased liquid outlet configurations depending on degrees of rotation of the lid body insert 13 relative to the lower inner rim 87 and rotational direction of the upper lid body insert 13 relative to the first lower lid body 12. Comparatively referencing FIGS. 123-123B versus FIGS. 124-124C, the reader will there note a relatively small secondary liquid-letting aperture 55 in FIGS. 123-123B as compared to a relatively large secondary liquid-letting aperture 55 in FIGS. 124-124C.

The phased liquid-letting aperture 88 waxes from a fully closed phased liquid-letting aperture 88 in FIG. 123 at a reference position to a fully open phased liquid-letting aperture 88 in FIG. 123B at 90 rotational degrees from the reference position with a half phased liquid-letting aperture being depicted in FIG. 123A at 45 rotational degrees from the reference position. The phased liquid-letting aperture 88 waxes from a fully closed phased liquid-letting aperture 88 in FIG. 124 at a reference position to a fully open phased liquid-letting aperture 88 in FIG. 124C at 180 rotational degrees from the reference position with a half phased liquid-letting aperture 88 being depicted in FIG. 124A at 90 rotational degrees from the reference position and a nearly fully open phased liquid-letting aperture 88 in FIG. 124B at 135 rotational degrees from the reference position.

The embodiment generally depicted in FIGS. 36-43B and FIGS. 119-122A provides a fourth lower lid body 32 with a central aperture or opening 61 to accommodate a cup type, single-serve, liquid permeable pod or container assembly 15. The circumferential container edge 63 of the cup type, single-serve, liquid permeable pod or container assembly 15 is snap-in locked in the container edge-retention track as at 62 peripherally surrounding the central aperture or opening 61. The cup, type single-serve, liquid permeable pod or container assembly 15 stays in, after brewing, and serves as a cover to close or cover the opening 61. Locking the cup type, single-serve, liquid permeable pod or container assembly 15 in this manner prevents it from accidental removal at the time of consumption and further seals it to prevent leakage.

FIGS. 119-122A generally and comparatively depict a portable water boiler 89 in use with the fourth lower lid body 32 according to the present invention brewing coffee via a cup type, single-serve, liquid permeable pod or container assembly 15. Hot water 90 exits the water boiler 89 and enters ground coffee 91 forming coffee drops 95. A coffee stream 92 exits the cup type, single-serve, liquid permeable pod or container assembly 15 and mixes with the liquid 100 (e.g. coffee) inside the liquid container 10 (e.g. coffee container). The concept of the fourth lower lid body 32 builds upon the structural concept of a cup type, single-serve, liquid permeable pod or container assembly 15 and renders more portable these convenient container assemblies 15. Instead of using bulky brewing machines, the present invention may be used not only as simple water boiler connected to the fourth lower lid body 32 but also in vehicle-based scenarios. In a matter of 5-15 minutes, coffee may be safely prepared in the vehicle with all of the aroma and experience of coffee making at home.

The reader will note that the alternative options for water boilers depicted in the drawings are not meant to be limiting. For example, a water boiler 89 for a vehicle could be done as a process of boiling on the way as cold water is sucked from a water bottle. This concept eliminates the collection of any significant volume of boiling water outside the coffee cup itself and makes the "boiler" merely the heating elements with coil tube which connects to any cold water bottle or container. FIGS. 121-122A depict the same water boiler idea to fit a vehicular cup holder 93 with a water boiler 89 having a container for water 96. If cold water bottle is used as cold water container, a heating element with coil 94 processes boiled water 90 and delivers boiled water 90 to the cup type, single-serve liquid permeable pod or container assembly 15, eliminating the need for a hot water container all together. The idea here is render the overall coffee brewing experience less cumbersome, as safe as possible, and to fit into the regular behavioral patterns of most people on the go. All of the different embodiments support in one way or another the basic concept of enabling a portable coffee/tea brewing system.

The lid assembly embodiments generally depicted in FIGS. 44-56 are contemplated for a quick market adaptation insofar as the lid assembly embodiments there depicted do not require any structural modification to state of the art cup type, single-serve, liquid permeable pod or container assemblies 15. In other words, the subject embodiments accommodate existing cup type, single-serve, liquid permeable pod or container assemblies 15. The embodiments differ from the third lower lid body 32 by providing the structural choice of using an upper lid body insert 14 on top of the cup type, single-serve, liquid permeable pod or container assembly 15 for open/slow/closed lid configurations.

FIGS. 57-99 draw focus toward variants of otherwise state of the art cup type, single-serve, liquid permeable pod or container assemblies 15. The embodiments shown in FIGS. 57-62 basically provide bottom portions 16 of a cup type, single-serve, liquid permeable pod or container assembly 15 with an upper lid body insert 14 attached thereto as a cover instead of a foil cover. This embodiment allows the coffee packaging company to use existing mass produced cup type, single-serve, liquid permeable pod or container assemblies 15 and adds an upper lid body insert 14 at the time of the coffee/tea packaging process. In most cases, it is contemplated that structure akin to bottom portion 16 be used with the upper lid body insert 14 and the resulting combination inserted into the fifth lower lid body 42 as generally depicted in FIGS. 61 and 62.

The embodiment shown in FIGS. 63-68 basically provides a cup type, single-serve liquid, permeable pod or container assembly with an upper lid body insert disk as one body 18, with a foil cover element 19 attached on top. This embodiment requires a different cup type, single-serve, liquid permeable pod or container assembly manufacturing process, but is much the same as the embodiment used with the embodiments depicted in FIGS. 44-56. The embodiment shown in FIGS. 69-73 provides a flat disk element as at 24 attached on top of bottom portions 16 of a cup type, single-serve, liquid permeable pod or container assembly 15 without a foil cover element 19.

Figure 74:
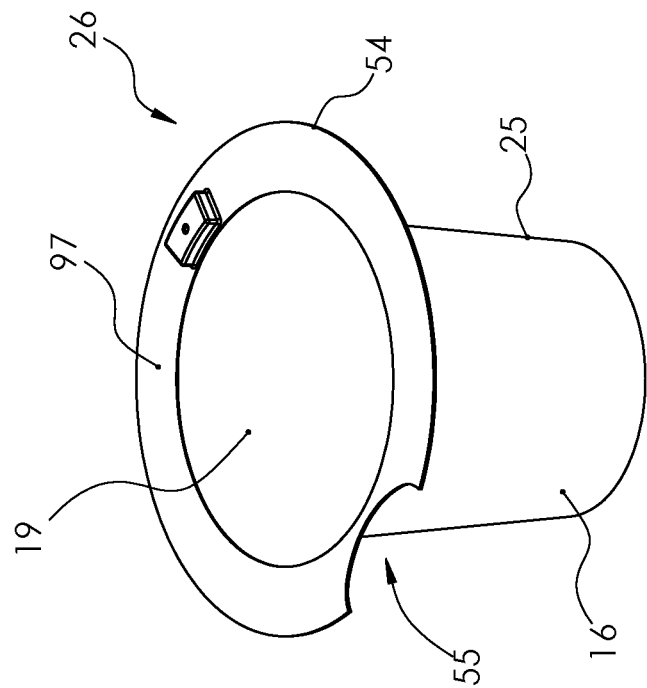
FIG. 74 is an exploded top perspective view of a second lid body insert-container combination in exploded relation with a container cover.
Figure 75:
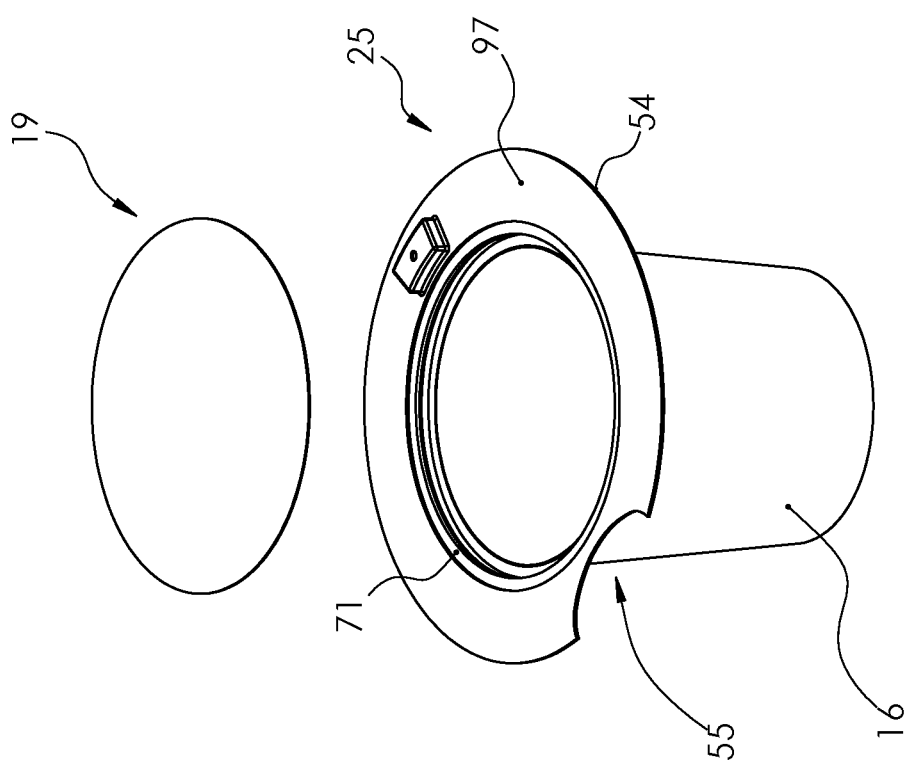
FIG. 75 is a top perspective view of the second lid body insert-container combination in assembled relation with the container cover thereby forming a second covered lid body insert-container combination.
Figure 83:
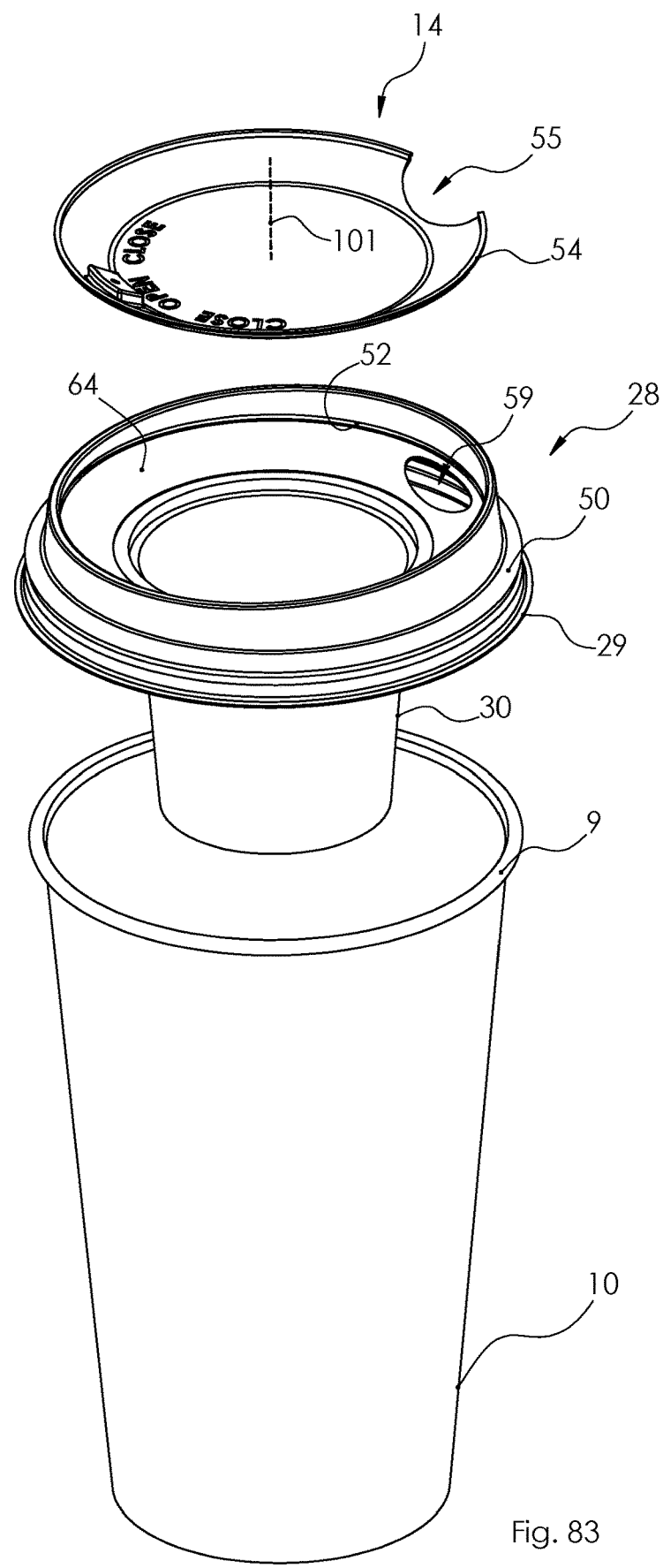
FIG. 83 is a posterior top exploded perspective view of the first lower lid body-container combination according to the present invention in exploded relation relative to a tall container and the second upper lid body insert.

The embodiment depicted in FIGS. 74 and 75 shows a cup type, single-serve liquid permeable pod or container assembly with a flat upper disk as one body or combination 25, and comprises a flat or planar upper portion as at 97. The embodiment illustrated in FIGS. 76-79 shows protrusions 77 on the combination bottom 78 which serve as spacers to support the filter element 27. The embodiment shown in FIGS. 80-86 basically depicts bottom portions (as at 30) of a state of the art single-serve, liquid permeable pod or container assembly 15 integrally formed as one body with the upper lid body 29. This embodiment may be used as a way of using coffee/tea not pre-packaged in single-serve, liquid permeable pod or container assemblies as well as pre-packaged with foil cover on top.

It is contemplated that the embodiment depicted in FIGS. 74 and 75 may be particularly useful for airline service. The flight attendant can simply place prepackaged lid-container combination 28 on top of the liquid container 10 and put it under water boiler pipe and the custom coffee/tea prepares itself. Many custom coffees, teas and cappuccinos could be prepared at the same time and safely delivered to passengers. Further, the need to pour hot water, tea, coffee from open pot, which can lead to inflight spillage, is eliminated. Other embodiments are also applicable for inflight service.

Figure 91:
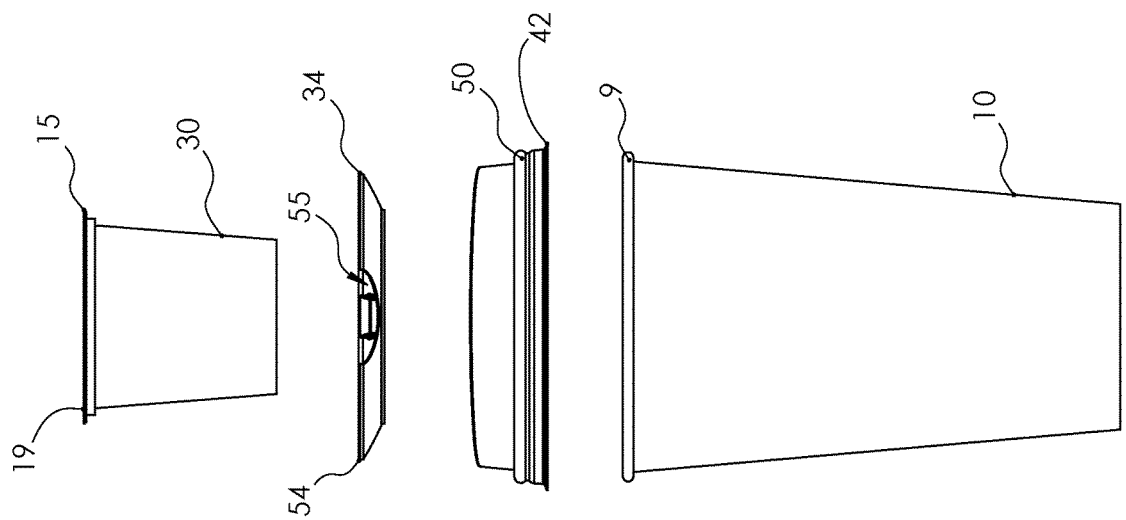
FIG. 91 is an anterior exploded view of the fourth lid embodiment ensemble or lid assembly according to the present invention in exploded relation relative to a tall container and a single-serve, liquid permeable pod or container assembly.
Figure 90:
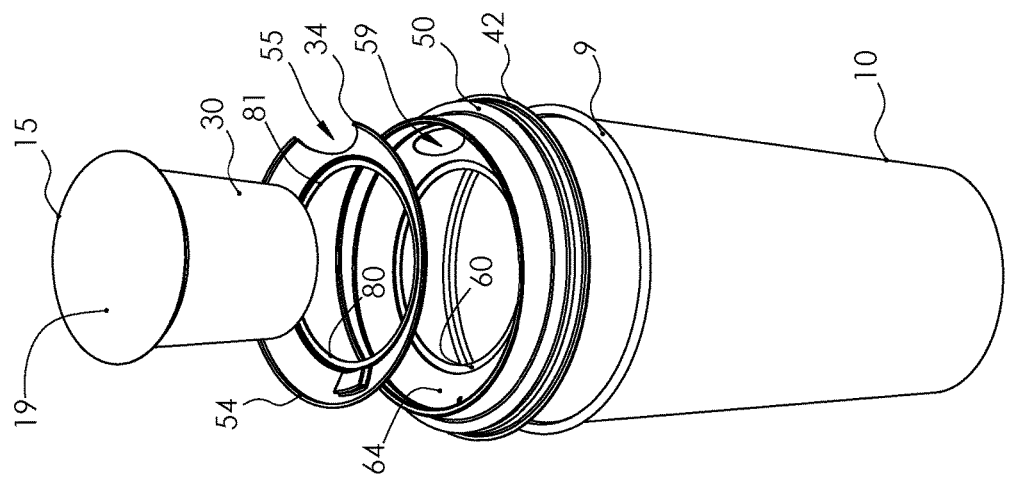
FIG. 90 is a top exploded perspective view of the fourth lid embodiment ensemble or lid assembly according to the present invention in exploded relation relative to a tall container and a single-serve, liquid permeable pod or container assembly.
Figure 104A:
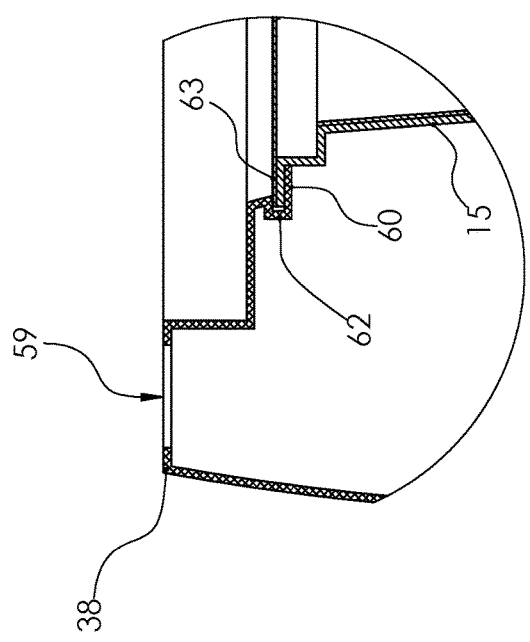
FIG. 104A is an enlarged, fragmentary sectional view as enlarged and sectioned from FIG. 104 to show in greater clarity structural details of anterior portions of the structures there depicted.
Figure 104:
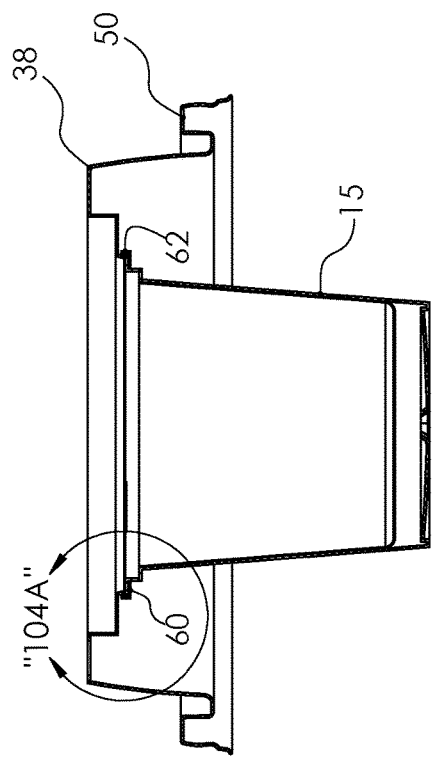
FIG. 104 is a medial type cross-sectional view of the sectioned sixth lower lid body according to the present invention with a sectioned state of the art single-serve, liquid permeable pod or container assembly.

The embodiment shown in FIGS. 90 and 91 provides a fifth lower lid body 42 and an upper third lid body insert 34 each of which comprise concentric holes or apertures to accommodate standard or state of the art cup type, single-serve, liquid permeable pod or container assemblies 15 after the fifth lower lid body 42 and lid body insert 34 are assembled. The second lid body-container combination 35 shown in FIGS. 92-99 is designed primarily with cold brewing coffee in mind. FIGS. 100-104A show the concept of the sixth lower lid body 38 with a central aperture or opening 61 to accommodate a cup type, single-serve liquid, permeable pod or container assembly 15, which aperture or opening 61 may be formed in most lid designs currently in use, with little modification. The locking structure exemplified by the container edge-retention track 62 incorporated into this embodiment could be achieved in a number of different ways, including the simple formation of a tight fit between the opening 61 in the sixth lower lid body 38 and the received cup type, single-serve, liquid permeable pod or container assembly 15.

While the above descriptions contain much specificity, this specificity should not be construed as limitations on the scope of the invention, but rather as an exemplification of the invention. In certain embodiments, the basic invention may be said to essentially teach or disclose a lid assembly for outfitting a liquid container. Certain variants of the lid assembly may be said to essentially comprise, in combination, a lid body and a lid body insert. The lid bodies according to the present invention all preferably comprise a rim-receiving groove as at 50 and some form of an object-supportive depression formed radially inward of the rim-receiving groove 50.

In certain embodiments, an annular insert-supportive depression is provided, which annular insert-supportive depression further provides or comprises a primary liquid-letting aperture for enabling either liquid ingression or egression (i.e. liquid migration) therethrough while the rim-receiving groove enables the user to attach the lid body to a container rim of the liquid container. The lid body insert is receivable in and supportable by the insert-supportive depression and comprises a secondary liquid-letting aperture and an insert axis. The lid body insert is rotatable about the insert axis intermediate open and closed lid body insert positions such that the secondary liquid-letting aperture is rotatably positionable in superior adjacency to the primary liquid-letting aperture when in an open lid body insert position for enabling liquid egression via both the primary and secondary liquid-letting apertures, and rotatably repositionable in lateral adjacency to the primary liquid-letting aperture for preventing liquid egression via the lid assembly.

In lid assembly 11, the first lower lid body 12 preferably further comprises a lid body axis as at 102 and the annular insert-supportive depression 51 comprises a depression axis as at 104. The lid body axis 102 and the depression axis 104 are parallel to one another, and the primary liquid-letting aperture 53 is defined by a lower inner rim 87 of the annular insert-supportive depression 51. The primary and secondary liquid-letting apertures 53 and 55 are cooperative for providing a phased liquid-letting aperture as at 88. In this regard, the lid body insert 13 is rotatably positionable relative to the lid body 12 such that the phased liquid-letting aperture 88 waxes and wanes intermediate fully open and fully closed phased liquid outlet configurations depending on directed degrees of rotation of the lid body insert 13 relative to the lower inner rim 87.

In lid assembly 21, a liquid return or secondary depression 56 depends from the annular insert-supportive depression 51. In this embodiment, the lid bodies 22 and 22' again each comprise a lid body axis as at 102, and the liquid return or secondary depression 56 comprises a return depression axis as at 103. The lid body and return depression axes 102 and 103 are parallel to one another such that the liquid return or secondary depression 56 is centrally offset relative to the rim-receiving groove 50 thereby providing an offset annular region 58 of the insert-supportive depression 51. The primary liquid-letting aperture 59 is formed in the offset annular region 58 in anterior adjacency to the liquid return or secondary depression 56, which depression 56 essentially comprises at least one aperture (as at 57 or 57') for returning liquid to the liquid container via the lid bodies 22 and 22'.

Liquid permeable matter as exemplified by coffee or tea material 85 or a packet type liquid permeable or a cup type liquid permeable container is receivable intermediate the liquid return depression and the lid body insert. The lid assembly thus further functions to position the liquid-permeable matter relative to the liquid container through which matter liquid (e.g. water) may be directed for further delivery to the liquid container. The lid assembly may further provide a lid body comprising an insert edge-retention track and a lid body insert comprising an outer insert edge. The outer insert edge is insertable into the insert edge-retention track when the lid body insert is received in and supported by the annular insert-supportive depression, the cooperative association of which enables both rotation of the lid body insert relative to the lid body and prevention of inadvertent removal of the lid body insert from the lid body.

Certain lid assembly embodiments according to the present invention outfit a liquid container and further position a liquid-permeable container (exemplified by the cup type, single-serve, liquid permeable pod or container assembly 15) relative to the outfitted liquid container. These lid assembly embodiments may be said to essentially or basically comprise a uniquely configured lid body comprising a rim-receiving groove, an object-supportive depression, and a primary liquid-letting aperture. The primary liquid-letting aperture enables liquid egression from the liquid container, and the object-supportive depression both supports the liquid permeable container and defines a tertiary liquid-letting aperture. The tertiary liquid-letting aperture outlets media-permeated, flavor-infused liquid from the liquid permeable container into the liquid container, and the rim-receiving groove attaches the lid body to a container rim of the liquid container.

Certain lid assembly embodiments according to the present invention provide an object-supportive depression comprising a container edge-retention track as at 62. The container edge-retention track 62 receives and retains a container edge 63 of the liquid-permeable container and prevents inadvertent removal thereof from the lid body. The object-supportive depression is preferably formed radially inwardly of the rim-receiving groove thereby forming an annular lid body region intermediate the object-supportive depression and the rim-receiving groove. In certain embodiments, the primary liquid-letting aperture is formed in the annular lid body region. The lid body may further preferably comprise a liquid spillway in anterior adjacency to the primary liquid-letting aperture characterized by a central spillway portion and laterally opposed guideways, the laterally opposed guideways for directing egressing liquid toward the central spillway portion.

In at least one lid assembly embodiment according to the present invention, an annular lid body insert interface is provided as exemplified by lid body insert 34. The annular lid body insert interface is receivable and supportable by the lid body in superior adjacency to the object-supportive depression and comprises an outer insert edge, a secondary liquid-letting aperture, an insert axis, and a container-receiving aperture. The container receiving aperture receives the liquid permeable container thereby interfacing between the lid body and the liquid permeable container.

The outer insert edge is insertable into an insert edge-retention track formed in the lid body, and the annular lid body insert interface is rotatable about the insert axis intermediate open and closed lid body insert positions. As with all secondary liquid-letting apertures of all lid body inserts, the secondary liquid-letting aperture is rotatably positionable in superior adjacency to the primary liquid-letting aperture when in an open lid body insert position for enabling liquid egression via both the primary and secondary liquid-letting apertures, and rotatably re-positionable in lateral adjacency to the primary liquid-letting aperture for preventing liquid egression via the lid assembly.

In this last regard, all lid body inserts according to the present invention are generally receivable and supportable by the lid body in superior adjacency to an object-supportive depression and comprise at least a secondary liquid-letting aperture and an insert axis. The lid body inserts are all rotatable about the insert axis intermediate open and closed lid body insert positions such that the secondary liquid-letting aperture is rotatably positionable either in superior adjacency to the primary liquid-letting aperture when in an open lid body insert position for enabling liquid egression or in lateral adjacency to the primary liquid-letting aperture for preventing liquid egression via the lid assembly. The lid body insert may further comprise an outer insert edge insertable into an optional insert edge-retention track as at 52 formed in the lid body.

The lid body insert may further provide or comprise an insert depression for covering an upper portion of the liquid permeable container. Further, a liquid permeable container cover may be provided in those embodiments where an upper lid body formation is integrally formed with bottom portions of a liquid permeable container. The liquid permeable container cover may be received and supported in superior adjacency to the bottom portions of the liquid permeable container via a cover-supportive formation formed in the lid body insert.

Certain lid assembly embodiments outfit a liquid container and essentially comprise or provide a lid body having a rim-receiving groove, a primary object-supportive depression as variously exemplified (e.g. depression 51, depression 64, depression 82), a secondary object-supportive depression as variously exemplified (e.g. depression 56, depression 60, depression 84), and a primary liquid-letting aperture as variously exemplified. The primary liquid-letting aperture enables liquid egression from the liquid container, and the secondary object-supportive depression may direct liquid toward a tertiary liquid-letting aperture formed therein, which tertiary liquid-letting aperture outlets media-permeated, flavor-infused liquid into the liquid container via the lid body. The rim-receiving groove attaches the lid body to a container rim of the liquid container.

A lid body insert may be received and supported by the primary object-supportive depression in superior adjacency to the secondary object-supportive depression. The lid body insert essentially comprises a secondary liquid-letting aperture and an insert axis such that the lid body insert is rotatable about the insert axis intermediate open and closed lid body insert positions. The secondary liquid-letting aperture is rotatably positionable in superior adjacency to the primary liquid-letting aperture when in an open lid body insert position for enabling liquid egression via both the primary and secondary liquid-letting apertures, and rotatably re-positionable relative to the primary liquid-letting aperture for preventing liquid egression via the lid assembly. The lid body insert may preferably comprise an insert depression for covering the secondary object-supportive depression.

Accordingly, although the invention has been described by reference to certain preferred embodiments, and certain associated methodologies, it is not intended that the novel arrangement and methods be limited thereby, but that modifications thereof are intended to be included as falling within the broad scope and spirit of the foregoing disclosures and the appended drawings.

What is claimed is:

1. A lid assembly for outfitting a liquid container, the lid assembly comprising, in combination:
   a lid body, the lid body comprising a rim-receiving groove and an annular insert-supportive depression, the annular insert-supportive depression providing a primary liquid-letting aperture for enabling liquid migration therethrough, the rim-receiving groove for attaching the lid body to a container rim of the liquid container; and
   a lid body insert, the lid body insert being receivable in and supportable by the insert-supportive depression and comprising a secondary liquid-letting aperture and an insert axis, the lid body insert being rotatable about the insert axis intermediate open and closed lid body insert positions, the secondary liquid-letting aperture being rotatably positionable in superior adjacency to the primary liquid-letting aperture when in an open lid body insert position for enabling liquid egression via both the primary and secondary liquid-letting apertures, the secondary liquid-letting aperture being rotatably re-positionable in lateral adjacency to the primary liquid-letting aperture for preventing liquid egression via the lid assembly.

2. The lid assembly of claim 1 wherein the lid body comprises a lid body axis and the annular insert-supportive depression comprises a depression axis, the lid body axis and the depression axis being parallel to one another, the primary liquid-letting aperture being defined by a lower inner rim of the annular insert-supportive depression, the primary and secondary liquid-letting apertures being cooperative for providing a phased liquid-letting aperture, the lid body insert being rotatably re-positionable relative to the lid body such that the phased liquid-letting aperture waxes and wanes intermediate fully open and fully closed phased liquid-letting aperture configurations depending on directed degrees of rotation of the lid body insert relative to the lower inner rim.

3. The lid assembly of claim 1 wherein a liquid return depression depends from the annular insert-supportive depression, the lid body comprising a lid body axis, the liquid return depression comprising a return depression axis, the lid body and return depression axes being parallel to one another, the liquid return depression being centrally offset relative to the rim-receiving groove thereby providing an offset annular region of the insert-supportive depression, the primary liquid-letting aperture being formed in the offset annular region in anterior adjacency to the liquid return depression, the liquid return depression comprising at least one aperture for returning liquid to the liquid container via the lid body.

4. The lid assembly of claim 3 wherein liquid permeable matter is receivable intermediate the liquid return depression and the lid body insert, the lid assembly thus for positioning the liquid-permeable matter relative to the liquid container.

5. The lid assembly of claim 3 wherein the lid body comprises an insert edge-retention track and the lid body insert comprises an outer insert edge, the outer insert edge being insertable into the insert edge-retention track when the lid body insert is received in and supported by the annular insert-supportive depression.

6. A lid assembly for outfitting a liquid container and positioning a liquid-permeable container relative to the liquid container, the lid assembly comprising:
a lid body, the lid body comprising a rim-receiving groove, an object-supportive depression, and a primary liquid-letting aperture, the primary liquid-letting aperture for enabling liquid egression from the liquid container, the object-supportive depression for supporting the liquid permeable container and defining a tertiary liquid-letting aperture, the tertiary liquid-letting aperture for outletting liquid from the liquid permeable container into the liquid container, the rim-receiving groove for attaching the lid body to a container rim of the liquid container.

7. The lid assembly of claim 6 wherein the object-supportive depression comprises a container edge-retention track, the container edge-retention track for receiving and retaining a container edge of the liquid-permeable container and preventing inadvertent removal thereof from the lid body.

8. The lid assembly of claim 6 comprising an annular lid body insert, the annular lid body insert being receivable and supportable by the lid body in superior adjacency to the object-supportive depression and comprising a secondary liquid-letting aperture, an insert axis, and a container-receiving aperture, the container receiving aperture for receiving the liquid permeable container thereby interfacing between the lid body and the liquid permeable container, the annular lid body insert being rotatable about the insert axis intermediate open and closed lid body insert positions, the secondary liquid-letting aperture being rotatably positionable in superior adjacency to the primary liquid-letting aperture when in an open lid body insert position for enabling liquid egression via both the primary and secondary liquid-letting apertures, the secondary liquid-letting aperture being rotatably re-positionable in lateral adjacency to the primary liquid-letting aperture for preventing liquid egression via the lid assembly.

9. The lid assembly of claim 6 wherein the object-supportive depression is formed radially inwardly of the rim-receiving groove thereby forming an annular lid body region intermediate the object-supportive and the rim-receiving groove, the primary liquid-letting aperture being formed in the annular lid body region.

10. The lid assembly of claim 9 wherein the lid body comprises a liquid spillway in adjacency to the primary liquid-letting aperture.

11. The lid assembly of claim 10 wherein the liquid spillway is characterized by comprising a central spillway portion and laterally opposed guideways, the laterally opposed guideways for directing egressing liquid toward the central spillway portion.

12. The lid assembly of claim 6 comprising a lid body insert, the lid body insert being receivable and supportable by the lid body in superior adjacency to the object-supportive depression and comprising a secondary liquid-letting aperture and an insert axis, the lid body insert being rotatable about the insert axis intermediate open and closed lid body insert positions, the secondary liquid-letting aperture being rotatably positionable in superior adjacency to the primary liquid-letting aperture when in an open lid body position for enabling liquid egression via both the primary and secondary liquid-letting apertures, the secondary liquid-letting aperture being rotatably re-positionable in lateral adjacency to the primary liquid-letting aperture for preventing liquid egression via the lid assembly.

13. The lid assembly of claim 12 wherein the lid body insert comprises an outer insert edge, the outer insert edge being insertable into an insert edge-retention track formed in the lid body.

14. The lid assembly of claim 12 wherein the lid body insert comprises an insert depression, the insert depression for covering an upper portion of the liquid permeable container.

15. The lid assembly of claim 12 comprising a liquid permeable container cover and wherein the lid body insert is integrally formed with bottom portions of the liquid permeable container, the liquid permeable container cover being received and supported in superior adjacency to the bottom portions of the liquid permeable container via a cover-supportive formation formed in the lid body insert.

16. A lid assembly for outfitting a liquid container, the lid assembly comprising:
a lid body, the lid body comprising a rim-receiving groove, a primary object-supportive depression, a secondary object-supportive depression, and a primary liquid-letting aperture, the primary liquid-letting aperture for enabling liquid egression from the liquid container, the secondary object-supportive depression for directing liquid toward a tertiary liquid-letting aperture formed therein, the tertiary liquid-letting aperture for outletting liquid into the liquid container via the lid body, the rim-receiving groove for attaching the lid body to a container rim of the liquid container.

17. The lid assembly of claim 16 comprising a lid body insert, the lid body insert being receivable and supportable by the primary object-supportive depression in superior adjacency to the secondary object-supportive depression and comprising a secondary liquid-letting aperture and an insert axis, the lid body insert being rotatable about the insert axis intermediate open and closed lid body insert positions, the secondary liquid-letting aperture being rotatably positionable in superior adjacency to the primary liquid-letting aperture when in an open lid body insert position for enabling liquid egression via both the primary and secondary liquid-letting apertures, the secondary liquid-letting aperture being rotatably re-positionable in lateral adjacency to the primary liquid-letting aperture for preventing liquid egression via the lid assembly.

18. The lid assembly of claim 17 wherein the lid body insert comprises an insert depression, the insert depression for covering the secondary object-supportive depression.

19. The lid assembly of claim 16 wherein the lid body is nestable with a series of successive lid bodies, the successive lid bodies each being substantially identical in formation to the lid body.

20. The lid assembly of claim 17 wherein the lid body insert comprises an outer insert edge, the outer insert edge being insertable into an insert edge-retention track formed in the lid body.

* * * * *